United States Patent [19]

Asada

[11] Patent Number: 5,030,187

[45] Date of Patent: Jul. 9, 1991

[54] AUTOMATIC TRANSMISSION

[75] Inventor: Toshiyuki Asada, Susono, Japan

[73] Assignee: Toyota Jidosha Kabushiki Kaisha, Toyota, Japan

[21] Appl. No.: 475,306

[22] Filed: Feb. 5, 1990

[30] Foreign Application Priority Data

Feb. 3, 1989 [JP] Japan .................................. 1-25320
Apr. 27, 1989 [JP] Japan ................................ 1-108183
May 10, 1989 [JP] Japan ................................ 1-116799
Jul. 18, 1989 [JP] Japan ................................ 1-185151

[51] Int. Cl.$^5$ ............................................ F16H 57/10
[52] U.S. Cl. .................................... 475/278; 475/285
[58] Field of Search ............... 475/275, 277, 278, 284, 475/285

[56] References Cited

U.S. PATENT DOCUMENTS 4,233,861 11/1980 Gaus et al. ..................... 475/278 X
4,660,439 4/1987 Hiraiwa ......................... 475/278 X Primary Examiner—Dwight Diehl
Attorney, Agent, or Firm—Oblon, Spivak, McClelland, Maier & Neustadt

FOREIGN PATENT DOCUMENTS 3511180 10/1985 Fed Rep of Germany

OTHER PUBLICATIONS

Patent Abstracts of Japan, Vol. 9, number 231 (M414) [1954]; 12 Nov. 1985

[57] ABSTRACT

An automatic transmission having a gear train comprising first, second and third single-pinion planetary gear sets. The ring gear of the first single-pinion planetary gear set is connected integrally or selectively to the carrier of the second single-pinion planetary gear set, the carrier of the first single-pinion planetary gear set is connected integrally or selectively to the ring gear of the third single-pinion planetary gear set is connected integrally or selectively to the carrier of the third single-pinion planetary gear set, and the sun gear of the second single-pinion planetary gear set is connected integrally or selectively to the sun gear of the third single-pinion planetary gear set. The automatic transmission is capable of being placed in any one of at least five forward gears and one reverse gear.

77 Claims, 25 Drawing Sheets

FIG. 17

|  | CLUTCHES | | | | | BRAKES | | | |
|---|---|---|---|---|---|---|---|---|---|
|  | K1 | K2 | K3 | K4 | K6 | B1 | B2 | B3 | B4 |
| 1st | O |  |  | O | O | O |  |  | * |
|  | O |  |  | O | O | * |  |  | O |
|  | O |  |  | O | * | O |  |  | O |
| 2nd | O | O |  |  | O | O |  | * | * |
|  | O | O |  |  | O | * |  | O | * |
|  | O | O |  |  | O | * |  | * | O |
|  | O | * |  |  | * | O |  | O | * |
|  | O | O |  |  | * | O |  | * | O |
|  | O | * |  |  | O | * |  | O | O |
|  | O |  |  | O |  | O | O | * |  |
|  | O |  |  | * |  | O | * | O |  |
| 2.5th | O |  |  | O | O |  | O | * |  |
|  | O |  |  | O | O |  | * | O |  |
|  | O |  |  | * | O |  | O | O |  |
| 3rd | O | * | O |  |  | O |  |  |  |
|  | O |  | O | * |  | O |  |  |  |
|  | O |  | O |  | * | O |  |  | * |
|  | O |  | O |  | O | * |  |  | O |
|  | O |  | O |  |  | O | * |  |  |
| 3.5th | O |  | O |  | O | O |  |  |  |
| 4th | * | O | O | O | * |  |  |  |  |
|  | O | O | O | * | O |  |  |  |  |
|  | O | O | * | O | O |  |  |  |  |
|  | O | * | O | O | O |  |  |  |  |
|  |  | O | O | O |  | * |  |  |  |
| 5th | * | O | O |  |  |  | O |  |  |
|  |  | O | O |  | * |  | O |  |  |
|  |  | O | O |  |  | * | O |  |  |
| REV | * |  | O | O |  |  |  |  | O |
|  |  |  | O | O | O | O |  |  | * |
|  |  |  | O | O | * | * |  |  | O |

AUTOMATIC TRANSMISSION

BACKGROUND OF THE INVENTION

1. Field of the Invention

The present invention relates to an automatic transmission for a vehicle and, more specifically, to an automatic transmission having a gear train comprising three single-pinion planetary gear sets.

2. Description of the Prior Art

As is generally known, the planetary gear set comprises three components, namely, a sun gear, a ring gear, and one or more pinion gears meshing with the sun gear and the ring gear. One of the three components is an input member, one of the rest of the components is an output member and the other component is a control member. The control member is fixed to rotate the output member at a rotational speed higher than that of the input member, to rotate the output member in a direction reverse to the direction of rotation of the input member at a rotational speed lower than that of the input member or to rotate the output member in the same direction as the input member at a rotational speed lower than that of the input member. Accordingly, the gear train for an automatic transmission, in general, comprises a plurality of planetary gear sets in combination. The speed change ratio of an automatic transmission is dependent on the configuration of the automatic transmission, namely, the manner of combination of a plurality of planetary gear sets, the gear ratio of each of the planetary gear sets (the ratio between the sun gear and the ring gear in the number of teeth) and the type of the planetary gear sets, namely, a single-pinion type or a double-pinion type. However, all the mechanically possible configurations are not necessarily practicable; the configuration of a practicable automatic transmission is dependent on various practical conditions including the possibility of mounting the automatic transmission on a vehicle, the possibility of manufacture, speed change characteristics and required power transmission performance. That is, almost unlimited option in determining the configuration of the gear train of an automatic transmission makes very difficult the creation of a gear train meeting requisite conditions of an automatic transmission for a vehicle.

Under such circumstances, various automatic transmissions have been proposed. Automatic transmissions each having three planetary gear sets have been disclosed in, for example, Japanese Patent Provisional Publication Nos. 60-88252, 51-48062 and 54132058.

An automatic transmission disclosed in Japanese Patent Provisional Publication No. 60-88252 is of five-forward-speed and one-reverse-speed having a gear train consisting of three single-pinion planetary gear sets. However, when the respective gear ratios of the planetary gear sets of this automatic transmission (the ratio between the number of teeth of the sun gear and that of the ring gear) are determined so that a sequence of the speed change ratios of the automatic transmission approximates a geometric progression to avoid sharp change of the driving force at the moment of gear change operation, the gear ratio of one of the planetary gear sets must be very large, which causes undesirable increase in the size of the planetary gear set. On the contrary, when the respective gear ratios of the planetary gear sets are determined so that the respective sizes of the planetary gear sets are not excessively large, it is impossible to set a sequence of speed change ratios substantially in a geometric progression and the power performance of the vehicle is unsatisfactory.

An automatic transmission disclosed in Japanese Patent Provisional Publication No. 51-48062 is of five-forward-speed and two-reverse-speed employing a combination of two single-pinion planetary gear sets and a double-pinion planetary gear set. This automatic transmission, however, requires the operation of four engaging means, namely, two clutch means and two brake means in changing gear from the first gear to the second gear, and from the second gear to the third gear; consequently, the automatic transmission increases shocks attributable to the gear change operation or requires unavoidably a complicated gear change control operation.

An automatic transmission disclosed in Japanese Patent Provisional Publication No. 54-132058 is of five-forward-speed and one-reverse-speed employing a combination of a Ravignawx planetary gear set and a single-pinion planetary gear set or a combination of two single-pinion planetary gear sets and a double-pinion planetary gear set. However, the sun gears of this automatic transmission are subjected to high torques when the first gear, the second gear or the reverse gear is selected, which is disadvantageous in respect of durability and strength of the automatic transmission. Furthermore, power circulation occurs in the automatic transmission when the third gear is selected adversely affecting the strength and durability of the automatic transmission. When one of the three brake means of the automatic transmission is omitted to simplify the construction, torque load on the clutch means increases to deteriorate the durability of the clutch means or the clutch means must be replaced with another clutch means having a greater torque transmission capacity. Still further, the automatic transmission needs a double-pinion planetary gear set.

U.S. Pat. No. 4,233,861 discloses an automatic transmission having not less than five forward speeds and one reverse speed. The gear train of this automatic transmission comprises a Ravignawx planetary gear set having first and second pinion gears, and a single-pinion planetary gear set. The first pinion gear of the Ravignawx planetary gear set meshes with a first sun gear and a ring gear, and the second pinion gear meshes with the first pinion gear and a second sun gear having a diameter smaller than that of the first sun gear. The first and second pinion gears are supported on a planetary carrier. The ring gear of the Ravignawx planetary gear set is interlocked with the ring gear of the single-pinion planetary gear set; the first sun gear is connected through a first clutch to an input shaft; the carrier of the Ravignawx planetary gear set is connected through a second clutch and an overdriving clutch to the sun gear of the single-pinion planetary gear set; the second sun gear is connected through a third clutch to the input shaft; the carrier of the Ravignawx planetary gear set is connected through a fourth clutch to another input shaft. The automatic transmission is provided with a first brake for holding the first sun gear, a second brake for holding the sun gear of the single-pinion planetary gear set, and a third brake for holding the carrier of the Ravignawx planetary gear set.

This automatic transmission disclosed in U.S. Pat. No. 4,233,861 has five forward speeds and one reverse speed. However, this automatic transmission requires a complicated gear change control in changing the gear from the third gear to the fourth gear without shocks, because the first clutch and the second brake must be disengaged and the second and fourth clutches must be engaged in changing the gear from the third gear to the fourth gear, and such gear changing operation is liable to cause shocks. Furthermore, the rotation of the second sun gear at a comparatively high rotating speed when the fifth gear, i.e., a gear for over-drive, or the reverse gear is selected may possibly increase the temperature of the engine oil or affects adversely to the durability of the automatic transmission.

The automatic transmission having three planetary gear sets may be relieved to some extent from these technical disadvantages by providing clutch means between some rotary components of the planetary gear sets to connect or disconnect the rotary components according to the operating mode of the automatic transmission.

U.S. Pat. No. 4,660,439 discloses an automatic transmission incorporating such an improvement. The gear train of this automatic transmission comprises three single-pinion planetary gear sets, namely, front, central and rear planetary gear sets, and is provided with a clutch for selectively connecting the sun gear of the front planetary gear set and the sun gear of the central planetary gear set, a clutch for selectively connecting the sun gear of the front planetary gear set and the carrier of the central planetary gear set, a clutch for selectively connecting the carrier of the central planetary gear set and the sun gear of the rear planetary gear set or a clutch for selectively connecting the carrier of the front planetary gear set and the sun gear of the central planetary gear set. Such a clutch increases the number of possible gears and avoids the rotation of some rotary component at an excessively high rotating speed. However, at least three clutches or brakes must be operated in changing the gear from the second gear to the third gear, or from the third gear to the fourth gear, which is liable to cause shocks and requires a complicated gear change control operation.

SUMMARY OF THE INVENTION

Accordingly, it is a first object of the present invention to provide an automatic transmission having a gear train comprising three single-pinion planetary gear sets, and capable of establishing at least five forward gears and one reverse gear.

It is a second object of the present invention to provide an automatic transmission having a simple construction requiring the least possible number of frictional engaging means.

It is a third object of the present invention to provide an automatic transmission requiring a simple control operation for gear change.

It is a fourth object of the present invention to provide an automatic transmission provided with frictional engaging means capable of being set in a plurality of combinations for establishing one of the plurality of gears.

To achieve the objects, in one aspect of the present invention, an automatic transmission comprises first, second and third single-pinion planetary gear sets, in which the ring gear of the first planetary gear set and the carrier of the second planetary gear set are integrally connected or are connected selectively, the carrier of the first planetary gear set and the ring gear of the third planetary gear set are integrally connected or are connected selectively, the sun gear of the first planetary gear set and the carrier of the third planetary gear set are integrally connected or are connected selectively, and the sun gear of the second planetary gear set and the sun gear of the third planetary gear set are integrally connected or are connected selectively.

In a second aspect of the present invention, an automatic transmission comprises first, second and third single-pinion planetary gear sets, clutch means for selectively connecting an input shaft to the ring gear of the second planetary gear set, clutch means for selectively connecting the input shaft to the sun gear of the second planetary gear set, clutch means for selectively connecting the sun gear of the second planetary gear set to the carrier of the third planetary gear set, clutch means for selectively connecting the sun gear of the second planetary gear set to the sun gear of the third planetary gear set, brake means for selectively holding the sun gear of the first planetary gear set, and brake means for selectively holding the sun gear of the third planetary gear set.

The automatic transmission is placed in any one of at least five forward speeds and one reverse speed by selectively engaging or disengaging the clutch means and the brake means. The clutch means and the brake means may be engaged in one of a plurality of modes of combination of the clutch means and the brake means to place the automatic transmission in one of the gears. Furthermore, the gear change of the automatic transmission can be achieved by operating two of the clutch means and the brake means. Accordingly, the combination of the clutch means or brake means relevant to gear change operation with one-way clutches reduces shocks resulting from the gear change operation of the automatic transmission and facilitates control operation for gear change operation.

The above and other objects, features and advantages of the present invention will become more apparent from the following detailed description when the same is read in connection with the accompanying drawings. It is expressly understood, however, that the drawings are for purpose of illustration only and are not intended as a definition of the limits of the invention.

DETAILED DESCRIPTION OF THE PREFERRED EMBODIMENTS

Figure 1:
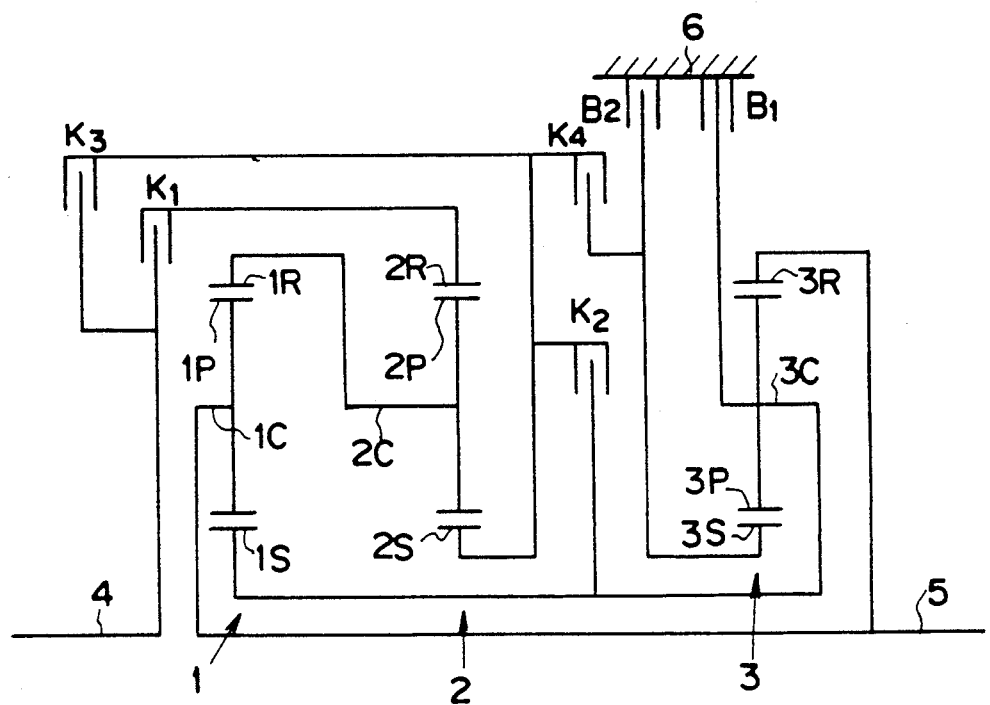
FIGS. 1 are skeleton diagrams showing the principle of em of the present invention.

Referring to FIG. 1, an automatic transmission in a first embodiment according to the present invention comprises a first planetary gear set 1 of a single-pinion type, a second planetary gear set 2 of a single-pinion type and a third planetary gear set 3 of a single-pinion type having, respectively, sun gears 1S, 2S and 3S, ring gears 1R, 2R and 3R, carriers 1C, 2C and 3C, and pinion gears 1P, 2P and 3P. The sun gears 1S, 2S and 3S are coaxial, respectively, with the ring gears 1R, 2R and 3R. The pinion gears 1P, 2P and 3P are in mesh, respectively, with the sun gear 1S and the ring gear 1R, the sun gear 2S and the ring gear 2R, and the sun gear 3S and the ring gear 3R. The ring gear 1R of the first planetary gear set 1 and the carrier 2C of the second planetary gear set 2 are integrally connected to each other. The carrier 1C of the first planetary gear set 1 and the ring gear 3R of the third planetary gear set 3 are integrally connected to each other. The sun gear 1S of the first planetary gear set 1 and the carrier 3C of the third planetary gear set 3 are integrally connected to each other. Between the sun gear 2S of the second planetary gear set 2 and the sun gear 3S of the third planetary gear set 3, a fourth clutch unit K4 is interposed to connect these sun gears S and 3S selectively. Between the sun gear 2S of the second planetary gear set 2 and the carrier 3C of the third planetary gear set 3, a second clutch unit K2 is disposed to connect these sun gear 2S and carrier 3C selectively.

Connecting structures for connecting those components may be such as employed generally in conventional automatic transmissions, including quill shafts, solid shafts and/or connecting drums.

An input shaft 4 is connected through power transmitting means, not shown, such as a torque converter or a fluid coupling, to an engine, not shown. A first clutch unit K1 connects the input shaft 4 selectively to the ring gear 2R of the second planetary gear set 2, and a third clutch unit K3 connects the input shaft 4 selectively to the sun gear 2S of the second planetary gear set 2.

The clutch units K1, K2, K3 and K4 can include multi-disc clutches or brakes which are adapted to be engaged or released by hydraulic servo mechanism used in conventional automatic transmission and can include one-way clutches or series or parallel arrangements each of a one-way clutch and a wet multi-disc clutch. In practical application, since there are restrictions on the disposition of the component members, naturally, the clutch units K1, K2, K3 and K4 may be connected to the associated components by suitable intermediate members, such as connecting drums.

A first brake unit B1 is interposed between a transmission casing (hereinafter, referred to simply as "casing") 6 and the carrier 3C of the third planetary gear set 3 to hold selectively the sun gear 1S of the first planetary gear drive 1 and the carrier 3C of the third planetary gear set 3, which are connected to each other. A second brake unit B2 is interposed between the sun gear 3S of the third planetary gear set 3 and the casing 6 to hold selectively the sun gear 3S. The first and second brake units B1 and B2 can include multi-disc brakes which are operated by hydraulic servomechanisms employed generally in the conventional automatic transmission, band brakes, one-way clutches or combinations of those mechanisms. Naturally, in practical application, suitable connecting members may be provided between the brake units B1 and B2 and the associated components to be held by the brake units B1 and B2 or between the brake units B1 and B2, and the casing 6.

An output shaft 5 for rotatively driving a propeller shaft or a counter gear is connected to the carrier 1C of the first planetary gear set 1 and the ring gear 3R of the third planetary gear set 3, which are connected to each other.

The input shaft 4 and the output shaft 5 are coaxial, and the first planetary gear set 1, the second planetary gear set 2 and the third planetary gear set 3 are arranged coaxially in that order from the side of the input shaft 4 to the side of the output shaft 5.

The automatic transmission thus constructed is able to provide five forward speeds and one reverse speed or to provide seven forward speeds and one reverse speed by selectively operating the clutch units K1, K2, K3 and K4 and the brake units B1 and B2 in combination as shown in Table 1. Also shown in Table 1 are formulas of calculating the gear ratios and concrete gear ratios, respectively, for the gears, in which the respective gear ratios $\rho 1$, $\rho 2$ and $\rho 3$ of the planetary gear sets 1, 2 and 3 are, respectively, 0.298, 0.456 and 0.365. In Table 1, blank circles indicate engagement and crosses (x) indicate disengagement. The operation of the automatic transmission for providing the five forward speeds and the reverse speed will be described first, and then the operation of the same for providing the additional two forward speeds will be described.

TABLE 1

| | Clutch Unit | | | | Brake Unit | | Gear Ratio | |
|---|---|---|---|---|---|---|---|---|
| | K1 | K2 | K3 | K4 | B1 | B2 | ($\rho 1 = 0.398, \rho 2 = 0.456, \rho 3 = 0.365$) | |
| 1st | O | X | X | O | O | X | $1 + \rho 1 + \dfrac{\rho 2 (1 + \rho 3 + \rho 1 \rho 3)}{\rho 3}$ | 3.285 |
| 2nd | O | O | X | X | O | X | $(1 + \rho 1)(1 + \rho 2)$ | 2.035 |
| 3rd | O | X | O | X | O | X | $1 + \rho 1$ | 1.398 |
| 4th | * | * | * | * | X | X | 1 | 1.000 |
| 5th | X | O | O | X | X | O | $1/(1 + \rho 3)$ | 0.733 |
| Rev | X | X | O | O | O | X | $-1/\rho 3$ | −2.740 |
| 2.5th | O | X | X | O | X | O | $\dfrac{(1 + \rho 2)(1 + \rho 3 + \rho 1 \rho 3)}{1 + \rho 3}$ | 1.611 |

TABLE 1-continued

| | Clutch Unit | | | | Brake Unit | | Gear Ratio | |
|---|---|---|---|---|---|---|---|---|
| | K1 | K2 | K3 | K4 | B1 | B2 | ($p1 = 0.398, p2 = 0.456, p3 = 0.365$) | |
| 3.5th | O | X | O | X | X | O | $(1 + p3 + p1 + p3)/(1 + p3)$ | 1.106 |

*At least three clutch units are engaged.

First Gear

The first clutch unit K1, the fourth clutch unit K4 and the first brake unit B1 are engaged to connect the ring gear 2R of the second planetary gear set 2 to the input shaft 4, to connect the sun gear 2S of the second planetary gear set 2 and the sun gear 3S of the third planetary gear set 3 by the fourth clutch unit K4 and to fix the sun gear 1S of the first planetary gear set 1 and the carrier 3C of the third planetary gear set 3 connected to the sun gear 1S. Accordingly, the ring gear 2R of the second planetary gear set 2 rotates together with the input shaft 4, the carrier 2C rotates in the normal direction, namely, the direction of rotation of the input shaft 4, and the sun gear 2S rotates in the reverse direction, namely, the direction opposite to the direction of rotation of the input shaft 4. Consequently, the carrier 1C of the first planetary set 1 rotates in the normal direction at a rotating speed lower than that of the ring gear 1R because the ring gear 1R of the first planetary gear set 1 is connected to the carrier 2C of the second planetary gear set 2 and the sun gear 1S is fixed. In the third planetary gear set 3, the ring gear 3R rotates in the normal direction because the sun gear 3S is connected to the sun gear 2S of the second planetary gear set 2. Thus, the output shaft 5 connected to the carrier 1C of the first planetary gear set 1 and the ring gear 3R of the third planetary gear set 3 rotates, together with the carrier 1C and the ring gear 3R, in the normal direction at a reduced rotating speed. In this state, the automatic transmission is placed in the first forward gear, which is the greatest transmission gear ratios among the forward gears. The gear ratio of first forward gear is expressed by:

$$(1+p1)+p2(1+p3+p1\cdot p3)/p3$$

An actual value of the gear ratio at the first gear, for example, is 3.285, when the planetary gear sets 1, 2 and 3 have gear ratios shown in Table 1. In this state, power circulation does not occur.

Second Gear

The first clutch unit K1, the second clutch unit K2 and the first brake unit B1 are engaged; that is, in the state for the first forward gear, the fourth clutch unit K4 is disengaged and the second clutch unit K2 is engaged. In this state, although the sun gear 2S of the second planetary gear set 2 is connected to the sun gear 1S of the first planetary gear set 1 and the carrier 3C of the third planetary gear set 3 by the second clutch unit K2, the second clutch unit K2 acts substantially as a brake together with the first brake unit B1 to fix the sun gear 2S of the second planetary gear set 2, because the sun gear 1S of the first planetary gear set 1 and the carrier 3C of the third planetary gear set 3 are fixed by the first brake unit B1. Accordingly, in the second planetary gear set 2, the carrier 2C rotates in the normal direction at a reduced rotating speed as compared with the rotating speed of the input shaft 4 because the ring gear 2R rotates together with the input shaft 4 with the sun gear 2S fixed. The rotation of the carrier 2C is transmitted to the ring gear 1R of the first planetary gear set 1 to rotate the ring gear 1R in the normal direction at a low rotating speed with the sun gear 1S fixed, so that the carrier 1C rotates in the normal direction at a reduced speed as compared with the rotating speed of the ring gear 1R. Consequently, the output shaft 5 connected to the carrier 1C of the first planetary gear set 1 rotates in the normal direction at a reduced speed as compared with the rotating speed of the input shaft 4. In this state, the automatic transmission is placed in the second forward gear. Since the sun gear 3S of the third planetary gear set 3 is disconnected from both the sun gear 2S of the second planetary gear set 2 and the casing 6, the third planetary gear set 3 does not participate in the speed changing operation. The transmission gear ratio for the second gear is expressed, as shown in Table 1, by:

$$(1+p1)(1+p2)$$

An actual value of the gear ratio at the second gear is 2.035 under the condition as shown in Table 1. In this state, power circulation does not occur.

Third Gear

The first clutch unit K1, the third clutch unit K3 and the first brake unit B1 are engaged; that is, in the state for the second gear, the second clutch unit K2 is disengaged and the third clutch unit K3 is engaged to disconnect the sun gear 1S of the first planetary gear set 1 and the carrier 3C of the third planetary gear set 3 from the sun gear 2S of the second planetary gear set 2 and to disconnect the sun gear 2S of the second planetary gear set 2 and the sun gear 3S of the third planetary gear set 3. Since the ring gear 2R and the sun gear 2S of the second planetary gear set 2 rotates together with the input shaft 4, the second planetary gear set 2 rotates integrally in the normal direction at the rotating speed of the input shaft 4, and hence the ring gear 1R of the first planetary gear set 1 connected to the carrier 2C of the second planetary gear set 2 rotates in the normal direction at the rotating speed of the input shaft 4. In the first planetary gear set 1, the ring gear 1R rotates in the normal direction at the rotating speed of the input shaft 4 and the carrier 1C rotates at a reduced speed as compared with the rotating speed of the input shaft 4 because the sun gear 1S is fixed. Since the sun gear 3S of the third planetary gear set 3 is disconnected from both the casing 6 and the sun gear 2S of the second planetary gear set 2, the third planetary gear set 3 does not participate in the speed changing operation. Accordingly, in this state, only the first planetary gear set 1 participates in the speed changing operation to transmit the rotation of the input shaft 4 at a reduced rotating speed to the output shaft 5. The transmission gear ratio for the third gear is expressed by:

$$1+p1$$

Actual value of the gear ratio at third gear is 1.398 under the condition as shown in Table 1. In this state, power circulation does not occur.

Fourth Gear

At least three clutch units among the four clutch units K1, K2, K3 and K4 are engaged and the brake units B1 and B2 are disengaged; that is, in the state for the third gear, the first brake unit B1 is disengaged and the second clutch unit K2 or the fourth clutch unit K4 is engaged. When at least three clutch units, for example, the clutch units K1, K2 and K3 or the clutch units K1, K3 and K4, are engaged, all the components of the gear train, i.e., the first planetary gear set 1, the second planetary gear set 2 and the third planetary gear set 3, rotate integrally together with the input shaft 4 to transmit the rotation of the input shaft 4 without reducing the rotating speed to the output shaft 5. In this state, the transmission gear ratio is 1.000. The torque of the input shaft 4 can be transmitted to the output shaft 5 without entailing power circulation by, for example, engaging the first clutch unit K1, the second clutch unit K2 and the third clutch unit K3.

Fifth Gear

The second clutch unit K2 and the third clutch unit K3 and the second brake unit B2 are engaged; that is, in the state for the fourth gear in which the clutch units K1, K2 and K3 are engaged, the first clutch unit K1 is disengaged and the second brake unit B2 is engaged. Consequently, in the third planetary gear set 3, the carrier 3C rotates together with the input shaft 4 with the sun gear 3S fixed and hence the ring gear 3R rotates in the normal direction at an increased rotating speed as compared with the rotating speed of the input shaft 4. Since the ring gear 2R of the second planetary gear set 2 is disconnected from the input shaft 4, and the carrier 2C is connected to the ring gear 1R of the first planetary gear set 1, the first planetary gear set 1 and the second planetary gear set 2 do not participate in the speed changing operation. Accordingly, only the third planetary gear set 3 participate in the speed changing operation and transmits the rotation of the input shaft 4 at an increased rotating speed to the output shaft 5. The transmission gear ratio for the fifth gear is expressed by:

$$1/(1+\rho 3)$$

Actual value of the gear ratio at the fifth gear is 0.733 under the condition as shown in Table 1. In this state, power circulation does not occur.

Reverse Gear

The third clutch unit K3, the fourth clutch unit K4 and the first brake unit B1 are engaged to connect the sun gear 3S of the third planetary gear set 3 and the sun gear 2S of the second planetary gear set 2 to the input shaft 4 and to hold the carrier 3C of the third planetary gear set 3 and the sun gear 1S of the first planetary gear set 1. Since the carrier 2C of the second planetary gear set 2 is disconnected from the input shaft 4, in this state, similarly to the state for the fifth gear, the first planetary gear set 1 and the second planetary gear set 2 do not participate in the speed changing operation. Since the sun gear 3S of the third planetary gear set 3 rotates together with the input shaft 4 with the carrier 3C fixed, the ring gear 3R of the third planetary gear set 3 rotates in the reverse direction at a reduced speed as compared with the rotating speed of the input shaft 4. Substantially, only the third planetary gear set 3 places the automatic transmission in the reverse-speed and operates to reduce the rotating speed of the output shaft 5 and to reverse the rotating direction of the same. The transmission gear ratio in this state is expressed by:

$$-1/\rho 3$$

Actual value of the gear ratio at the reverse gear is $-2.740$ under the condition as shown in Table 1. In this state, power circulation does not occur.

As is obvious from the foregoing description, the automatic transmission shown in FIG. 1 can be placed in the five forward speeds, the sequence of which can be approximated by a geometric progression. Accordingly, the gear can be changed without entailing sharp drop in the driving force to secure satisfactory power performance of the vehicle. Furthermore, since the three single-pinion planetary gear sets 1, 2 and 3 are such as having moderate gear ratios in the range of 0.36 to 0.46 and hence capable of being formed in a compact construction, the automatic transmission can avoid to have large diameters. Gear changing operation can be achieved through a simple control operation for engaging one of the clutch units and the brake units and disengaging one of the rest of the clutch units and the brake units, namely, for operating two of the clutch units and the brake units, which is advantageous in reducing shocks attributable to gear changing operation. Furthermore, the elimination of power circulation enables highly efficient power transmission. The compact automatic transmission has excellent durability because the respective rotating speeds of the pinion gears relative to the corresponding carriers are comparatively low and torque loads on the clutch units and the brake units are comparatively small. The overdrive speed on the order of 0.733 improves the power performance, fuel consumption and noise level of the vehicle while the vehicle is running at a high running speed. The reverse gear on the order of 2.740 secures sufficient driving force. The coaxial arrangement of the input shaft and the output shaft makes the automatic transmission suitable for application to front-engine rear-wheel-drive vehicles.

The automatic transmission shown in FIG. 1 can be placed further in two additional gears, namely, a 2.5th gear between the second gear and the third gear, and a 3.5th gear between the third gear and the fourth gear shown in Table 1.

2.5th Gear

The first clutch unit K1, the fourth clutch unit K4 and the second brake unit B2 are engaged. Accordingly, the sun gear 3S of the third planetary gear set 3 and the sun gear 2S of the second planetary gear set 2 are fixed. In this state, the ring gear 2R of the second planetary gear set 2 rotates together with the input shaft 4 and hence the carrier 2C of the second planetary gear set 2 is rotated in the normal direction at a reduced rotating speed as compared with the rotating speed of the input shaft 4. Since the carrier 1C is connected to the ring gear 3R of the third planetary gear set 3 and to the output shaft 5, the sun gear 1S of the first planetary gear set 1 is connected to the carrier 3C of the third planetary gear set 3, and the sun gear 3S of the third planetary gear set 3 is held fixed, the sun gear 1S of the first planetary gear set 1 rotates in the normal direction at a rotating speed lower than that of the ring gear 1R, and the carrier 1C rotates in the normal direction at a rotating speed between those of the ring gear 1R and the sun gear 1S. In the third planetary gear set 3, the ring gear 3R rotates in the normal direction at a rotating speed lower than that of the input shaft 4, and the carrier 3C rotates in the normal direction at a rotating speed lower than that of the ring gear 3R. Thus, in this state, the first, second and third planetary gear sets 1, 2 and 3 cooperate for speed reducing operation to rotate the output shaft 5 at a reduced rotating speed lower than the rotating speed of the input shaft 4. As shown in Table 1, the transmission gear ratio for the 2.5th gear is expressed by:

$$(1+\rho 1)(1+\rho 3+\rho 1 \cdot \rho 3)/(1+\rho 3)$$

Actual value of the gear ratio at the 2.5th gear is 1.611 under the condition as shown in Table 1.

3.5th Gear

The first clutch unit K1, the third clutch unit K3 and the second brake unit B2 are engaged to connect the ring gear 2R and sun gear 2S of the second planetary gear set 2 to the input shaft 4 and to hold the sun gear 3S of the third planetary gear set 3. Then, the second planetary gear set 2 rotates in a unit together with the input shaft 4 in the normal direction at the same rotating speed as the input shaft 4 because the two components thereof rotate together with the input shaft 4. Consequently, the ring gear 1R of the first planetary gear set 1 is rotated in the normal direction at the rotating speed of the input shaft 4. The first planetary gear set 1 and the third planetary gear set 3 are in the same state as that for the 2.5th gear, and the components of the same rotate, respectively, at rotating speeds slightly higher than the corresponding speeds for the 2.5th gear. That is, the state of the automatic transmission for the 3.5th gear is the same as that for the 2.5th gear, except that all the components of the second planetary gear set 2 are rotated in a unit to nullify the speed reducing function of the second planetary gear set 2. The transmission gear ratio for the 3.5th gear is expressed by:

$$(1+\rho 3+\rho 1 \cdot \rho 3)/(1+\rho 3)$$

Actual value of the gear ratio at the 3.5th gear is 1.106 under the condition shown in Table 1.

In the automatic transmission shown in FIG. 1, the planetary gear sets 1, 2 and 3 are arranged in that order from the side of the input shaft 4, however, the order of arrangement of the planetary gear sets 1, 2 and is optional provided that the connecting relationship of the components of the planetary gear sets 1, 2 and 3 corresponds to the connecting relationship shown in FIG. 1. Modified configurations of the planetary gear sets 1, 2 and 3 are shown in FIGS. 2 to 4.

Figure 2:
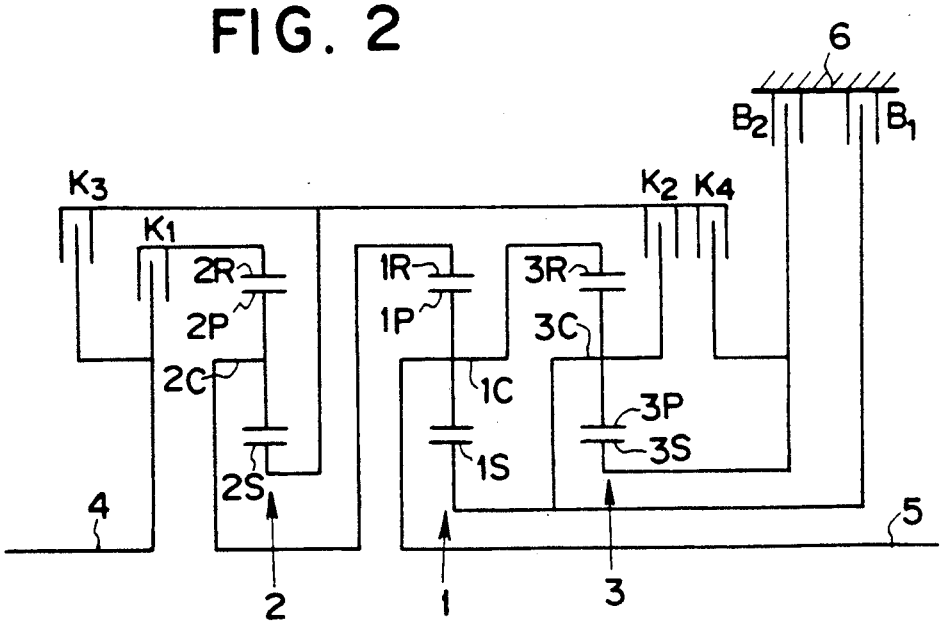
FIG. 2 is a table showing the respective operating conditions of clutch units and brake units in placing the automatic transmission.

In a configuration shown in FIG. 2, the second planetary gear set 2 is disposed nearest to the input shaft 4, and the first planetary gear set 1 and the third planetary gear set 3 are arranged in that order after the second planetary gear set 2; the first clutch unit K1 and the third clutch unit K3 are disposed on the side of the input shaft 4 with respect to the second planetary gear set 2; the clutch units K2 and K4 and the brake units B1 and B2 are disposed on the side of the output shaft 5 with respect to the third planetary gear set 3.

Figure 3:
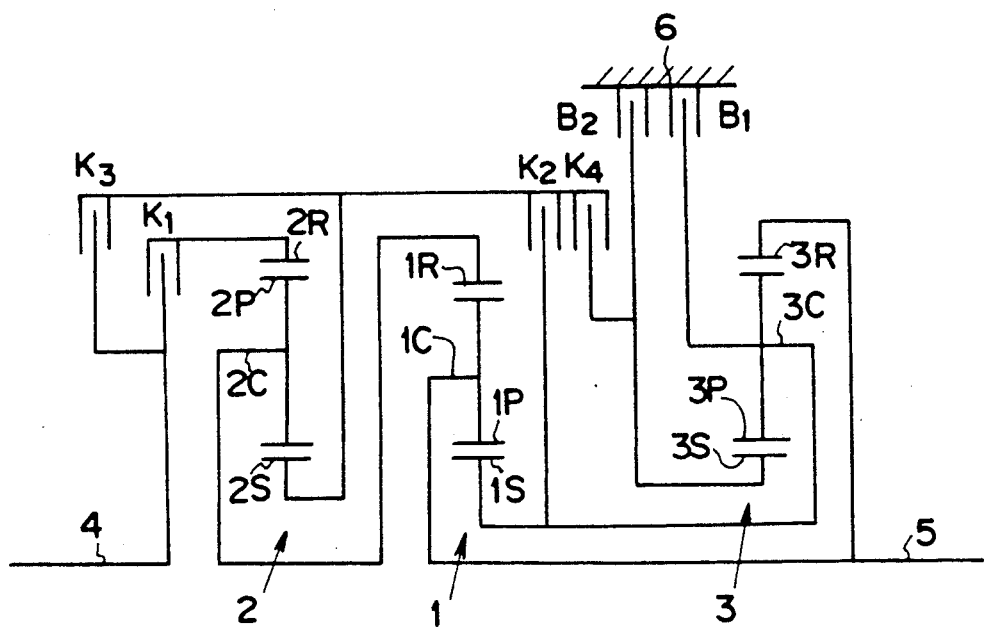

In a configuration shown in FIG. 3, the second planetary gear set 2, the first planetary gear set 1 and the third planetary gear set 3 are arranged in that order from the side of the input shaft 4; the second clutch unit K2, the fourth clutch unit K4 and the brake units B1 and B2 are disposed between the first planetary gear set 1 and the third planetary gear set 3.

Figure 4:
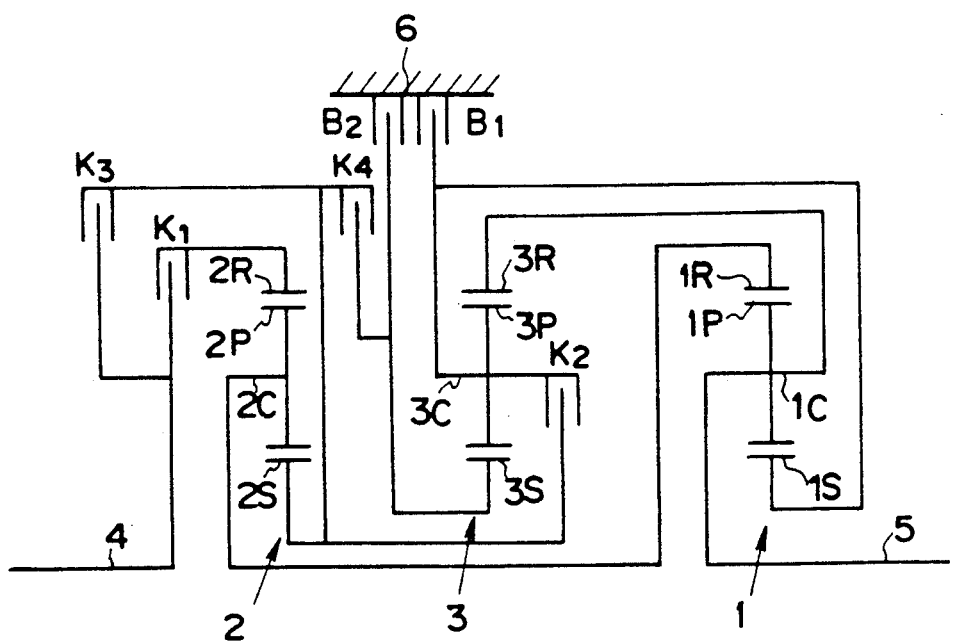

In a configuration shown in FIG. 4, the second planetary gear set 2, the third planetary gear set 3 and the first planetary gear set 1 are arranged in that order from the side of the input shaft 4; the fourth clutch unit K4 and the brake units B1 and B2 are disposed between the second planetary gear set 2 and the third planetary gear set 3; the second clutch unit K2 is disposed between the third planetary gear set 3 and the first planetary gear set 1.

Automatic transmissions respectively having the configurations shown in FIGS. 2, 3 and 4, similarly to the automatic transmission shown in FIG. 1, can be placed in five forward speeds and one reverse speed or in seven forward speeds including a 2.5th and 3.5th gear, and one reverse speed.

Figure 5:
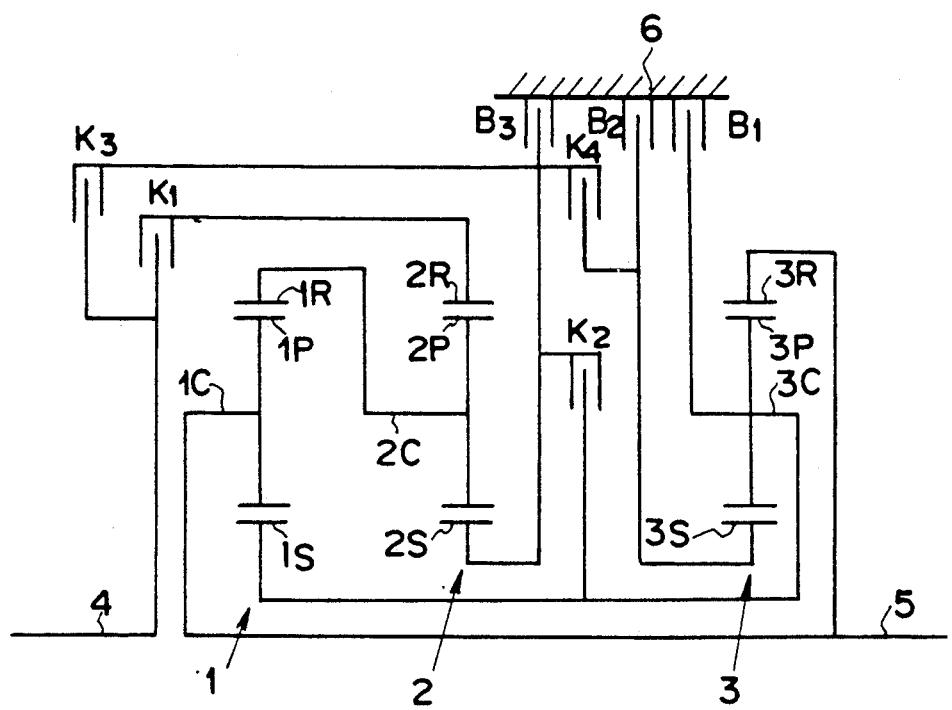

In placing the automatic transmission having any one of the configurations shown in FIGS. 1 to 4 in the second gear, the first brake unit B1 and the second clutch unit K2 are engaged to hold the sun gear 2S of the second planetary gear set 2, and hence a load acts on the second clutch unit K2. The load on the second clutch unit K2 can be removed by an additional brake unit for holding the sun gear 2S of the second planetary gear set 2 in placing the automatic transmission in the second gear. FIG. 5 shows an automatic transmission provided with an additional brake unit for such a purpose. The automatic transmission shown in FIG. 5 is constructed by additionally providing the automatic transmission of FIG. 1 with a third brake unit B3 between the sun gear 2S of the second planetary gear set 2 and the casing 6. Table 2 shows the respective operating conditions of the clutch units and brake units of the automatic transmission of FIG. 5. Further embodiments which will be described below also are capable of being placed in five or seven forward speeds and one reverse speed. In the following tables, a 2.5th gear and a 3.5th gear are auxiliary gears, while five forward gears and one reverse gear are basic gears. When seven forward speeds and one reverse speed are used, the 2.5th gear and the 3.5th gear correspond, respectively, to a third gear and a fifth gear. As is obvious from Table 2, in changing the transmission gear ratio of the automatic transmission of FIG. 5 from the first gear to the second gear and from the second gear to the third gear, the second clutch unit K2 is held disengaged and the third brake unit B3 is engaged or held disengaged, so that the gear changing operation can be achieved without using the second clutch unit K2.

TABLE 2

|  | Clutch Unit | | | | Brake Unit | | |
| --- | --- | --- | --- | --- | --- | --- | --- |
|  | K1 | K2 | K3 | K4 | B1 | B2 | B3 |
| 1st | O | x | x | O | O | x | x |
| 2nd | O | x* | x | x | O* | x | O* |
| 3rd | O | x | O | x | O | x | x |
| 4th | O*1 | O*1 | O*1 | O*1 | x | x | x |
| 5th | x | O | O | x | x | O | x |
| Rev | x | x | O | O | O | x | x |
| 2.5th | O | x | x | x*2 | x | O*2 | O*2 |

TABLE 2-continued

|  | Clutch Unit | | | | Brake Unit | | |
| --- | --- | --- | --- | --- | --- | --- | --- |
|  | K1 | K2 | K3 | K4 | B1 | B2 | B3 |
| 3.5th | O | x | O | x | x | O | x |

*At least two of them are engaged.
*[1] At least three of them are engaged.
*[2] At least two of the three are engaged.

Figure 6:
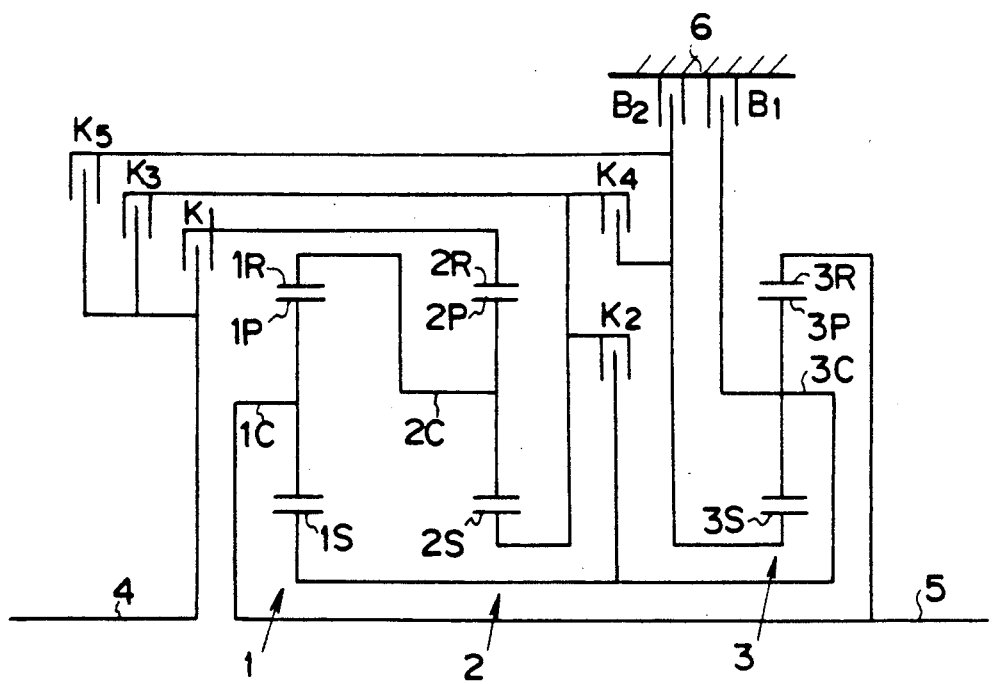

Although the sun gear 2S of the second planetary gear set 2 is connected to the input shaft 4 in placing each of the automatic transmissions shown in FIGS. 1 to 5 in the reverse speed, only the third planetary gear set 3 participates substantially in speed reducing operation. Accordingly, the present invention may be embodied in an automatic transmission as shown in FIG. 6. The automatic transmission shown in FIG. 6 is provided additionally with a fifth clutch unit K5 between the sun gear 3S of a third planetary gear set 3 and an input shaft 4 to connect the sun gear 3S of the third planetary gear set 3 directly to the input shaft 4. The operating conditions of the clutch units and brake units of the automatic transmission of FIG. 6 are shown in Table 3. The automatic transmission can be placed in five forward speeds and one reverse speed or in seven forward speeds and one reverse speed. When the automatic transmission is placed in the reverse speed, the rotating speed of the sun gear 2S of the second planetary gear set 2 and the rotating speed of the pinion gear relative to the carrier 2C are comparatively low, which is advantageous in respect of durability.

TABLE 3

|  | Clutch Unit | | | | | Brake Unit | |
| --- | --- | --- | --- | --- | --- | --- | --- |
|  | K1 | K2 | K3 | K4 | K5 | B1 | B2 |
| 1st | O | x | x | O | x | O | x |
| 2nd | O | O | x | x | x | O | x |
| 3rd | O | x | O | x | x | O | x |
| 4th | O *[1] | O *[1] | O *[1] | x *[1] | x *[1] | x | x |
| 5th | x | O | O | x | x | x | O |
| Rev | x *[2] | O *[2] | x *[2] | x *[2] | O *[2] | O | x |
| 2.5th | O | x | x | O | x | x | O |
| 3.5th | O | x | O | x | x | x | O |

*[1] K1 and at least two of the clutch units excluding K1, or at least two of K2, K3, K4, and K5 are engaged.
*[2] At least K5, K2 and K3 instead of K5, K1 and K5, K2, or K3 and K4 are engaged.

Although the foregoing automatic transmissions are provided each with three planetary gear sets, all the planetary gear sets do not participate in torque transmission at all times; some of the planetary gear sets is in idle rotation in some transmission gear ratio. When the automatic transmissions of FIGS. 1 to 6 are placed each in the third gear by engaging the first clutch unit K1, the third clutch unit K3 and the first brake unit B1, the second planetary gear set 2 rotates in a unit and the ring gear 3R of the third planetary gear set 3 rotates in the normal direction at a rotating speed lower than that of the input shaft 4 with the carrier 3C held fixed, so that the sun gear 3S of the third planetary gear set 3 rotates in the reverse direction, which increases the relative rotating speed of the sun gear 2S of the second planetary gear set 2 with respect to the sun gear 3S of the third planetary gear set 3, which, in some cases, is connected to the sun gear 2S of the second planetary gear set 2 by the fourth clutch unit K4. Accordingly, in connecting the sun gear 2S of the second planetary gear set 2 and the sun gear 3S of the third planetary gear set 3 by the fourth clutch unit K4, an increased relative rotating speed of th driving friction discs of the fourth clutch unit K4 with respect to the driven friction discs of the same increases drag loss and affect adversely to the durability of the fourth clutch unit K4. When an one-way clutch is employed as the fourth clutch unit K4, the relative rotating speed of the outer race with respect to the inner race increases when the automatic transmission is placed in the third gear, which is disadvantageous in respect of durability.

Figure 7:
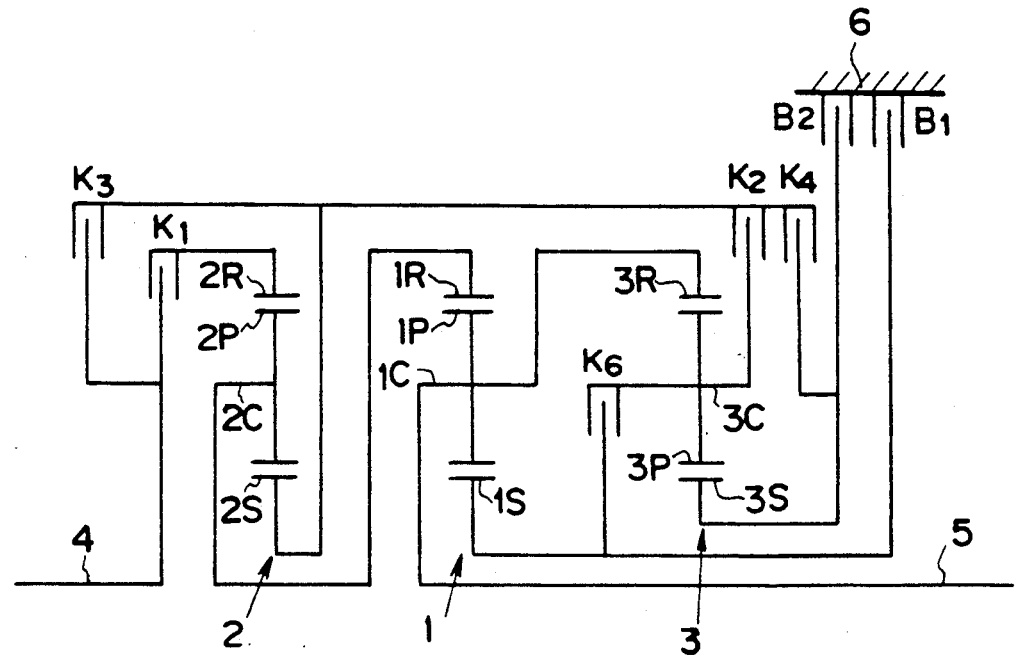
Figure 8:
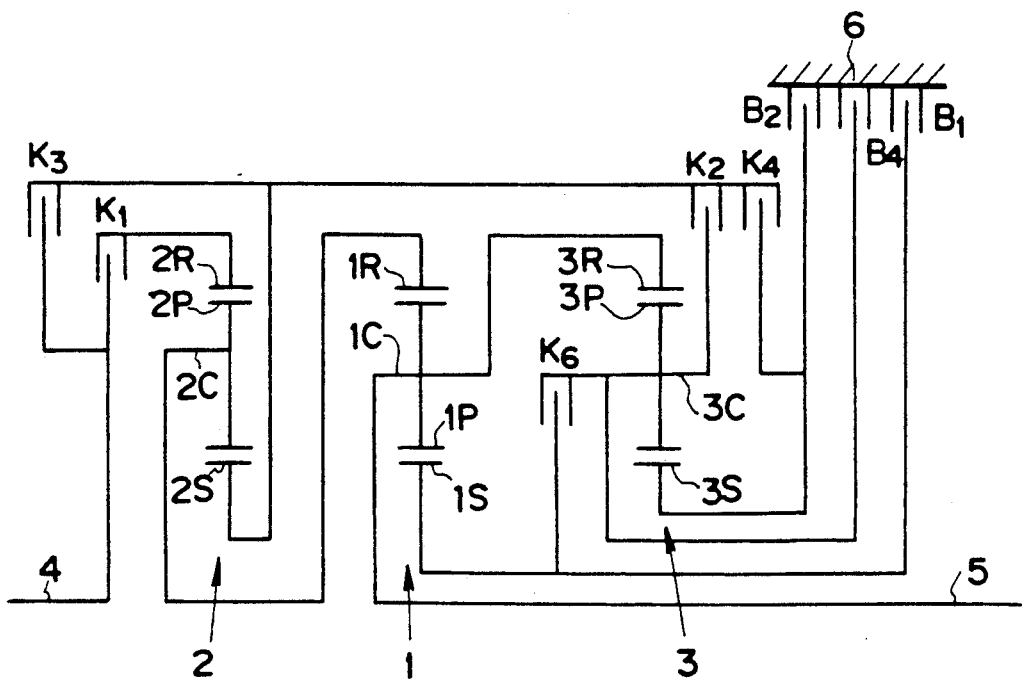
Figure 9:
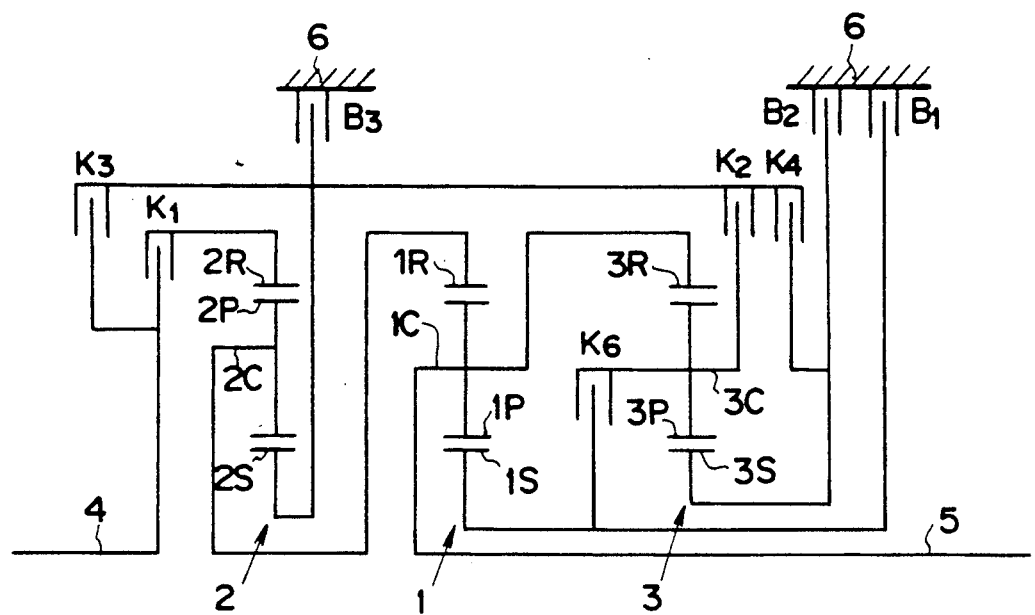

Automatic transmissions shown in FIGS. 7, 8 and 9 are provided additionally each with a sixth clutch unit K6 to rotate the sun gear 2S of the second planetary gear set 2 and the sun gear 3S of the third planetary gear set 3 at the same rotating speeds by disconnecting the carrier 3C of the third planetary gear set 3 and the sun gear 1S of the first planetary gear set 1 and connecting the sun gear 3S of the third planetary gear set 3 through the third clutch unit K3 and the fourth clutch unit K4 to the input shaft 4 in placing the automatic transmission in the third gear. In such a state, the relative rotating speed of the pinion gear of the third planetary gear set 3 with respect to the carrier 3C of the same can be reduced.

The automatic transmission of FIG. 7 is constructed by adding a sixth clutch unit K6 to the automatic transmission of FIG. 2. The sixth clutch K6 is disposed between the sun gear 1S of the first planetary gear set 1 and the carrier 3C of the third planetary gear set 3. The operating conditions of the clutch units and brakes of the automatic transmission of FIG. 7 are shown in Table 4.

TABLE 4

|  | Clutch Unit | | | | | Brake Unit | |
| --- | --- | --- | --- | --- | --- | --- | --- |
|  | K1 | K2 | K3 | K4 | K6 | B1 | B2 |
| 1st | O | x | x | O | O | O | x |
| 2nd | O | x* | x | O* | x* | O | O* |
| 3rd | O | x* | O | O* | x* | O | x* |
| 4th | O* | O* | O* | O* | O* | x* | x |
| 5th | x* | O | O | x | O* | x* | O |
| Rev | x | x | O | O | O | O | x |
| 2.5th | O | x | x | O | O | x | O |
| 3.5th | O | x | O | x | O | x | O |

*The clutch units and the brake units need not necessarily be operated as shown in this table; other combinations of operating conditions are possible for the gears. Other combinations are shown in FIG. 17.

The automatic transmission of FIG. 8 is constructed by adding a fourth brake unit B4 to the automatic transmission of FIG. 7. The fourth brake unit B4 is disposed between the carrier 3C of the third planetary gear set 3 and the casing 6 to restrain the carrier 3C from unnecessary rotation. The operating conditions of the clutch units and the brake units of the automatic transmission of FIG. 8 are shown in Table 5.

TABLE 5

|  | Clutch Unit | | | | | Brake Unit | | |
| --- | --- | --- | --- | --- | --- | --- | --- | --- |
|  | K1 | K2 | K3 | K4 | K6 | B1 | B2 | B4 |
| 1st | O | x | x | O | x* | O* | x | O* |
| 2nd | O | x* | x | O* | x* | O* | O* | x* |
| 3rd | O | x* | O | O* | x* | O* | x* | x* |
| 4th | O* | O* | O* | O* | O* | x* | x | x |
| 5th | x* | O | O | x | O* | x* | O | x |
| Rev | x* | x | O | O | x* | O* | x | O* |
| 2.5th | O | x | x | O | O | x | O | x |
| 3.5th | O | x | O | x | O | x | O | x |

*The clutch units and the brake units need not necessarily be operated as shown in this table; other combinations of operating conditions are possible for the gears. Other combinations are shown in FIG. 17.

The automatic transmission of FIG. 9 is constructed by adding a third brake unit B3 to the automatic transmission of FIG. 7. The third brake unit B3 is disposed between the sun gear 2S of the second planetary gear set 2 and the casing 6 to hold the sun gear 2S. The operating conditions of the clutch units and the brake units of the automatic transmission of FIG. 9 are shown in Table 6.

TABLE 6

| | Clutch Unit | | | | | Brake Unit | | |
|---|---|---|---|---|---|---|---|---|
| | K1 | K2 | K3 | K4 | K6 | B1 | B2 | B3 |
| 1st | O | x | x | O | O | O | x | x |
| 2nd | O | x* | x | x* | x* | O* | O* | O* |
| 3rd | O | x* | O | O* | x* | O | x* | x |
| 4th | O* | O* | O* | O* | O* | x* | x | x |
| 5th | x* | O | O | x | O* | x* | O | x |
| Rev | x | x | O | O | O | O | x | x |
| 2.5th | O | x | x | O*¹ | O | x | O*¹ | x*¹ |
| 3.5th | O | x | O | x | O | x | O | x |

*The clutch units and the brake units need not necessarily be operated as shown in this table; other combinations of operating conditions are possible for the gears. Other cominbations are shown in FIG. 17.
*¹At least two of these three are engaged.

According to the present invention, the clutch units and brake units of the foregoing automatic transmission can selectively used in combination, which will be described below.

Figure 10:
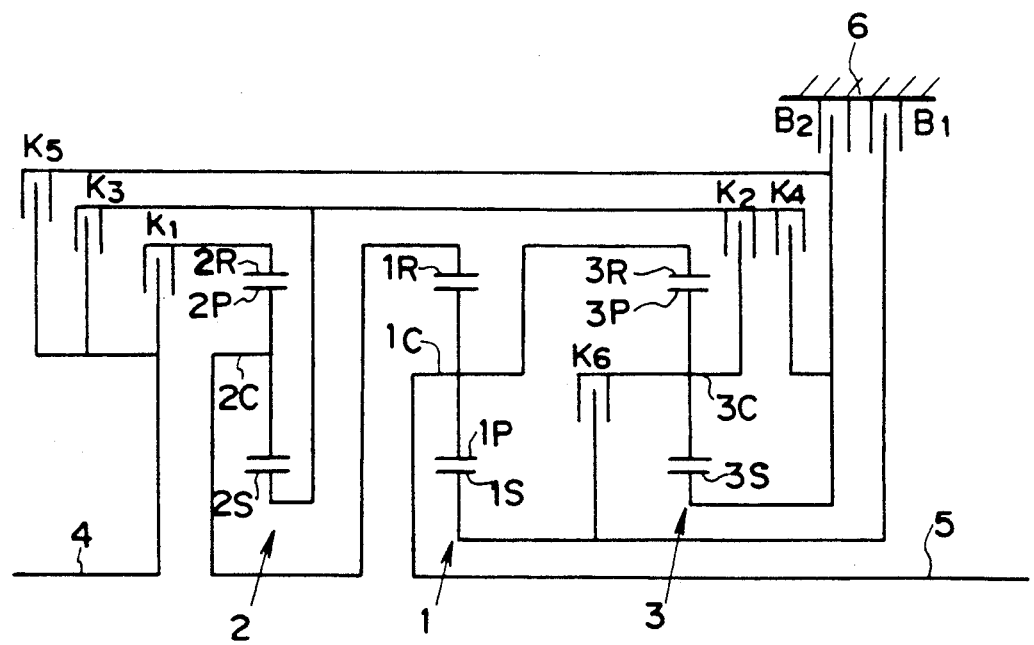

An automatic transmission of FIG. 10 is constructed by adding a fifth clutch unit K5 to the automatic transmission of FIG. 7 to connect the sun gear 3S of the third planetary gear set 3 to the input shaft 4. The operating conditions of the clutch units and brake units of the automatic transmission of FIG. 10 are shown in Table 7.

TABLE 7

| | Clutch Unit | | | | | | Brake Unit | |
|---|---|---|---|---|---|---|---|---|
| | K1 | K2 | K3 | K4 | K5 | K6 | B1 | B2 |
| 1st | O | x | x | O | x | O | O | x |
| 2nd | O | x* | x | O* | x | x* | O | O* |
| 3rd | O | x*¹ | O*¹ | x*¹ | O*¹ | x*¹ | O | x*¹ |
| 4th | O*² | O*² | O*² | O*² | O*² | O*² | x*² | x |
| 5th | x* | O | O | x | x | O* | x* | O |
| Rev | x*³ | O*³ | x*³ | x*³ | O*³ | O | O | x |
| 2.5th | O | x | x | O | x | O | x | O |
| 3.5th | O | x | O | x | x | O | x | O |

*The clutch units and the brake units need not necessarily be operated as shown in Table 7; other combinations of operating conditions are possible for the gears. Other combinations are shown in FIG. 17.
*¹K3 and any of the combination of K2, K4 and K6, K5, and B2 may be engaged or K3, K4 and K5 may be engaged.
*²K2, and at least two of K3, K4 and K5 are engaged when B1 is disengaged. B1 may be engaged when K1 and K6, and at least two of the rest of the clutch units are engaged, and three of K2, K3, K4 and K5 are engaged.
*³K5 may be engaged when K3 and K4 are engaged. K1, K2, or K3 and K4 may be engaged when K5 is engaged.

Figure 11:
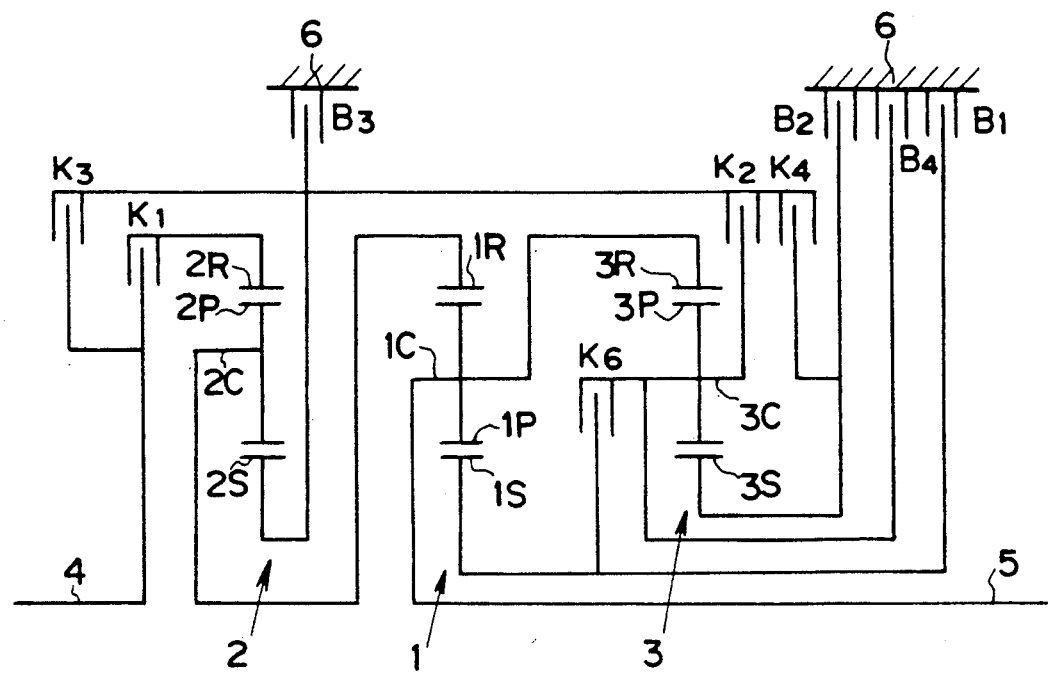

An automatic transmission of FIG. 11 is constructed by adding a third brake unit B3 to the automatic transmission of FIG. 8 or by adding a fourth brake unit B4 to the automatic transmission of FIG. 9. The third brake unit B3 or the fourth brake unit B4 holds selectively the sun gear 2S of the second planetary gear set 2 or the carrier 3C of the third planetary gear set 3. The operating conditions of the clutch units and brake units of the automatic transmission of FIG. 11 are shown in Table 8.

TABLE 8

| | Clutch Unit | | | | | Brake Unit | | | |
|---|---|---|---|---|---|---|---|---|---|
| | K1 | K2 | K3 | K4 | K6 | B1 | B2 | B3 | B4 |
| 1st | O | x | x | O | x* | O* | x | x | O* |
| 2nd | O | x* | x | x* | x* | O* | O* | O* | x* |
| 3rd | O | x* | O | O* | x* | O* | x* | x | x* |
| 4th | O* | O* | O* | O* | O* | x* | x | x | x |
| 5th | x* | O | O | x | O* | x* | O | x | x |
| Rev | x* | x | O | O | x* | O* | x | x | O* |
| 2.5th | O | x | x | O*¹ | O | x | x*¹ | O*¹ | x |
| 3.5th | O | x | O | x | O | x | O | x | x |

*The clutch units and the brake units need not necessarily be operated as shown in this table; other combinations of operating conditions are possible for the gears. Other combinations are shown in FIG. 17.
*¹At least two of these three are engaged.

Figure 12:
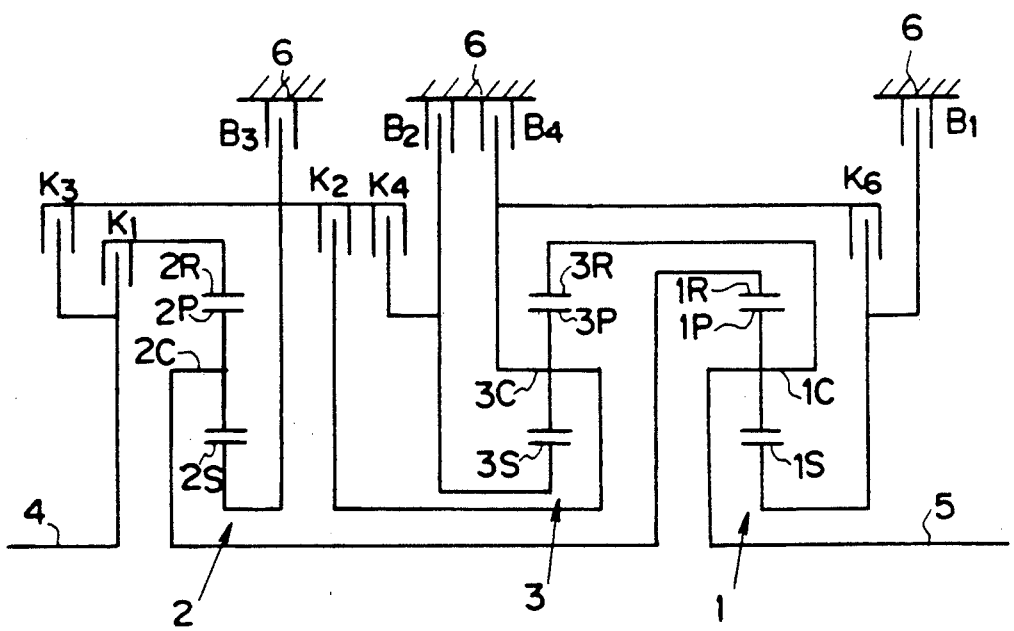

The components of the automatic transmission of FIG. 11 may be rearranged to provide an automatic transmission of FIG. 12. In the automatic transmission of FIG. 12, the second planetary gear set 2, the third planetary gear set 3 and the first planetary gear set 1 are arranged in that order from the side of the input shaft 4, the sixth clutch unit K6 is disposed outside the first planetary gear set 1, and at least the second clutch unit K2, the fourth clutch unit K4 and the second brake unit B2 are disposed between the second planetary gear set 2 and the third planetary gear set 3. This configuration mitigates restrictions on the outside diameters of the clutch units. Naturally, the operating conditions of the automatic transmission of FIG. 12 are the same as those shown in Table 8.

Figure 13:
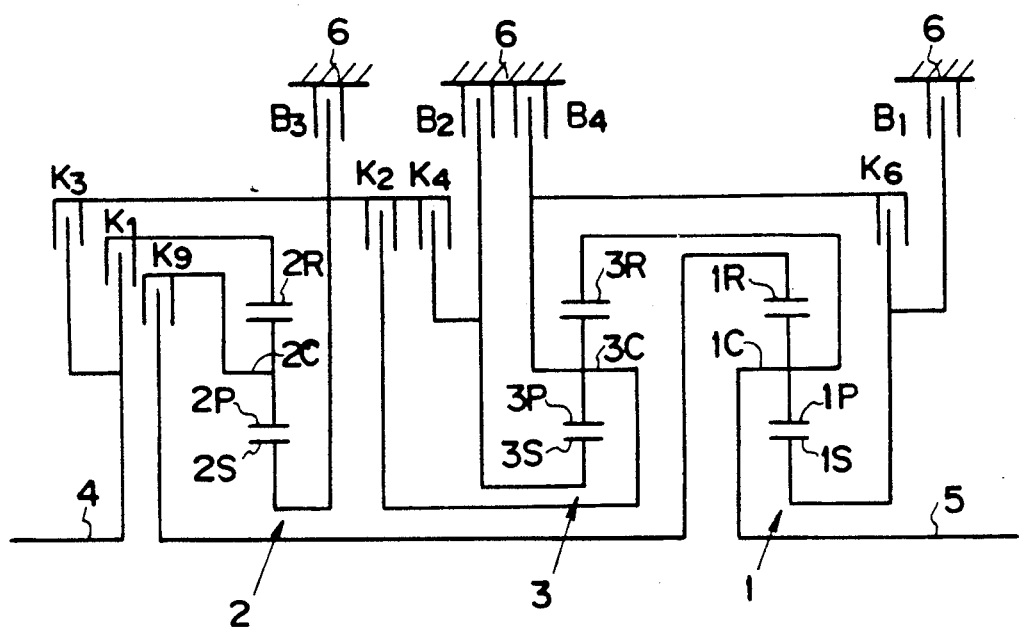

An automatic transmission of FIG. 13 is constructed by adding a ninth clutch unit K9 to the automatic transmission of FIG. 12. The ninth clutch unit K9 is disposed between the carrier 2C of the second planetary gear set 2 and the ring gear 1R of the first planetary gear set 1 to connect selectively the carrier 2C of the second planetary gear set 2 and the ring gear 1R of the first planetary gear set 1. The operating conditions of the clutch units and brake units of the automatic transmission of FIG. 13 are shown in Table 9.

TABLE 9

| | Clutch Unit | | | | | | Brake Unit | | | |
|---|---|---|---|---|---|---|---|---|---|---|
| | K1 | K2 | K3 | K4 | K6 | K9 | B1 | B2 | B3 | B4 |
| 1st | O | x | x | O | x* | O | O* | x | x | O* |
| 2nd | O | O*¹ | x | x*¹ | x*¹ | O | O*¹ | x*¹ | x*¹ | O*¹ |
| 3rd | O | x*¹ | O | O*¹ | x*¹ | O | O*¹ | x*¹ | x | x*¹ |
| 4th | O*¹ | O*¹ | O*¹ | O*¹ | O*¹ | O*¹ | x*¹ | x | x | x |
| 5th | O*¹ | O | O | x | x*¹ | x*¹ | x*¹ | O | x | x |
| Rev | O*¹ | x | O | O | O*¹ | x*¹ | O*¹ | x | x | x*¹ |
| 2.5th | O | x | x | O* | O | O | x | O* | x* | x |
| 3.5th | O | x | O | x | O | O | x | O | x | x |

*At least two of these three are engaged.
*¹The clutch units and the brake units need not necessarily be operated as shown in this table; other combinations of operating conditions are possible for the gears.

As is obvious from Table 9, the third brake unit B3 and the fourth brake unit B4 may be omitted and the functions of the same may be substituted by the functions of the rest of the brake units and the clutch units. It is also possible to omit the first clutch unit K1 and to fasten the ring gear 2R of the second planetary gear set 2 to the input shaft 4, because the first clutch unit K1 is engaged at all times.

Figure 14:
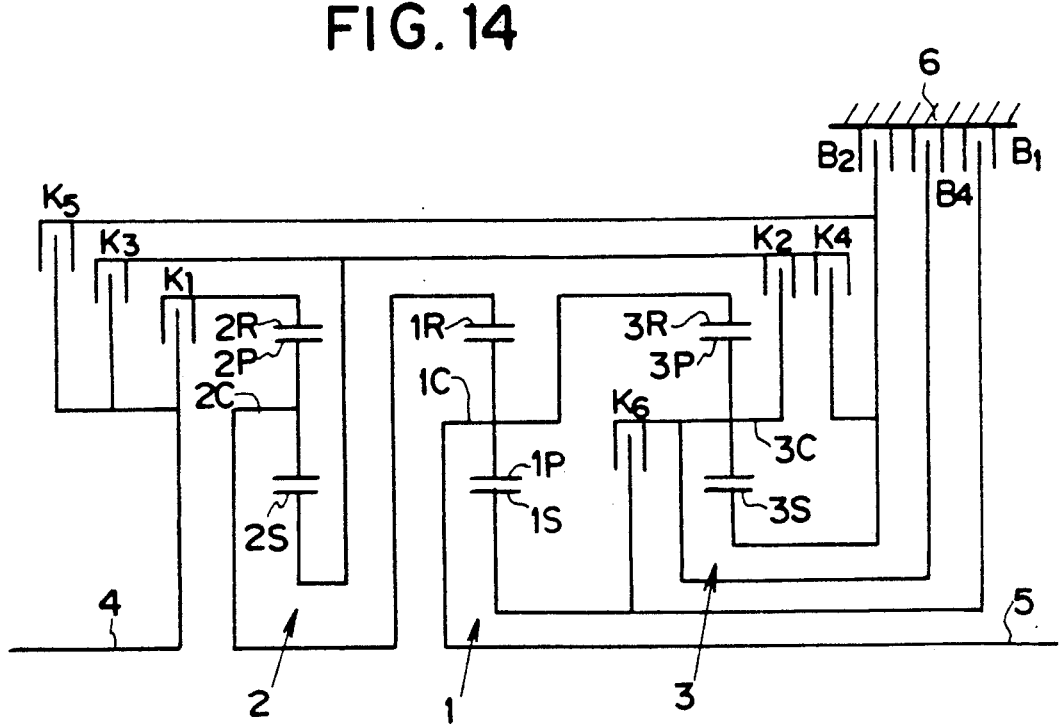

An automatic transmission of FIG. 14 is constructed by adding a fourth brake unit B4 to the automatic transmission of FIG. 10 to hold the carrier 3C of the third planetary gear set 3 selectively. The operating conditions of the clutch units and brake units of the automatic transmission of FIG. 14 are shown in Table 10.

TABLE 10

| | Clutch Unit | | | | | | Brake Unit | | |
|---|---|---|---|---|---|---|---|---|---|
| | K1 | K2 | K3 | K4 | K5 | K6 | B1 | B2 | B4 |
| 1st | O | X | X | O | X | X* | O* | X | O* |
| 2nd | O | X* | X | O* | X | X* | O* | O* | X* |
| 3rd | O | X* | O* | X* | O* | X* | O* | X* | X* |
| 4th | O* | O* | O* | O* | O* | O* | X* | X | X |
| 5th | X* | O | O | X | X | O* | X* | O | X |
| Rev | X* | O* | X* | X* | O* | X* | O* | X | O* |
| 2.5th | O | X | X | O | X | O | X | O | X |
| 3.5th | O | X | O | X | X | O | X | O | X |

*The clutch units and the brake units need not necessarily be operated as shown in this table; other combinations of operating conditions are possible for the gears.

Figure 15:
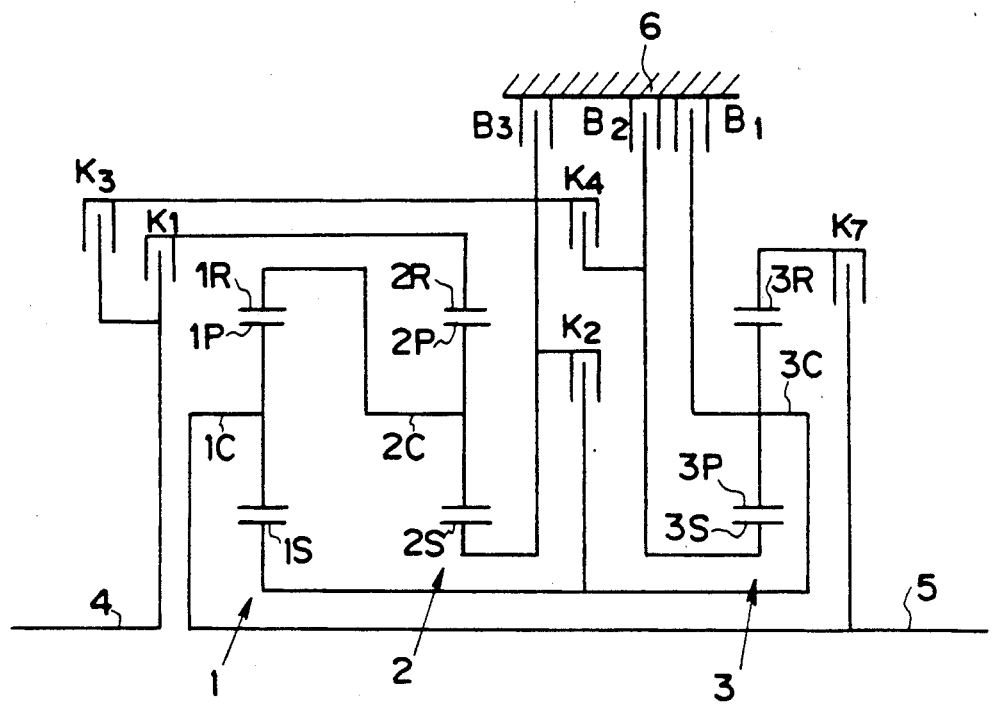

An automatic transmission of FIG. 15 is constructed by adding a seventh clutch unit K7 to the automatic transmission of FIG. 5 to connect selectively the ring gear 3R of the third planetary gear set 3 to the output shaft 5 connected to the carrier 1C of the first planetary gear set 1. The operating conditions of the clutch units and brake units of the automatic transmission of FIG. 15 are shown in Table 11.

TABLE 11

| | Clutch Unit | | | | | Brake Unit | | |
|---|---|---|---|---|---|---|---|---|
| | K1 | K2 | K3 | K4 | K7 | B1 | B2 | B3 |
| 1st | O | X | X | O | O | O | X | X |
| 2nd | O | X* | X | O* | X* | O* | X* | O* |
| 3rd | O | X*1 | O | O*1 | X*1 | O | X*1 | X |
| 4th | O*2 | O*2 | O*2 | O*2 | O*2 | X | X*2 | X |
| 5th | X*3 | O | O | X | O*3 | X | O | X |
| Rev | X*3 | X | O | O | O*3 | O | X | X |
| 2.5th | O | X | X | O*4 | O | X | O*4 | X*4 |
| 3.5th | O | X | O | X | O | X | O | X |

*The clutch units and the brake units need not necessarily be operated as shown in this table; other combinations of operating conditions are possible.
*1Any one of them may be engaged,
*2K4, K7 or B2 may be engaged when K1, K2 and K3 are engaged. At least two clutch units may be engaged when K4 and K7 are engaged.
*3Either of the two may be engaged.
*4At least two of the three may be engaged.

Figure 16:
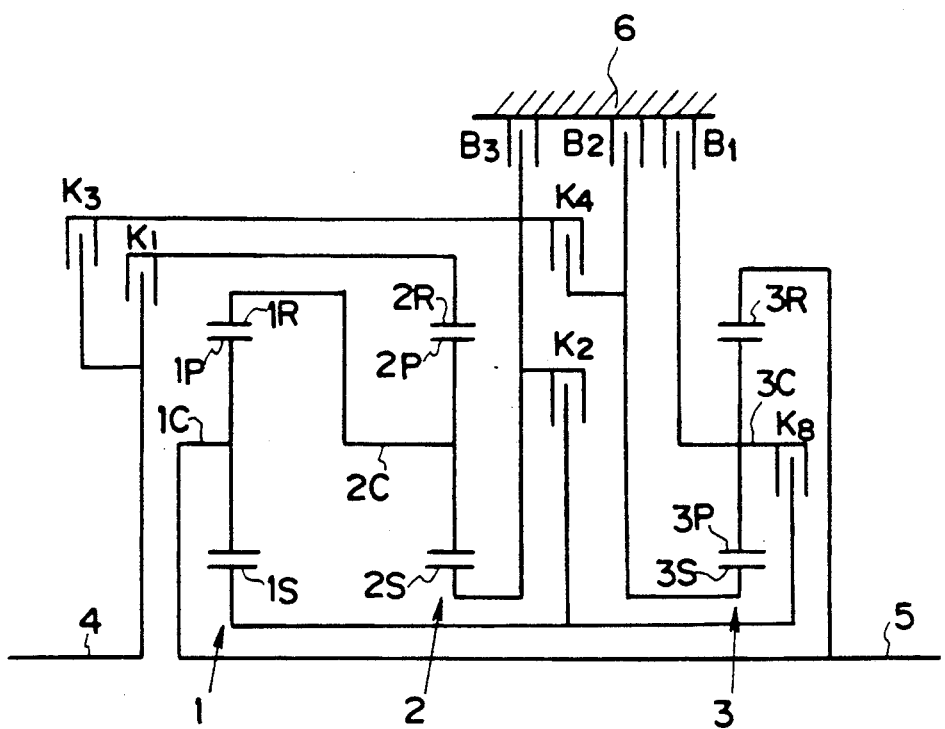

An automatic transmission of FIG. 16 is constructed by adding an eighth clutch unit K8 to the automatic transmission of FIG. 5 to connect selectively the sun gear 1S of the first planetary gear set 1 and the carrier 3C of the third planetary gear set 3. The operating conditions of the clutch units and brake units of the automatic transmission of FIG. 16 is shown in Table 12.

TABLE 12

| | Clutch Unit | | | | | Brake Unit | | |
|---|---|---|---|---|---|---|---|---|
| | K1 | K2 | K3 | K4 | K8 | B1 | B2 | B3 |
| 1st | O | X | X | O | O | O | X | X |
| 2nd | O | X* | X | O* | X* | O* | X* | O* |
| 3rd | O | X | O | X | O | O | X | X |
| 4th | O*1 | O*1 | O*1 | O*1 | O*1 | X | X*1 | X |
| 5th | X | O | O | X | O | X | O | X |
| Rev | X | X | O | O | O | O | X | X |
| 2.5th | O | X | X | O*2 | O | X | O*2 | X*2 |
| 3.5th | O | X | O | X | O | X | O | X |

*The clutch units and the brake units need not necessarily be operated as shown in this table; other combinations of operating conditions are possible.
*1K1, K2 and K3, and K4 or K8, or K1, K2, K3 and B2 may be engaged.
*2At least two of the three may be engaged.

The operating conditions of the clutch units and brake units of the automatic transmissions of FIGS. 11 and 12 for possible combinations of the clutch units and the brake units are tabulated collectively in FIG. 17, in which blank circles (O) indicates engagement, asterisks (*) indicate either engagement or disengagement, and blanks indicate disengagement.

As is obvious from FIG. 17, the first brake unit B1, the third brake unit B3 and the fourth brake unit B4 may be disengaged at all times for all the transmission gear ratios depending on the combination of the second brake unit B2 and the clutch units. Accordingly, one or two of the brake units B1, B3 and B4 may be omitted. The sixth clutch unit K6 may be engaged at all times depending on the combination of the brake units and the rest of the clutch units. Accordingly, the sun gear 1S of the first planetary gear set 1 and the carrier 3C of the third planetary gear set 3 may be connected permanently to omit the sixth clutch unit K6. Similarly, the ring gear 2R of the second planetary gear set 2 may be connected permanently to the input shaft 4 to omit the first clutch unit K1. It can readily be inferred from FIG. 17, that various modifications of the foregoing automatic transmissions of the present invention are possible.

Although the foregoing embodiments have been described as employing multi-disc clutches as the clutch units K1 to K9, and multi-disc brakes as the brake units B1 to B4, unidirectional engaging devices may be employed individually or in combination with the multi-disc clutches and multi-disc brakes to facilitate gear change control operation, to modurate shocks resulting from gear changing operation and to reduce the number of engaging means to be operated for gear changing operation. Such unidirectional engaging devices include generally known one-way clutches having rolling members, such as sprags, and band brakes having variable torque capacity varying according to the direction of load. The automatic change of the operating mode of unidirectional engaging devices according to the variation of the load torque modurates shocks resulting from gear changing operation. To enable the unidirectional engaging device to function properly, the components connected by the unidirectional engaging device must rotate at the same rotating speeds or both the components must be stopped immediately before gear changing operation, must rotate relative to each other after gear changing operation, and the components must be engaged in torque transmission before gear changing operation. The unidirectional engaging device may be disposed between the two components to be connected by the unidirectional engaging device or between two components connected by another component rotating in the same manner before gear changing operation. The position of the unidirectional engaging device is dependent on whether or not the automatic transmission is provided with the clutch unit (the sixth clutch unit K6 or the eighth clutch unit K8) for selectively connecting the sun gear 1S of the first planetary gear set 1 and the carrier 3C of the third planetary gear set 3 or dependent on gear changing patterns including a skip speed changing pattern for changing the transmission gear ratio from one gear to a gear other than the adjacent speed. Appropriate positions of unidirectional engaging devices in various configurations will be described hereinafter.

The disposition of unidirectional engaging means will be described with the configurations shown in FIGS. 1 to 6 and 15, in which the sun gear 1S of the first planetary gear set 1 and the carrier 3C of the third planetary gear set 3 are connected permanently and no clutch unit is provided between the same.

With gear change between the first gear and the second gear, a unidirectional engaging device, such as a one-way clutch, may be provided between the sun gear 2S of the second planetary gear set 2 and the sun gear 3S of the third planetary gear set 3. With gear change between the first gear and the 2.5th gear, a unidirectional engaging device may be provided at least between the carrier 3C of the third planetary gear set 3 and the casing 6 or between the sun gear 1S of the first planetary gear set 1 and the casing 6. With the gear change between the first gear and the third gear, a unidirectional engaging device may be provided between the sun gear 2S of the second planetary gear set 2 and the sun gear 3S of the third planetary gear set 3. With gear change between the first gear and the 3.5th gear, a unidirectional engaging device is provided at least between the sun gear 2S of the second planetary gear set 2 and the sun gear 3S of the third planetary gear set 3, between the carrier 3C of the third planetary gear set 3 and the casing 6 or between the sun gear 1S of the first planetary gear set 1 and the casing 6. In this case, the operating conditions of three or more engaging devices must be changed over simultaneously for gear changing operation in some gear changing pattern. With gear change between the first gear and the fourth gear, a unidirectional engaging device may be provided at leas either between the carrier 3C of the third planetary gear set 3 and the casing 6 or between the sun gear 1S of the first planetary gear set 1 and the casing 6. With gear change between the first gear and the fifth gear, a unidirectional engaging device may be provided at least between the sun gear 2S of the second planetary gear set 2 and the sun gear 3S of the third planetary gear set 3, between the carrier 3C of the third planetary gear set 3 and the casing 6, between the sun gear 1S of the first planetary gear set 1 and the casing 6 or between the ring gear 2R of the second planetary gear set 2 and the input shaft 4. In this case, the operating conditions of three or more engaging devices must be changed over simultaneously for gear changing operation in some gear changing pattern.

With gear change between the second gear and the 2.5th gear, a unidirectional engaging device may be provided at least either between the sun gear 2S of the second planetary gear set 2 and the sun gear 1S of the first planetary gear set 1 or between the sun gear 1S of the first planetary gear set 1 and the casing 6. With gear change between the second gear and the third gear, a unidirectional engaging device may be provided at least either between the sun gear 2S of the second planetary gear set 2 and the sun gear 1S of the first planetary gear set 1 or between the sun gear 2S of the second planetary gear set 2 and the casing 6. With gear change between the second gear and the 3.5th gear, a unidirectional engaging device may be provided at least between the sun gear 2S of the second planetary gear set 2 and the sun gear 1S of the first planetary gear set 1, between the sun gear 2S of the second planetary gear set 2 and the casing 6 or between the sun gear 1S of the first planetary gear set 1 and the casing 6. In this case also, the operating conditions of three or more engaging devices must be changed over simultaneously for gear change in some gear changing pattern. With gear change between the second gear and the fourth gear, a unidirectional engaging device may be provided at least either between the sun gear 2S of the second planetary gear set 2 and the casing 6 or between the sun gear 1S of the first planetary gear set 1 and the casing 6. With gear change between the second gear and the fifth gear, a unidirectional engaging device may be provided at least between the sun gear 2S of the second planetary gear set 2 and the casing 6, between the sun gear 1S of the first planetary gear set 1 and the casing 6 or between the ring gear 2R of the second planetary gear set 2 and the input shaft 4. In this case also, the operating conditions of three or more engaging devices must be changed over simultaneously for gear change in some gear changing pattern.

With gear change between the 2.5th gear and the third gear, a unidirectional engaging device may be provided at least between the sun gear 2S of the second planetary gear set 2 and the sun gear 3S of the third planetary gear set 3, between the sun gear 2S of the second planetary gear set 2 and the casing 6 or between the sun gear 3S of the third planetary gear set 3 and the casing 6. In this case, the operating conditions of three or more engaging devices must be changed over simultaneously for gear change in some gear changing pattern. With gear change between the 2.5th gear and the 3.5th gear, a unidirectional engaging device may be provided at least either between the sun gear 2S of the second planetary gear set 2 and the sun gear 3S of the third planetary gear set 3 or between the sun gear 2S of the second planetary gear set 2 and the casing 6. With gear change between the 2.5th gear and the fourth forward gear, a unidirectional engaging device may be provided at least either between the sun gear 2S of the second planetary gear set 2 and the casing 6 or between the sun gear 3S of the third planetary gear set 3 and the casing 6. With gear change between the 2.5th gear and the fifth gear, a unidirectional engaging device may be provided at least between the sun gear 2S of the second planetary gear set 2 and the sun gear 3 of the third planetary gear set 3, between the sun gear 2S of the second planetary gear set 2 and the casing 6 or between the ring gear 2R of the second planetary gear set 2 and the input shaft 4. In this case, the operating conditions of three or more engaging devices must be changed over simultaneously for gear change in some gear changing pattern.

With gear change between the third gear and the 3.5th gear, and between the third gear and the fourth gear, a unidirectional engaging device may be provided between the sun gear 1S of the first planetary gear set 1 and the casing 6. With gear change between the third gear and the fifth gear, a unidirectional engaging device may be provided at least between the sun gear 2S of the second planetary gear set 2 and the carrier 2C or ring gear 2R of the second planetary gear set 2 or the ring gear 1R of the first planetary gear set 1, between the input shaft 4 and the carrier 2C or ring gear 2R of the second planetary gear set 2 or the ring gear 1R of the first planetary gear set 1 or between the sun gear 1S of the first planetary gear set 1 and the casing 6. In this case, the operating conditions of three or more engaging devices must be changed over simultaneously for gear change in some gear changing pattern.

With gear change between the 3.5th gear and the fourth forward gear, a unidirectional engaging device may be provided between the sun gear 3S of the third planetary gear set 3 and the casing 6. With gear change between the 3.5th gear and the fifth gear, a unidirectional engaging device may be provided at least either between the sun gear 2S of the second planetary gear set 2 and carrier 2C or ring gear 2R of the second planetary gear set 2 or the ring gear 1R of the first planetary gear set 1 or between the input shaft 4 and the carrier 2C or ring gear 2R of the second planetary gear set 2 or the ring gear 1R of the first planetary gear set 1.

With gear change between the fourth gear and the fifth gear, unidirectional engages may be provided in connection with the three components of each of the planetary gear sets 1, 2 and 3, because the gear train rotates in a unit. That is, with the sun gear 2S of the second planetary gear set 2, a unidirectional engaging unit may be provided between the sun gear 2S, and the carrier 2C and ring gear 2R of the second planetary gear set 2, the sun gear 3S and ring gear 3R of the third planetary gear set 3 or the carrier 1C and ring gear 1R of the first planetary gear set 1. With the carrier 2C of the second planetary gear set 2, a unidirectional engaging unit may be provided between the carrier 2C, and any one of the components including the input shaft 4 except the ring gear 1R of the first planetary gear set 1 and the casing 6. With the ring gear 2R of the second planetary gear set 2 or the sun gear 3S of the third planetary gear set 3, a unidirectional engaging device may be provided between the ring gear 2R or the sun gear 3S and any one of the rest of the components including the input shaft 4. With the carrier 3C of the third planetary gear set 3, a unidirectional engaging device may be provided between the carrier 3C, and the carrier 2C and ring gear 2R of the second planetary gear set 2, the sun gear 3S and ring gear 3R of the third planetary gear set 3 or the carrier 1C and ring gear 1R of the first planetary gear set 1. With the ring gear 3R of the third planetary gear set 3, a unidirectional engaging device may be provided between the ring gear 3R and any one of the components including the input shaft 4 except the casing 6 and the carrier 1C of the first planetary gear set 1. With the sun gear 1S of the first planetary gear set 1, a unidirectional engaging device may be provided between the sun gear 1S, and the carrier 2C and ring gear 1R of the first planetary gear set 1, the carrier 2C and ring gear 2R of the second planetary gear set 2 or the carrier 1C and ring gear 1R of the first planetary gear set 1. With the carrier 1C of the first planetary gear set 1, a unidirectional engaging device may be provided between the carrier 1C and any one of the components including the input shaft 4 except the ring gear 3R of the third planetary gear set 3 and the casing 6. With the ring gear 1R of the first planetary gear set 1, a unidirectional engaging device may be provided between the ring gear 1R and any one of the components including the input shaft except the carrier 2C of the second planetary gear set 2 and the casing 6.

Manner of providing the automatic transmission each provided with a clutch unit for selectively connecting the sun gear 1S of the first planetary gear set 1 and the carrier 3C of the third planetary gear set 3 as shown in FIGS. 7 to 13 and 16 will be described hereinafter. In such a configuration including the clutch unit for such a purpose, the sun gear 1S of the first planetary gear set 1 and the carrier 3C of the third planetary gear set 3 can selectively be connected or disconnected, and hence the carrier 3C of the third planetary gear set 3 can individually be held fixed and the operative relation between the sun gears 1S, 2S and 3S of the planetary gear sets 1, 2 and 3 can optionally be changed. Therefore, this configuration differs from configurations not including the sixth clutch unit K6 or the eighth clutch unit K8 in whether or not a unidirectional engaging device can be provided between the carrier 3C of the third planetary gear set 3 and in whether or not a unidirectional engaging device can be provided between the sun gears 1S, 2S and 3S. Accordingly, only manners of disposition of unidirectional engaging devices different from those of the unidirectional engaging devices for the foregoing speed changing patterns will be described and the description of manners of disposition the same as those described above will be omitted to avoid duplication.

With gear change between the first gear and the second gear and between the first gear and the third gear, a unidirectional engaging means may be provided at a position, as well as the position specified above, either between the carrier 3C of the third planetary gear set 3 and the sun gear 1S of the first planetary gear set 1 or between the carrier 3C of the third planetary gear set 3 and the casing 6. With gear change between the first gear and the fourth gear and between the first gear and the fifth forward gear, a unidirectional engaging device may be provided at a position, as well as the position specified above, between the carrier 3C of the third planetary gear set 3 and the sun gear 1S of the first planetary gear set 1.

With gear change between the second gear and the fifth gear, a unidirectional engaging device may be provided between the sun gear 1S of the first planetary gear set 1 and the sun gear 2S of the second planetary gear set 2.

With gear change between the 2.5th gear and the fourth gear, a unidirectional engaging device may be provided between the sun gear 2S of the second planetary gear set 2 and the sun gear 3S of the third planetary gear set 3.

With gear change between the fourth gear and the fifth gear, a unidirectional engaging device may be provided at a position, as well as the position specified above, between the sun gear 1S of the first planetary gear set 1 and the sun gear 2s of the second planetary gear set 2, between the sun gear 1S of the first planetary gear set 1 and the carrier 3C of the third planetary gear set 3 or between the sun gear 1S of the first planetary gear set 1 and the input shaft 4.

Thus, when necessary, unidirectional engaging devices may be provided at various positions to ensure smooth gear changing operation. However, for smooth gear change between the adjacent forward gears among the basic forward gears, i.e., first gear to the fifth gear, unidirectional engaging devices may be provided between the sun gear 2S of the second planetary gear set 2 and the sun gear 3S of the third planetary gear set 3, between the sun gear 1S of the first planetary gear set 1 and the sun gear 2S of the second planetary gear set 2 or between the sun gear 2S of the second planetary gear set 2 and the casing 6, and between the sun gear 1S of the first planetary gear set 1 and the casing 6, between the sun gear 2S of the second planetary gear set 2 and the sun gear 3S of the third planetary gear set 3 or between the ring gear 2R of the second planetary gear set 2 and the input shaft 4 regardless of whether or not the automatic transmission is provided with the sixth clutch unit K6 or the eighth clutch unit K8.

Unidirectional engaging devices may be incorporated into the automatic transmission by a manner described and illustrated in the specification and appended drawings for Japanese Patent Application No. 63-176270 or 63-221670 submitted previously by the applicant of the present patent application.

Figure 18:
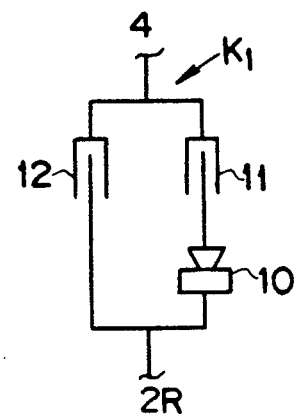
FIG. 18 a diagrammatic illustration of a first clutch unit consisting of a one-way clutch and a multi-disc clutch.

For example, as shown in FIG. 18, the first clutch unit K1 may comprise a series arrangement of a one-way clutch 10 capable of transmitting only the torque of the input shaft 4 acting in the normal direction on the ring gear 2R of the second planetary gear set 2, and a multi-disc clutch 11, and a multi-disc clutch 12 connected in parallel relationship to the series arrangement of the one-way clutch 10 and the multi-disc clutch 11. The first clutch unit K1 is engaged or disengaged in gear changing operation between the fourth gear and the fifth gear or between the third gear and the fourth gear or while the automatic transmission is placed in the fourth gear. During such gear changing operation for up-shifting, the rotating speed of the ring gear 2R of the second planetary gear set 2 coincides with or exceeds the rotating speed of the input shaft 4 and, for down-shifting, the rotating speed of the ring gear 2R of the second planetary gear set 2 coincides with or drops below the rotating speed of the input shaft 4. Accordingly, even if the multi-disc clutch 11 connected in series to the one-way clutch 0 is engaged and the multi-disc clutch 12 connected in parallel relationship to the series arrangement of the one-way clutch 10 and the multi-disc clutch 11 is disengaged, the one-way clutch 10 remains engaged in gear changing operation between the third gear and the fourth gear or the one-way clutch 10 remains engaged or disengaged in gear changing operation between the fourth gear and the fifth gear, so that the gear changing operation is achieved. Since the ring gear 2R of the second planetary gear set 2 rotates in the reverse direction when the automatic transmission is placed in the reverse gear, the multi-disc clutch 11 is connected in series relationship to the one-way clutch 10.

Figures 19A, 19B:
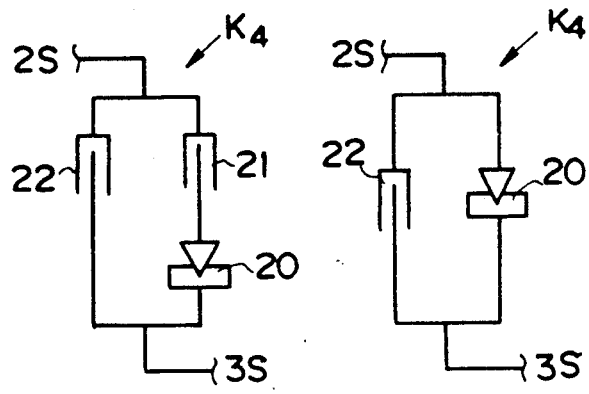
FIGS. 19(A) and 19(B) diagrammatic illustrations of a fourth clutch unit consisting of a one-way clutch and a multi-disc clutch.

The fourth clutch unit K4 may comprise a series arrangement of a multi-disc clutch 21 and a one-way clutch 20 which engages when the sun gear 3S of the third planetary gear set 3 rotates in the normal direction relative to the sun gear 2S of the second planetary gear set 2, and a multi-disc clutch 22 connected in parallel relationship to the series arrangement of the one-way clutch 20 and the multi-disc clutch 21 as shown in FIG. 19(A) or may comprise a one-way clutch 20 and a multi-disc clutch 22 connected in parallel relationship to each other as shown in FIG. 19(B). The multi-disc clutch 21 is connected in series to the one-way clutch 20 because the sun gear 3S of the third planetary gear set 3 must rotate in the normal direction at a rotating speed higher than that of the sun gear 2S of the second planetary gear set 2 in case the set value of the third gear requires. When it is obvious from the set value of the third gear that the rotating speed of the sun gear 3S of the third planetary gear set 3 when the same rotates in the normal direction never exceeds the rotating speed of the sun gear 2S of the second planetary gear set 2, the multi-disc clutch 21 may be omitted and the fourth clutch unit K4 may have the construction shown in FIG. 19(B). As stated above, the operating condition of the fourth clutch unit K4 is changed over in gear change between the first gear and the second gear or between the fourth gear and the fifth gear.

Figure 20:
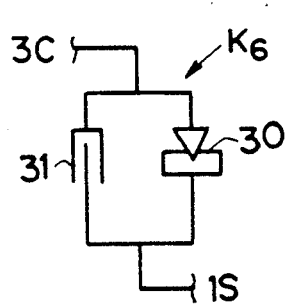
FIG. 20 is a diagrammatic illustration of a sixth clutch unit consisting of a one-way clutch and a multi-disc clutch.

As shown in FIG. 20, the sixth clutch unit K6 may comprise a parallel arrangement of a multi-disc clutch 31, and a one-way clutch 30 which engages when the sun gear 1S of the first planetary gear set 1 rotates in the normal direction relative to the carrier C of the third planetary gear set 3. As stated above, the sixth clutch unit K6 acts, together with the first brake unit B1, to restrain the carrier 3C of the third planetary gear set 3 from reverse rotation while the automatic transmission is placed in the first gear. When the automatic transmission is up-shifted from the first gear to the second gear, the one-way clutch 30 disengages automatically to enable up-shifting, because the carrier 3C of the third planetary gear set 3 rotates in the normal direction.

Figure 21:
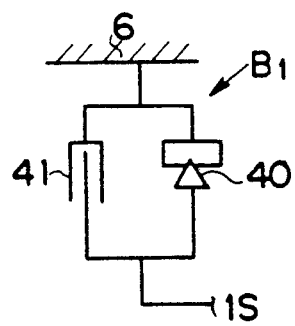
FIG. 21 is a diagrammatic illustration of a first brake unit consisting of an one-way clutch and a multidisc brake.

As shown in FIG. 21, the first brake unit B1 may comprise a parallel arrangement of a one-way clutch 40 which engages when the sun gear 1S of the first planetary gear set 1 rotates in the reverse direction relative to the casing 6, and a multi-disc or band brake (hereinafter, referred to simply as "brake") 41. In the first gear, the second gear and the third gear, the sun gear 1S of the first planetary gear set 1 is restrained from reverse rotation. In the fourth gear and the fifth gear, the sun gear 1S of the first planetary gear set 1 rotates in the normal direction. Hence, the one-way clutch 40 enables gear change between the third gear and the fourth gear.

Figure 22:
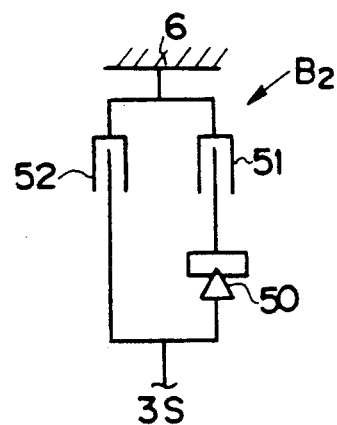
FIG. 22 is a diagrammatic illustration of a second brake unit consisting of a one-way clutch and a multi-disc brake.

As shown in FIG. 22, the second brake unit B2 may comprise a series arrangement of a brake 51 and a one-way clutch 50 which engages when the sun gear 3S of the third planetary gear set 3 rotates in the reverse direction relative to the casing 6, and a brake 52 connected in parallel relationship to the series arrangement of the brake 51 and the one-way clutch 50. Thus, in placing the automatic transmission in the second gear by disengaging the third clutch unit K3, the sun gear 3S of the third planetary gear set 3 is restrained from reverse rotation and, when the automatic transmission is up-shifted from the second gear to the third gear, the sun gear 3S of the third planetary gear set 3 starts rotating in the normal direction. Therefore, the one-way clutch 50 allows the sun gear 3S of the third planetary gear set 3 to rotate even if the brake 51 connected in series to the one-way clutch 50 is in engagement, so that the automatic transmission can be up-shifted from the second gear to the third gear. Similarly, the one-way clutch 50 engages automatically to enable down-shifting from the third gear to the second gear.

Figure 23:
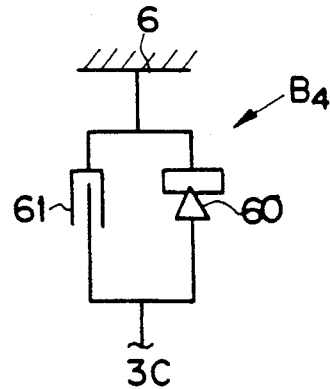
FIG. 23 is a diagrammatic illustration of a fourth brake unit consisting of a one-way clutch and a multi-disc brake.

As shown in FIG. 23, the fourth brake unit B4 may comprise a parallel arrangement of a one-way clutch 0 which engages when the carrier 3C of the third planetary gear set 3 rotates in the reverse direction relative to the casing 6, and a brake 61. The carrier C of the third planetary gear set 3 is held and restrained from reverse rotation when the automatic transmission is placed in the first gear. The carrier C of the third planetary gear set 3 is allowed to rotate in the normal direction when the automatic transmission is placed in a forward gear other than the first gear. Therefore, the carrier 3C is held by the fourth brake unit B4 when sixth clutch unit K6 and the first brake unit B1 do not hold the carrier 3C. Thus, the one-way clutch 60 participates in gear changing operation between the first gear and the second gear.

The multi-disc clutches and brakes connected in parallel relationship, respectively, to the one-way clutches in the modifications shown in FIGS. 18 to 23 make engine braking effective. The respective multi-disc clutches and the brakes of the fourth clutch unit K4, the sixth clutch unit K6, the first brake unit B1 and the fourth brake unit B4 ar engaged also when the automatic transmission is placed in the reverse gear. Modifications developed by incorporating improvements to those clutch units and brake units will be described hereinafter.

Figure 24:
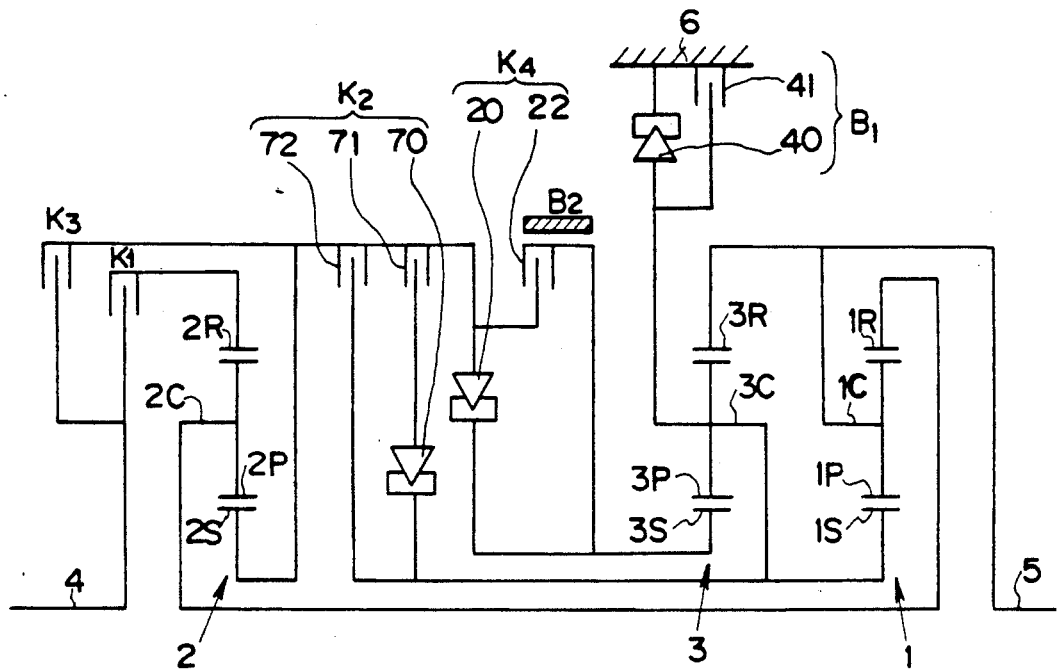
FIGS. 24 to 48 are skeleton diagrams showing the principle of other embodiments of the present invention.

An automatic transmission shown in FIG. 24 is a modification of the automatic transmission shown in FIG. 4. The second clutch unit K2 comprises a series arrangement of a one-way clutch 70 and a multi-disc clutch 71, and a multi-disc clutch 72 connected in parallel relationship to the series arrangement of the one-way clutch 70 and the multi-disc clutch 71; the fourth clutch unit K4 has the construction of FIG. 19(B); the first brake unit B1 has the construction of FIG. 21; the second brake unit B2 is a band brake. The operating conditions of the engaging devices of the automatic transmission of FIG. 24 are shown in Table 13. In the following tables, blank circles (O) indicate engagement, crosses (x) indicate disengagement and double circles (⊙) indicate engagement when engine braking is applied; the letters a, b, c, ... indicate different combinations of the operating conditions of the clutch units and the brake units for the same transmission gear ratio. The combinations of the operation conditions of the clutch units and the brake units may be changed in the order of the symbols or any one of the combinations may be selected in carrying out gear changing operation.

TABLE 13

|  |  | Clutch Unit | | | | | | Brake Unit | | |
| --- | --- | --- | --- | --- | --- | --- | --- | --- | --- | --- |
|  |  |  | K2 | | | | K4 | B1 | | |
|  |  | K1 | 72 | 71 | 70 | K3 | 22 | 20 | 41 | 40 | B2 |
| 1st |   | O | X | X | X | X | ⊙ | O | ⊙ | O | X |
| 2nd |   | O | ⊙ | O | O | X | X | X | ⊙ | O | X |
| 3rd |   | O | X | O | X | O | X | X | ⊙ | O | X |
| 4th | a | O | O | O | X | O | X | X | X | X | X |
|  | b | ⊙ | O | O | X | O | ⊙ | O | X | X | X |
| 5th |   | X | O | O | X | O | X | X | X | X | O |
| Rev |   | X | X | X | X | O | O | X | O | X | X |
| 2.5th |   | O | X | O | X | X | ⊙ | O | X | X | O |
| 3.5th |   | O | X | O | X | O | X | X | X | X | O |

Figure 25:
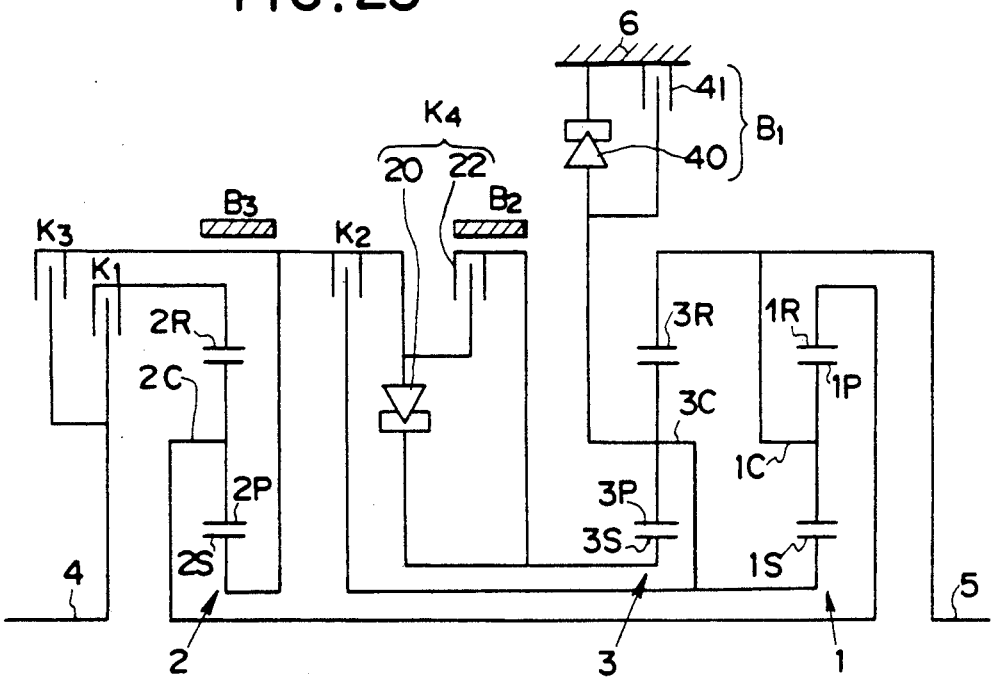

An automatic transmission showing in FIG. 25 is similar in construction to the automatic transmission of FIG. 24, except that the second clutch unit K2 is a multi-disc clutch, and a third brake unit B3 comprising a band brake is provided to hold the sun gear 28 of the second planetary gear set 2. The operating conditions of the clutch units and brake units of the automatic transmission of FIG. 25 are shown in Table 14.

TABLE 14

|  |  | Clutch Unit | | | | | Brake Unit | | |
| --- | --- | --- | --- | --- | --- | --- | --- | --- | --- |
|  |  |  |  |  | K4 | B1 | | |
|  |  | K1 | K2 | K3 | 22 | 20 | 41 | 40 | B2 | B3 |
| 1st |   | O | X | X | ⊙ | O | ⊙ | O | X | X |
| 2nd |   | O | X | X | X | X | ⊙ | O | X | O |
| 3rd |   | O | X | O | X | X | ⊙ | O | X | X |
| 4th | a | O | O | O | X | X | X | X | X | X |
|  | b | X | O | O | ⊙ | O | X | X | X | X |
| 5th |   | X | O | O | X | X | X | X | O | X |
| Rev |   | X | X | O | O | X | O | X | X | X |
| 2.5th |   | O | X | O | ⊙ | O | X | X | O | X |

TABLE 14-continued

|  | Clutch Unit | | | | | Brake Unit | | |
| --- | --- | --- | --- | --- | --- | --- | --- | --- |
|  |  |  | K4 | B1 | | |
|  | K1 | K2 | K3 | 22 | 20 | 41 | 40 | B2 | B3 |
| 3.5th | O | X | O | X | X | X | X | O | X |

Figure 26:
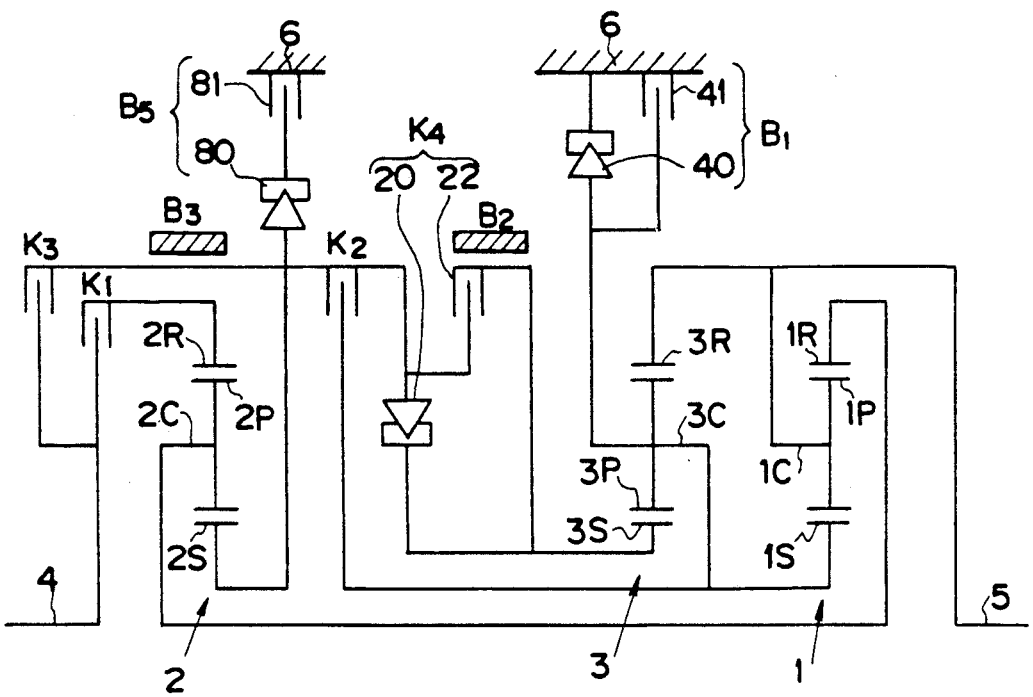

An automatic transmission shown in FIG. 26 is constructed by connecting a fifth brake unit B5 comprising a series arrangement of a one-way clutch 80 and a multi-disc brake 81 and connected in parallel relationship to the third brake unit B3 comprising a band brake of the automatic transmission of FIG. 25. The operating conditions of the clutch units and brake units of the automatic transmission of FIG. 26 are shown in Table 15.

TABLE 15

|  |  | Clutch Unit | | | | | Brake Unit | | | | |
| --- | --- | --- | --- | --- | --- | --- | --- | --- | --- | --- | --- |
|  |  |  |  |  | K4 | B1 | | | | B5 | |
|  |  | K1 | K2 | K3 | 22 | 20 | 41 | 40 | B2 | B3 | 81 | 80 |
| 1st |   | O | X | X | ⊙ | O | ⊙ | O | X | X | X | X |
| 2nd |   | O | X | X | X | X | ⊙ | O | X | ⊙ | O | O |
| 3rd |   | O | X | O | X | X | ⊙ | O | X | X | O | X |
| 4th | a | O | X | O | O | X | X | X | X | X | O | X |
|  | b | X | O | O | ⊙ | O | X | X | X | X | O | X |
| 5th |   | X | O | O | X | X | X | X | O | X | O | X |
| Rev |   | X | X | O | O | X | O | X | X | X | X | X |
| 2.5th |   | O | X | X | ⊙ | O | X | X | O | X | O | X |
| 3.5th |   | O | X | O | X | X | X | X | O | X | O | X |

Each of the automatic transmissions embodying the present invention shown in FIGS. 24, 25 and 26 is not provided with the sixth clutch unit K6. Therefore, as stated above, the relative rotating speed of the sun gear 3S of the third planetary gear set 3 with respect to the sun gear 2S of the second planetary gear set 2, namely, the relative rotating speed of the inner race of the one-way clutch 20 of the fourth clutch unit K4 with respect to the outer race of the same, is high and such a high relative rotating speed is disadvantageous in respect of the durability of the automatic transmission. Such a disadvantage can effectively eliminated by the sixth clutch unit K6. As stated above with reference to FIGS. 18 to 23, gear changing operation using the favorable actions of one-way clutches is possible when one-way clutches are incorporated, respectively, into the first clutch unit K1, the fourth clutch unit K4, the sixth clutch unit K6, the first brake unit B1, the second brake unit B2 and the fourth brake unit B4. Particularly, when one-way clutches are incorporated, as shown in FIGS. 18 to 23, at least into either the three engaging units, namely, the fourth clutch unit K4, either the sixth clutch unit K6 or the fourth brake unit B4, and the first brake unit B1, or the four engaging units, namely, either the first clutch unit K1 or the fourth clutch unit K4, either the sixth clutch unit K6 or the fourth brake unit B4, the first brake unit B1 and the second brake unit B2, gear changing operation between the adjacent ones of the forward gears can use the favorable actions of the one-way clutches. Thus, the appropriate employment of one-way clutches improves the controllability of the automatic transmission and reduces shocks attributable to gear changing operation. Such improved modifications will be described hereinafter.

Figure 27:
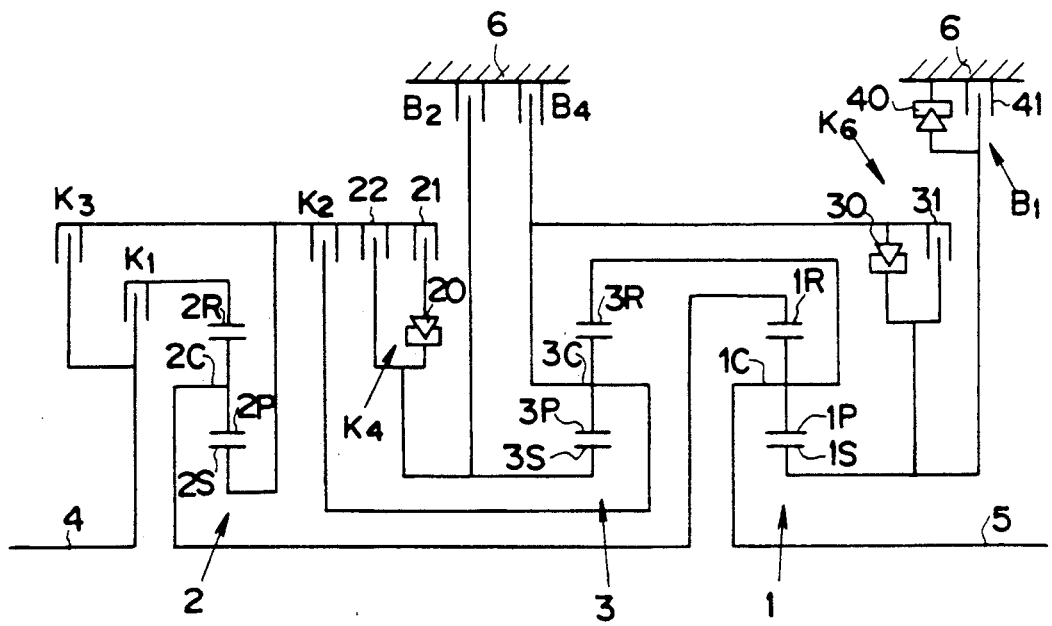

An automatic transmission shown in FIG. 27 is the same in construction as the automatic transmission of FIG. 12, except that the fourth clutch unit K4 has the construction shown in FIG. 19(A), the sixth clutch unit K6 has the construction shown in FIG. 20, and the first brake unit B1 has the construction shown in FIG. 21. The operating conditions of the clutch units and the brake units of the automatic transmission of FIG. 27 are shown in Table 16. As is obvious from Table 16, gear changing operation for placing the automatic transmission in any one of the basic five forward gears can be achieved by artificially controlling one of the clutch units and the brake units.

TABLE 16

|  | | Clutch | | | | | | Brake Unit | | | |
| --- | --- | --- | --- | --- | --- | --- | --- | --- | --- | --- | --- |
|  | | | | K4 | | | K6 | B1 | | | |
|  | | K1 | K2 | K3 | 22 | 21 | 20 | 31 | 30 | 41 | 40 | B2 | B4 |
| 1st | | O | X | X | ⊙ | O | O | O | X | ⊙ | O | X | O |
| 2nd | a | O | O | X | X | O | X | O | X | ⊙ | O | X | O |
|  | b | O | O | X | X | X | X | ⊙ | O | ⊙ | O | X | X |
| 3rd | | O | O | O | X | X | X | ⊙ | O | X | X | X | X |
| 4th | a | O | O | O | O | X | X | X | X | X | X | X | X |
|  | b | O | O | O | O | O | X | O | X | X | X | X | X |
|  | c | X | O | O | ⊙ | O | O | O | X | X | X | X | X |
| 5th | | X | O | O | X | O | X | O | X | X | X | O | X |
| Rev | | X | X | O | O | X | X | X | O | X | X | O | X |
| 2.5th | | O | X | X | ⊙ | O | O | ⊙ | O | X | X | O | X |
| 3.5th | | O | X | O | X | X | X | ⊙ | O | X | X | O | X |

Figure 28:
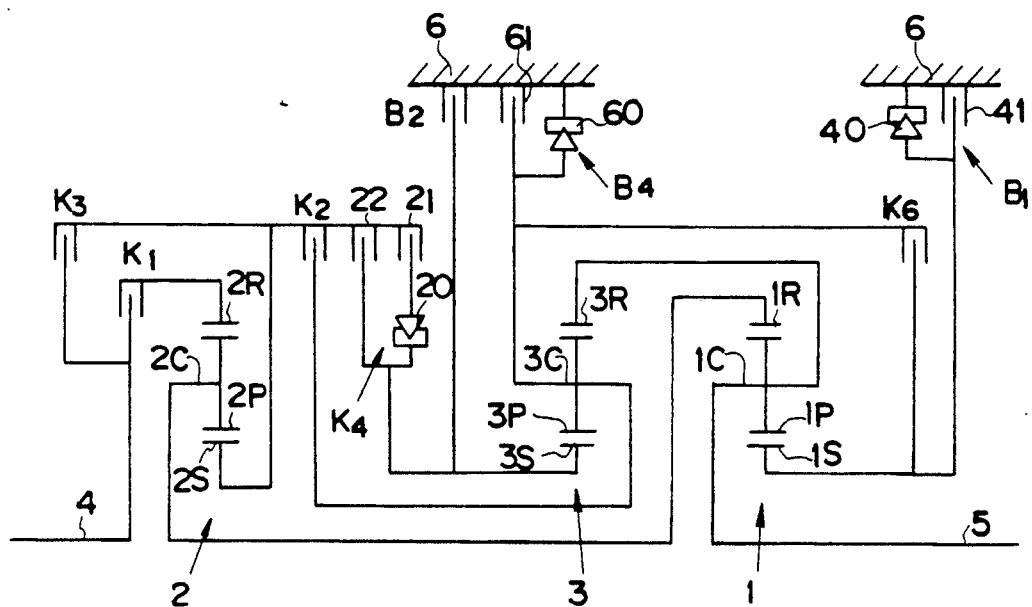

An automatic transmission shown in FIG. 28 is the same in construction as the automatic transmission of FIG. 27, except that the sixth clutch unit K6 is a multi-disc clutch, and the fourth brake unit B4 has the construction shown in FIG. 23. The operating conditions of the clutch units and brake units of the automatic transmission of FIG. 28 are shown in Table 17.

TABLE 17

|  | | Clutch Unit | | | | | | | Brake Unit | | | | |
| --- | --- | --- | --- | --- | --- | --- | --- | --- | --- | --- | --- | --- | --- |
|  | | | | | K4 | | | | B1 | | | B4 | |
|  | | K1 | K2 | K3 | 22 | 21 | 20 | K6 | 41 | 40 | B2 | 61 | 60 |
| 1st | | O | X | X | ⊙ | O | O | X | ⊙ | O | X | ⊙ | O |
| 2nd | a | O | O | X | X | O | X | X | ⊙ | O | X | ⊙ | O |
|  | b | O | O | X | X | X | X | X | ⊙ | O | X | ⊙ | O |
| 3rd | | O | O | O | X | X | X | X | ⊙ | O | X | X | X |
| 4th | a | O | O | O | O | X | X | O | X | X | X | X | X |
|  | b | O | O | O | O | O | X | O | X | X | X | X | X |
|  | c | X | O | O | ⊙ | O | O | O | X | X | X | X | X |
| 5th | | X | O | O | X | X | X | O | X | X | O | X | X |
| Rev | | X | X | O | O | X | X | X | O | X | X | O | X |
| 2.5th | | O | X | X | ⊙ | O | O | O | X | X | O | X | X |
| 3.5th | | O | X | O | X | X | X | O | X | X | O | X | X |

The configurations of the automatic transmissions of FIGS. 27 and 28 employ the one-way clutches in gear changing operation for placing the automatic transmissions in any one of the forward gears, reduce the relative rotating speed of the sun gear 3S of the third planetary gear set 3 with respect to the sun gear 2S of the second planetary gear set 2 when the automatic transmission is placed in the third gear, and reduce the relative rotating speed of the pinion gear of the third planetary gear set 3 with respect to the carrier 3C of the same.

Figure 29:
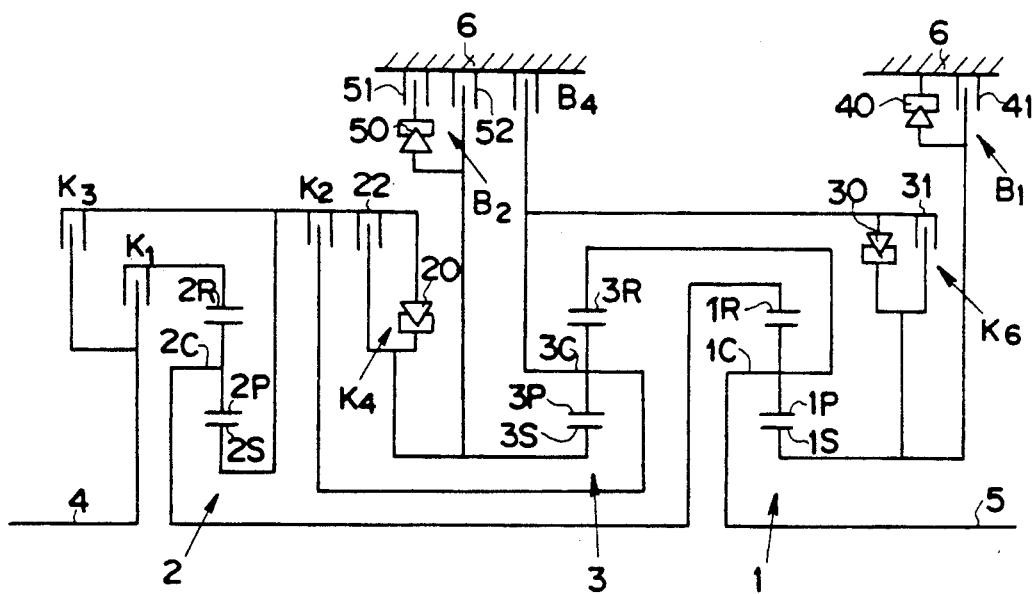

An automatic transmission shown in FIG. 29 is the same in construction as that shown in FIG. 27, except that the fourth clutch unit K4 has the construction shown in FIG. 19(B) and the second brake unit B2 has the construction shown in FIG. 22. The operating conditions of the clutch units and brake units of the automatic transmission of FIG. 29 are shown in Table 18. Gear changing operation for placing the automatic transmission in any one of the forward gears can be achieved by artificially operating one of the clutch units and the brake units.

TABLE 18

|  | | Clutch Units | | | | | | | Brake Unit | | | | |
| --- | --- | --- | --- | --- | --- | --- | --- | --- | --- | --- | --- | --- | --- |
|  | | | | | K4 | | K6 | | B1 | | B2 | | |
|  | | K1 | K2 | K3 | 22 | 20 | 31 | 30 | 41 | 40 | 52 | 51 | 50 | B4 |
| 1st | a | O | X | X | ⊙ | O | ⊙ | O | ⊙ | O | X | X | X | O |
|  | b | O | X | X | ⊙ | O | ⊙ | O | ⊙ | O | X | X | X | X |
| 2nd | | O | X | X | ⊙ | O | X | X | ⊙ | O | ⊙ | O | O | X |
| 3rd | | O | X | O | O | X | X | X | ⊙ | O | X | O | X | X |
| 4th | a | O | X | O | | X | O | X | X | X | X | O | X | X |
|  | b | O | O | O | O | X | O | X | X | X | X | O | X | X |
|  | c | X | O | O | ⊙ | O | O | X | X | X | X | O | X | X |
| 5th | | X | O | O | X | X | O | X | X | X | O | O | X | X |
| Rev | | X | X | O | O | X | X | X | O | X | X | X | O | O |
| 2.5th | | O | X | X | ⊙ | O | O | X | X | X | ⊙ | O | O | X |
| 3.5th | | O | X | O | X | X | O | X | X | X | ⊙ | O | O | X |

Figure 30:
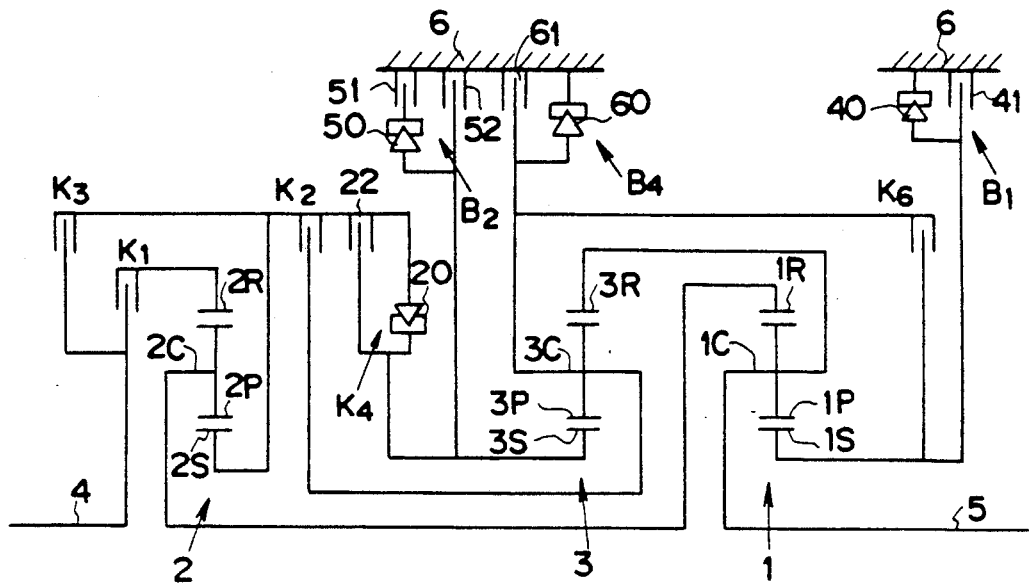

An automatic transmission shown in FIG. 30 is the same in construction as that shown in FIG. 29, except that the sixth clutch unit K6 is a multi-disc clutch, and the fourth brake unit B4 has the construction shown in FIG. 23. The operating conditions of the clutch units and brake units of the automatic transmission of FIG. 30 are shown in Table 19.

TABLE 19

|  | | Clutch Unit | | | | | | Brake Unit | | | | | |
| --- | --- | --- | --- | --- | --- | --- | --- | --- | --- | --- | --- | --- | --- |
|  | | | | | K4 | | | B1 | | B2 | | B4 | |
|  | | K1 | K2 | K3 | 22 | 20 | K6 | 41 | 40 | 52 | 51 | 50 | 61 | 60 |
| 1st | | O | X | X | ⊙ | O | X | ⊙ | O | X | X | X | ⊙ | O |
| 2nd | | O | X | X | ⊙ | O | X | ⊙ | O | ⊙ | O | O | X | X |
| 3rd | | O | X | O | O | X | X | ⊙ | O | X | O | X | X | X |
| 4th | a | O | X | O | O | X | O | X | X | X | O | X | X | X |
|  | b | O | O | O | O | X | O | X | X | X | O | X | X | X |
|  | c | X | O | O | ⊙ | O | O | X | X | X | O | X | X | X |
| 5th | | X | O | O | X | X | O | X | X | O | O | X | X | X |
| Rev | | X | X | O | O | X | X | O | X | X | X | X | O | X |
| 2.5th | | O | X | X | ⊙ | O | O | X | X | ⊙ | O | O | X | X |
| 3.5th | | O | X | O | X | X | O | X | X | ⊙ | O | O | X | X |

The configurations of the automatic transmissions shown in FIGS. 29 and 30 employ the one-way clutches in changing gear between the forward gears, make the respective sun gears 2S and 3S of the second and third planetary gear sets 2 and 3 rotate at the same rotating speeds when the automatic transmission is placed in the second or third gear, and reduce the relative rotating speed of the pinion of the third planetary gear set 3 with respect to the carrier 3C of the same.

Figure 31:
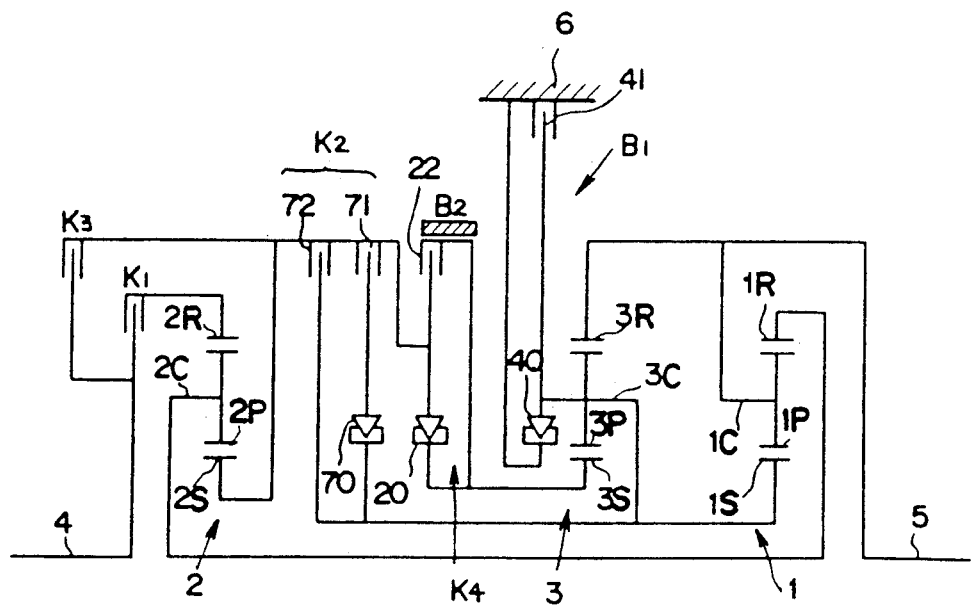

An automatic transmission shown in FIG. 31 is the same in construction shown in FIG. 24, except that the one-way clutch 40 of the first brake unit B1 is disposed inside the circumference of the carrier 3C of the third planetary gear set 3, the inner race of the one-way clutch 40 is fastened to a predetermined fixed member fastened to the casing 6, and the outer race of the one-way clutch 40 is connected to the carrier 3C and the rotating member of the multi-disc brake 41. Thus, the automatic transmission of FIG. 31 is constructed by rearranging the components of the automatic transmission of FIG. 24, and hence the operating conditions of the clutch units and brake units of the automatic transmission of FIG. 31 are the same as those shown in Table 13.

Figure 32:
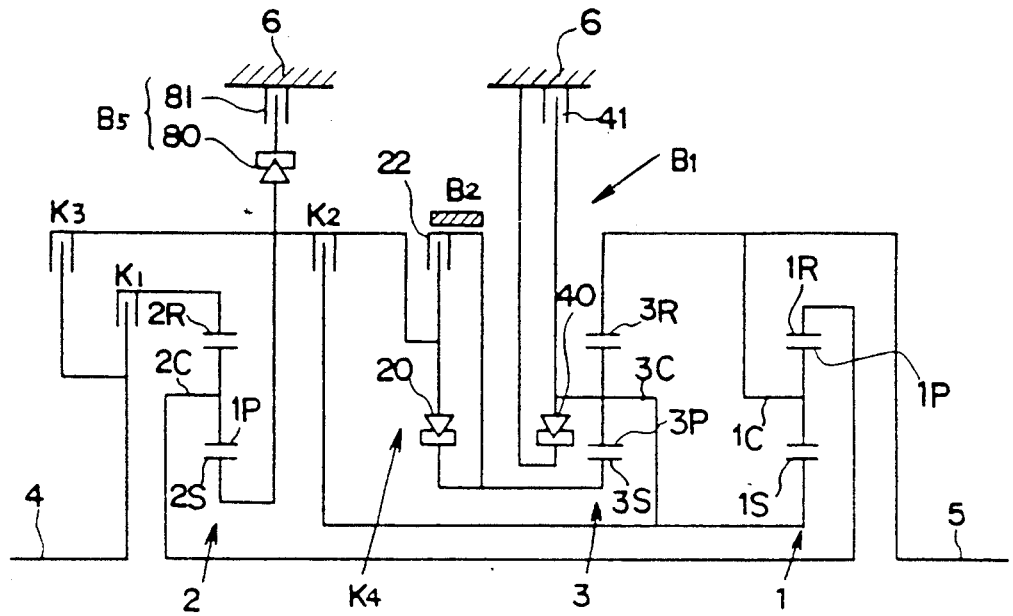

An automatic transmission shown in FIG. 32 is the same in construction as that shown in FIG. 31, except that a fifth brake unit B5 comprising a series arrangement of a one-way clutch 80 and a multi-disc brake 81 is provided between the sun gear 2S of the second planetary gear set 2 and the casing 6, and the second clutch unit K2 is a multi-disc clutch; that is, the automatic transmission shown in FIG. 32 is constructed by omitting the third brake unit B3 from the automatic transmission of FIG. 26, and employing the first brake unit B1 shown in FIG. 31. The operating conditions of the clutch units and brake units of the automatic transmission of FIG. 32 are shown in Table 20.

TABLE 20

| | | Clutch Unit | | | | Brake Unit | | | | |
|---|---|---|---|---|---|---|---|---|---|---|
| | | | | | K4 | | B1 | | | B5 |
| | | K1 | K2 | K3 | 22 | 20 | 41 | 40 | B2 | 81 | 80 |
| 1st | | O | X | X | ⊙ | O | ⊙ | O | X | X | X |
| 2nd | | O | ⊙ | X | X | X | ⊙ | O | X | O | O |
| 3rd | | O | X | O | X | X | ⊙ | O | X | O | X |
| 4th | a | O | X | O | O | X | X | X | X | O | X |
| | b | O | O | O | O | X | X | X | X | O | X |
| | c | ⊙ | O | O | ⊙ | O | X | X | X | O | X |
| 5th | | X | O | O | X | X | X | X | O | O | X |
| Rev | | X | X | O | O | X | O | X | X | X | O |
| 2.5th | | O | X | X | ⊙ | X | X | X | O | O | O |
| 3.5th | | O | X | O | X | X | X | X | O | O | X |

Figure 33:
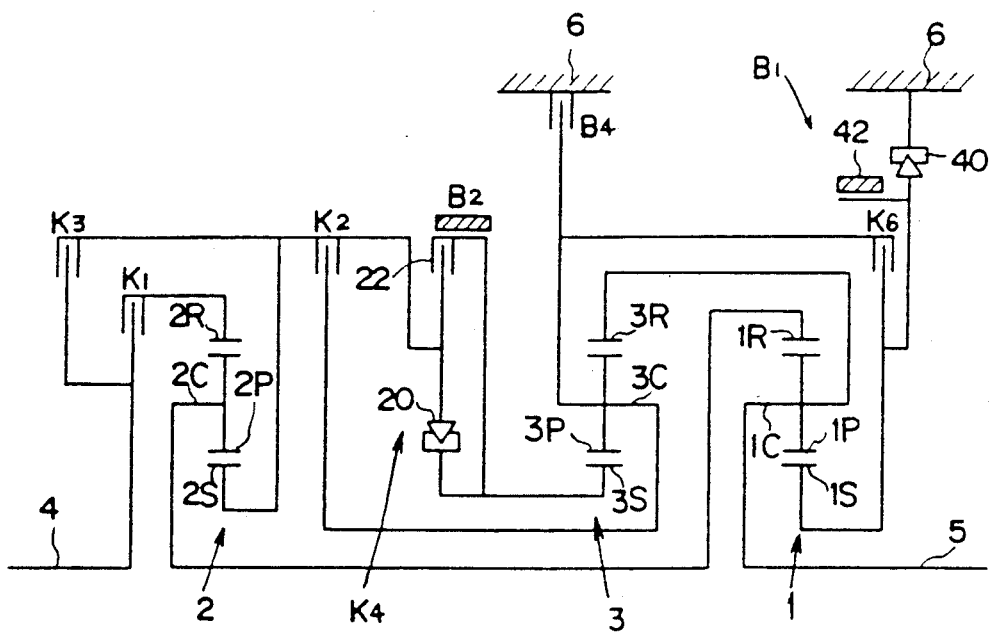

An automatic transmission shown in FIG. 33 is provided with a sixth clutch unit K6. This automatic transmission is a modification of, for example, the automatic transmission of FIG. 28. This automatic transmission is the same in construction as that shown in FIG. 28, except that the fourth clutch unit K4 comprises a multi-disc clutch 22 and a one-way clutch 20 disposed on the inner side of the multi-disc clutch 22, the one-way clutch 20 and the multi-disc clutch 22 are disposed in a parallel arrangement between the respective sun gears 2S and 3S of the second and third planetary gear sets 2 and 3, the first brake unit B1 comprises a one-way clutch 40 and a band brake 42, the second brake unit B2 is a band brake, and the second clutch unit K2 is a multi-disc clutch. The operating conditions of the clutch units and brake units of the automatic transmission of FIG. 33 are shown in Table 21.

TABLE 21

| | | Clutch Unit | | | | | | Brake Unit | | | |
|---|---|---|---|---|---|---|---|---|---|---|---|
| | | | | | K4 | | | B1 | | | |
| | | K1 | K2 | K3 | 22 | 20 | K6 | 42 | 40 | B2 | B4 |
| 1st | | O | X | X | ⊙ | O | ⊙ | ⊙ | O | X | O |
| 2nd | | O | X | X | ⊙ | O | X | ⊙ | O | O | X |
| 3rd | a | O | X | O | X | X | X | ⊙ | O | O | X |
| | b | O | X | O | O | X | X | ⊙ | O | X | X |
| 4th | a | O | X | O | O | X | O | X | X | X | X |
| | b | O | O | O | O | X | O | X | X | X | X |
| | c | X | O | O | ⊙ | O | O | X | X | X | X |
| 5th | | X | O | O | X | X | O | X | X | O | X |
| Rev | | X | X | O | O | X | X | O | X | X | O |
| 2.5th | | O | X | X | ⊙ | O | O | X | X | O | X |
| 3.5th | | O | X | O | X | X | O | X | X | O | X |

Figure 34:
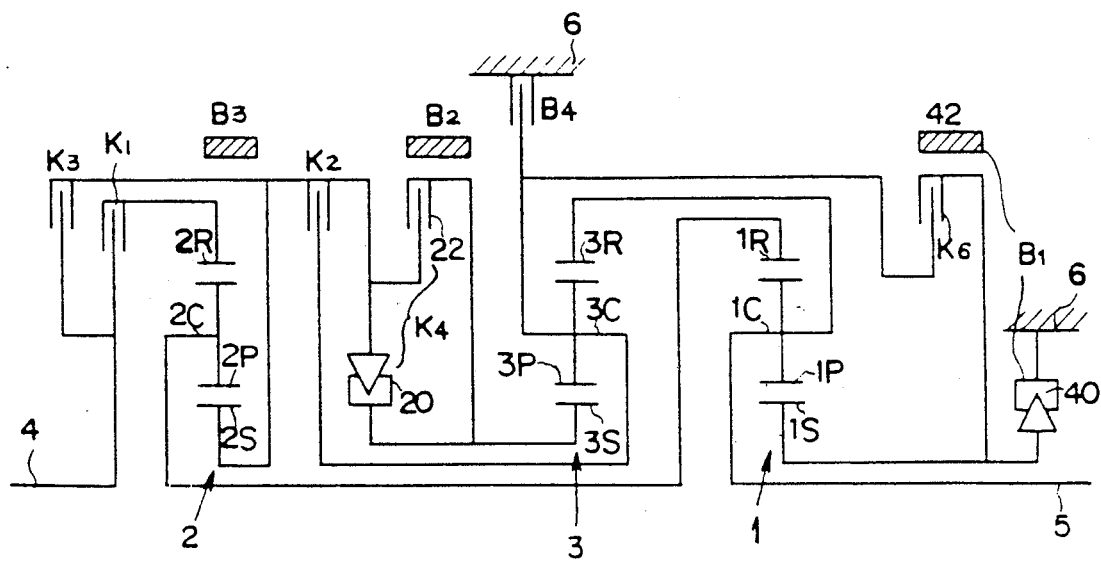

An automatic transmission shown in FIG. 34 is the same in construction as that shown in FIG. 33, except that a third brake unit B3 comprising a band brake for holding the sun gear 2S of the second planetary gear set 2 is provided, and the one-way clutch 40 of the first brake unit B1 has a diameter smaller than that of the first brake unit B1 of FIG. 33. The operating conditions of the clutch units and brake units of the automatic transmission of FIG. 34 are shown in Table 22.

TABLE 22

| | | Clutch Unit | | | | | | Brake Unit | | | | |
|---|---|---|---|---|---|---|---|---|---|---|---|---|
| | | | | | K4 | | | B1 | | | | |
| | | K1 | K2 | K3 | 22 | 20 | K6 | 42 | 40 | B2 | B3 | B4 |
| 1st | | O | X | X | ⊙ | O | ⊙ | ⊙ | O | X | X | O |

TABLE 22-continued

| | | Clutch Unit | | | | | | Brake Unit | | | | |
|---|---|---|---|---|---|---|---|---|---|---|---|---|
| | | | | | K4 | | | B1 | | | | |
| | | K1 | K2 | K3 | 22 | 20 | K6 | 42 | 40 | B2 | B3 | B4 |
| 2nd | a | O | X | X | X | X | X | ⊙ | O | X | O | O |
| | b | O | X | X | O | X | X | ⊙ | O | O | O | X |
| | c | O | X | X | ⊙ | O | X | ⊙ | O | O | X | X |
| 3rd | a | O | X | O | X | X | X | ⊙ | O | O | X | X |
| | b | O | X | O | O | X | X | ⊙ | O | X | X | X |
| 4th | a | O | X | O | O | X | O | X | X | X | X | X |
| | b | O | O | O | O | X | O | X | X | X | X | X |
| | c | X | O | O | ⊙ | O | O | X | X | X | X | X |
| 5th | | X | O | O | X | X | O | X | X | O | X | X |
| Rev | | X | X | O | O | X | X | O | X | X | X | O |
| 2.5th | | O | X | X | ⊙ | O | O | X | X | O | X | X |
| 3.5th | | O | X | O | X | X | O | X | X | O | X | X |

Figure 35:
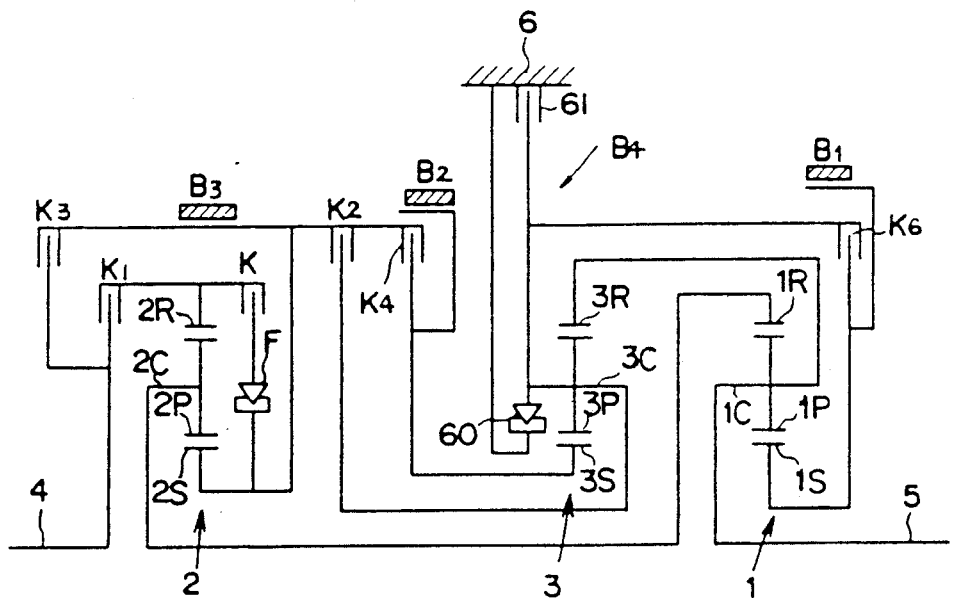

An automatic transmission shown in FIG. 35 is a further modification of the automatic transmission of FIG. 33. A one-way clutch F, which engages when the sun gear 2S of the second planetary gear set 2 rotates in the normal direction relative to the ring gear 2R of the same, is provided between the sun gear 2S and ring gear 2R of the second planetary gear set 2, a multi-disc clutch is provided between the outer race of the one-way clutch F and the ring gear 2R of the second planetary gear set 2, the fourth clutch unit K4 comprises a multi-disc clutch, the fourth brake unit B4 has the construction shown in FIG. 31, and the first brake unit B1 comprises a band brake. The operating conditions of the clutch units and brake units of the automatic transmission of FIG. 35 are shown in Table 23.

Table 23

| | | Clutch Unit | | | | | | | Brake Unit | | | | |
|---|---|---|---|---|---|---|---|---|---|---|---|---|---|
| | | | | | | | | | | | | B4 | |
| | | K1 | K2 | K3 | K4 | K6 | K | F | B1 | B2 | B3 | 61 | 60 |
| 1st | | O | X | X | O | X | O | X | O | X | X | ⊙ | O |
| 2nd | a | O | X | X | O | X | O | X | O | O | X | X | X |
| | b | O | X | X | O | X | O | X | O | O | O | X | X |
| | c | O | O | X | X | X | O | X | O | X | O | X | O |
| | d | O | O | X | X | X | O | X | O | X | X | ⊙ | O |
| 3rd | a | O | O | O | X | X | O | X | O | X | X | X | X |
| | b | O | X | O | X | O | X | O | X | X | X | X | X |
| | c | O | X | O | X | O | O | X | X | X | X | ⊙ | O |
| 4th | a | O | O | O | X | O | X | O | X | X | X | X | X |
| | b | O | O | O | X | O | X | O | X | X | X | X | X |
| | c | X | O | O | X | O | O | O | X | X | X | X | X |
| 5th | | X | O | O | X | O | X | O | X | X | X | X | X |
| Rev | | X | X | O | O | X | X | X | O | X | O | X | X |
| 2.5th | | O | X | X | X | O | O | X | X | O | O | X | X |
| 3.5th | | O | X | O | X | O | O | X | X | O | X | X | X |

Figure 36:
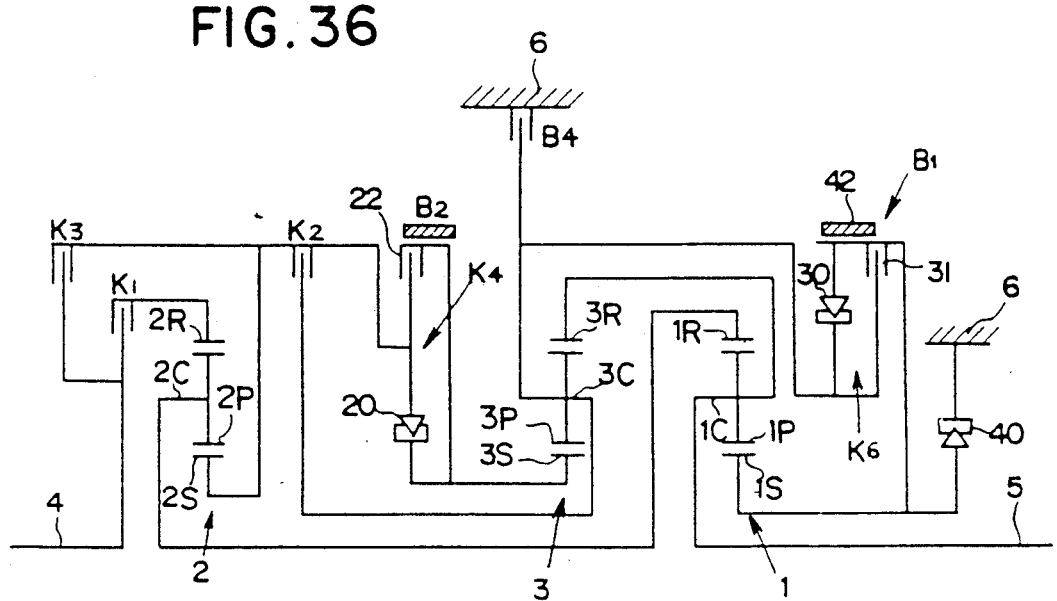

An automatic transmission shown in FIG. 36 is the same in construction as that shown in FIG. 33, except that the sixth clutch unit K6 has the construction shown in FIG. 20, the first brake unit B1 comprises a parallel arrangement of an overrunning clutch 40 and a band brake 42, the one-way clutch 40 is disposed on the side of the inner circumference of the first planetary gear set 1, and the outer race of the one-way clutch 40 is attached to a predetermined member fastened to the casing 6. The operating conditions of the clutch units and brake units of the automatic transmission of FIG. 36 are shown in Table 24.

Table 24

| | | Clutch Unit | | | | | | | Brake Unit | | | |
|---|---|---|---|---|---|---|---|---|---|---|---|---|
| | | | | | K4 | | K6 | | B1 | | | |
| | | K1 | K2 | K3 | 22 | 20 | 31 | 30 | 41 | 40 | B2 | B4 |
| 1st | a | O | X | X | ⊙ | O | O | X | ⊙ | O | X | O |

Figure 38:
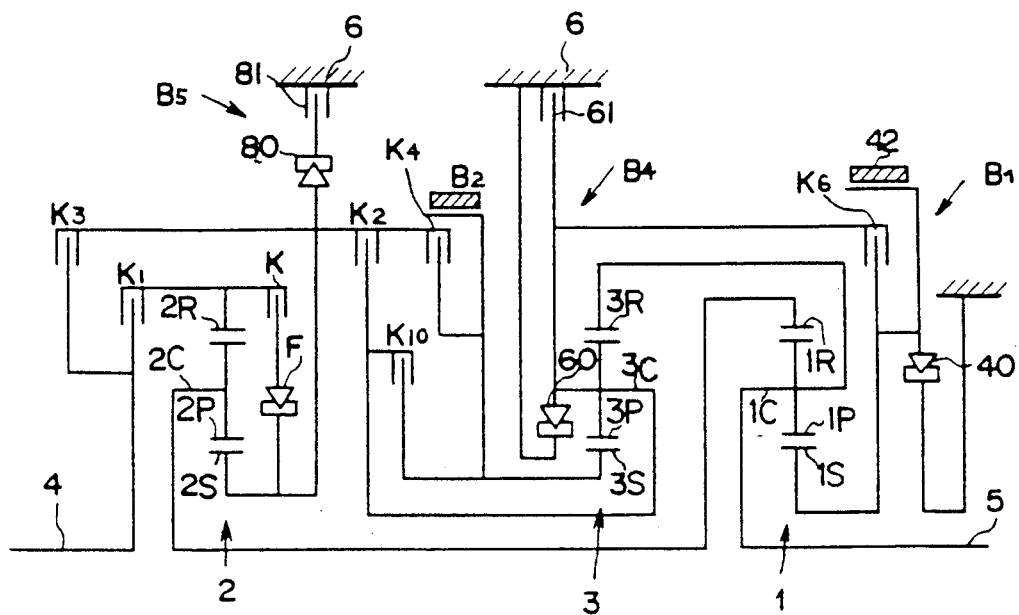

Table 24-continued the clutch units and brake units of the automatic transmission of FIG. 38 are shown in Table 26.

Table 26

| | | Clutch Unit | | | | | | | | Brake Unit | | | | | |
|---|---|---|---|---|---|---|---|---|---|---|---|---|---|---|---|
| | | | | | | | | | | | | B1 | | B4 | | B5 |
| | | K1 | K2 | K3 | K4 | K6 | K10 | K | F | 42 | 40 | B2 | 61 | 60 | 81 | 80 |
| 1st | | O | X | X | O | X | X | O | X | ⊙ | O | X | ⊙ | O | X | X |
| 2nd | a | O | X | X | O | X | X | O | X | ⊙ | O | ⊙ | X | X | ⊙ | O |
| | b | O | X | X | X | X | O | O | X | ⊙ | O | ⊙ | X | X | ⊙ | O |
| 3rd | | O | X | O | X | X | O | O | X | ⊙ | O | X | X | X | X | X |
| 4th | a | O | X | O | X | O | O | O | X | X | X | X | X | X | X | X |
| | b | O | O | O | X | O | O | O | X | X | X | X | X | X | X | X |
| | c | X | O | C | ⊙ | O | X | O | O | X | X | X | X | X | X | X |
| 5th | | X | O | O | X | O | X | O | X | X | X | O | X | X | X | X |
| Rev | | X | X | O | O | X | X | X | O | O | X | O | X | X | X | X |
| 2.5th | | O | X | X | ⊙ | O | X | X | X | X | O | X | X | ⊙ | O |
| 3.5th | | O | X | O | X | O | X | X | X | X | O | X | X | X | X |

| | | Clutch Unit | | | | | | | Brake Unit | | | |
|---|---|---|---|---|---|---|---|---|---|---|---|---|
| | | | | | K4 | | K6 | | B1 | | | |
| | | K1 | K2 | K3 | 22 | 20 | 31 | 30 | 41 | 40 | B2 | B4 |
| | b | O | X | X | ⊙ | O | ⊙ | O | ⊙ | O | X | X |
| 2nd | | O | X | X | ⊙ | O | X | X | ⊙ | O | O | X |
| 3rd | a | O | X | O | X | X | X | X | ⊙ | O | O | X |
| | b | O | X | O | O | X | X | X | ⊙ | O | X | X |
| 4th | a | O | X | O | O | X | O | X | X | X | X | X |
| | b | O | O | O | O | X | O | X | X | X | X | X |
| | c | X | O | O | ⊙ | O | O | X | X | X | X | X |
| 5th | | X | O | O | X | X | O | X | X | X | O | X |
| Rev | | X | X | O | O | X | X | X | O | X | X | O |
| 2.5th | | O | X | X | ⊙ | O | O | X | X | X | O | X |
| 3.5th | | O | X | O | X | X | O | X | X | X | O | X |

Figure 37:
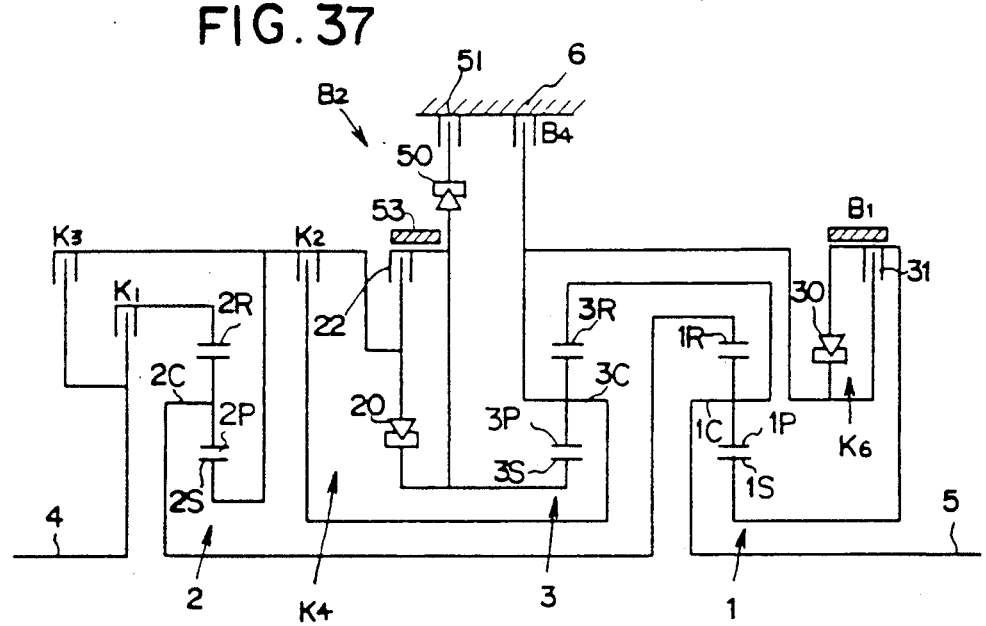

An automatic transmission shown in FIG. 37 is the same in construction as that shown in FIG. 36, except that the second brake unit B2 is a series arrangement of a one-way clutch 50 and a multi-disc clutch 51, and a hand brake 53 connected in parallel relationship to the series arrangement of the one-way clutch 50 and the multi-disc clutch 51, and the first brake unit B1 is a band brake. The operating conditions of the clutch units and brake units of the automatic transmission of FIG. 37 are shown in Table 25.

TABLE 25

| | | Clutch Unit | | | | | | | Brake Unit | | | |
|---|---|---|---|---|---|---|---|---|---|---|---|---|
| | | | | | K4 | | K6 | | | B2 | | |
| | | K1 | K2 | K3 | 22 | 20 | 31 | 30 | B1 | 53 | 51 | 50 | B4 |
| 1st | a | O | X | X | ⊙ | O | O | X | O | X | X | X | O |
| | b | O | X | X | ⊙ | O | ⊙ | O | O | X | X | X | X |
| 2nd | | O | X | X | ⊙ | O | X | X | O | ⊙ | O | O | X |
| 3rd | | O | X | O | O | X | X | X | O | X | X | X | X |
| 4th | a | O | X | O | O | X | O | X | X | X | X | X | X |
| | b | O | O | O | O | X | O | X | X | X | X | X | X |
| | c | X | O | O | ⊙ | O | O | X | X | X | X | X | X |
| 5th | | X | O | O | X | X | O | X | X | O | X | X | X |
| Rev | | X | X | O | O | X | X | X | O | X | X | X | O |
| 2.5th | | O | X | X | ⊙ | O | O | X | X | ⊙ | O | O | X |
| 3.5th | | O | X | O | X | X | O | X | X | ⊙ | O | O | X |

Figure 39:
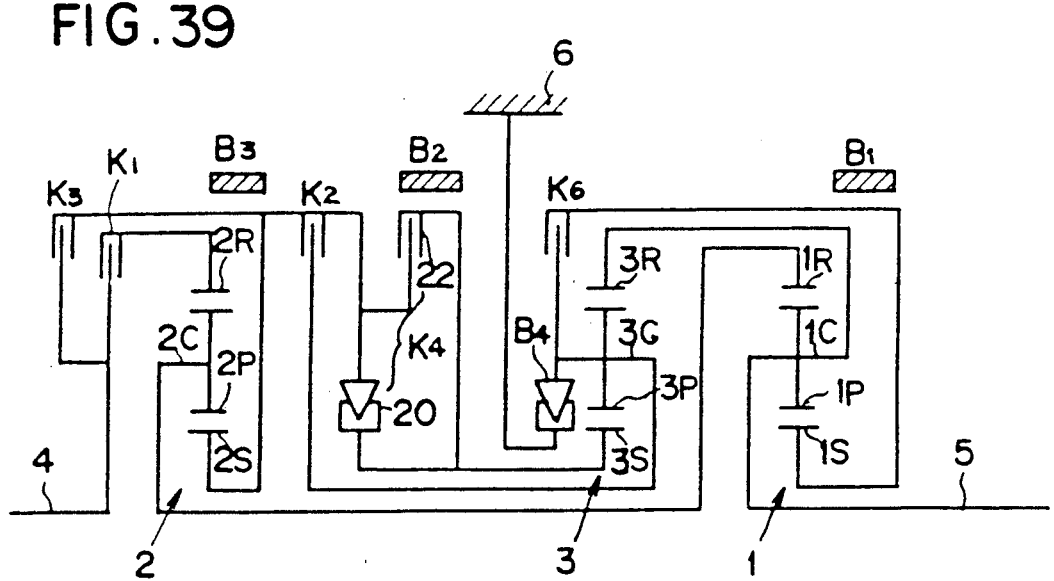

An automatic transmission shown in FIG. 38 is the same in construction as that shown in FIG. 35, except that the third brake unit B3 provided between the sun gear 2S of the second planetary gear set 2 and the casing 6 is replaced with a fifth brake unit B5 comprising a one-way clutch 80 and a multi-disc brake 81, a tenth clutch unit K10 is provided to connect selectively the carrier 3C and sun gear 3S of the third planetary gear set 3, and the first brake unit B1 comprises a one-way clutch 40 provided on the side of the inner circumference, and a band brake 42. The operating conditions of An automatic transmission shown in FIG. 39 is the same as that of FIG. 34, except that the sixth clutch unit K6 is disposed between the second planetary gear set 2 and the third planetary gear set 3, the fourth brake unit B4, i.e., a one-way clutch, is disposed on the inner side of the inner circumference of the third planetary gear set 3, and the first brake unit B1 comprises only a band brake. The operating conditions of the clutch units and brake units of the automatic transmission of FIG. 39 is shown in Table 27. When the automatic transmission of FIG. 39 is placed in the reverse gear, the carrier 3C of the third planetary gear set 3 is held by the first brake unit B1 with the sixth clutch unit K6 engaged, so that an increased torque acts on the clutch unit K6 when the automatic transmission is placed in the reverse gear. For employing a comparatively small clutch as the sixth clutch K6 and for improving durability of the clutch K6, it is preferable to reduce the output of the engine or the input torque of the automatic transmission when the automatic transmission is placed in the reverse gear.

Table 27

| | | Clutch Unit | | | | | | Brake Unit | | | |
|---|---|---|---|---|---|---|---|---|---|---|---|
| | | | | | K4 | | | | | | |
| | | K1 | K2 | K3 | 22 | 20 | K6 | B1 | B2 | B3 | B4 |
| 1st | | O | X | X | ⊙ | O | ⊙ | O | X | X | O |
| 2nd | a | O | X | X | X | X | ⊙ | O | X | X | O |
| | b | O | X | X | O | X | X | O | O | O | X |
| | c | O | X | X | ⊙ | O | X | O | O | O | X |
| 3rd | a | O | X | O | X | X | X | O | O | X | X |
| | b | O | X | O | X | X | O | O | X | X | X |
| | c | O | X | O | X | X | O | ⊙ | X | X | O |
| 4th | a | O | X | O | O | X | O | X | X | X | X |
| | b | O | O | O | O | X | O | X | X | X | X |
| | c | X | O | O | ⊙ | O | O | X | X | X | X |
| 5th | | X | O | O | X | X | O | X | X | X | X |
| Rev | | X | X | O | O | X | O | O | X | X | X |
| 2.5th | | O | X | X | ⊙ | O | O | X | X | X | X |
| 3.5th | | O | X | O | X | X | O | X | O | X | X |

Figure 40:
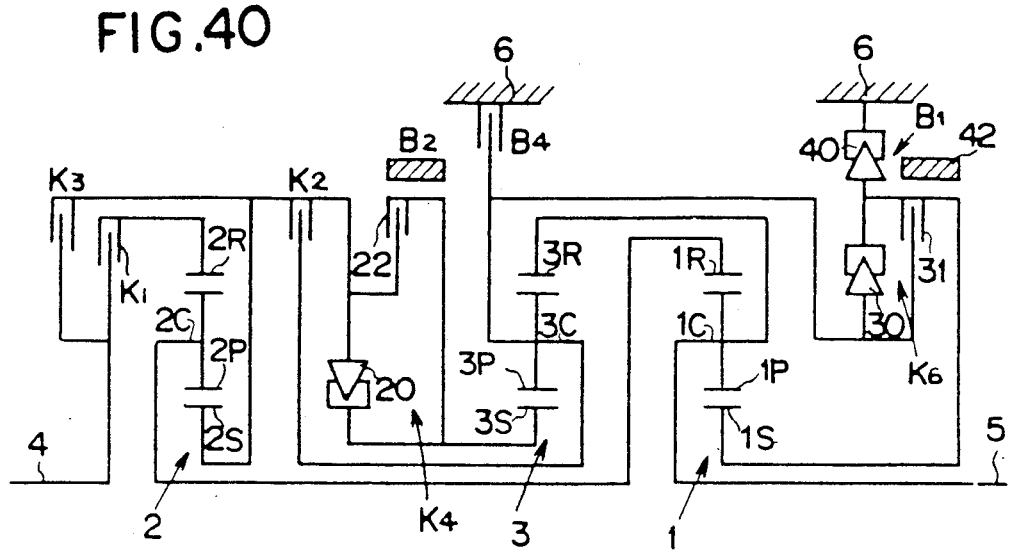

An automatic transmission shown in FIG. 40 is the same in construction as that shown in FIG. 36, except that the one-way clutch 40 of the first brake unit B1 is disposed outside the one-way clutch 30 of the sixth clutch unit K6. Accordingly, the operating conditions of the clutch units and brake units of the automatic transmission of FIG. 40 is the same as those shown in Table 24 of the clutch units and brake units of the automatic transmission shown in FIG. 36.

Figure 41:
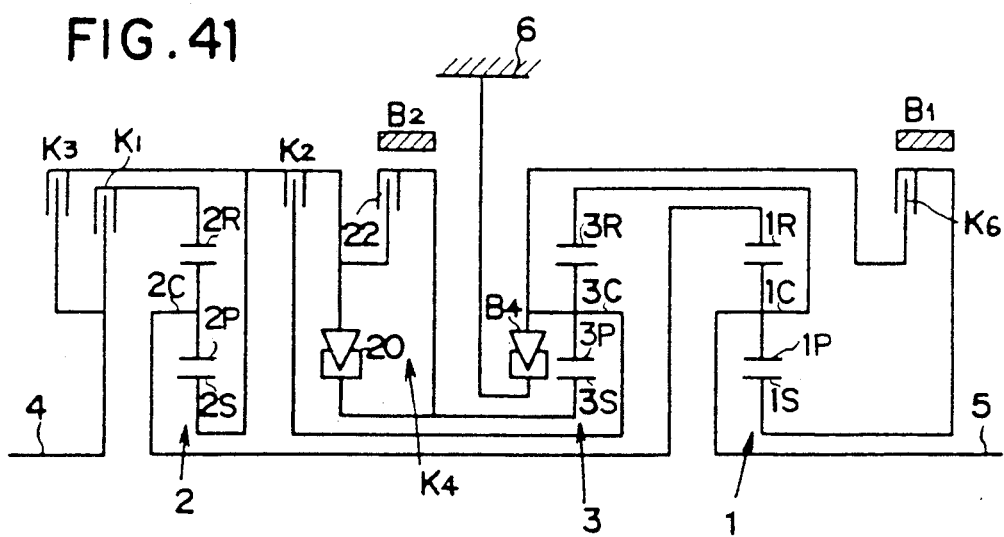

An automatic transmission shown in FIG. 41 is constructed by omitting the third brake unit B3 of the automatic transmission shown in FIG. 39. Accordingly, the operating conditions of the clutch units and brake units of the automatic transmission shown in FIG. 41 are shown for reference in Table 28, which is the same as Table 27, except that columns a and b for the second gear are excluded. Also with the automatic transmission of FIG. 41, for employing a comparatively small clutch as the sixth clutch unit K6 and for improving durability of the clutch K6, it is preferable to reduce the output of the engine or the input torque of the automatic transmission when the automatic transmission is placed in the reverse gear.

TABLE 28

| | | Clutch Unit | | | | | | Brake Unit | | |
|---|---|---|---|---|---|---|---|---|---|---|
| | | K1 | K2 | K3 | K4 22 | 20 | K6 | B1 | B2 | B4 |
| 1st | | O | x | x | ⊙ | O | ⊙ | O | x | O |
| 2nd | | O | x | x | ⊙ | O | x | O | O | x |
| 3rd | a | O | x | O | x | x | x | O | O | x |
| | b | O | x | O | x | x | O | O | x | x |
| | c | O | x | O | x | x | O | ⊙ | x | O |
| 4th | a | O | x | O | O | x | O | x | x | x |
| | b | O | O | O | O | x | O | x | x | x |
| | c | x | O | O | ⊙ | O | O | x | x | x |
| 5th | | x | O | O | x | x | O | x | O | x |
| Rev | | x | x | O | O | x | O | O | x | x |
| 2.5th | | O | x | x | ⊙ | O | O | x | O | x |
| 3.5th | | O | x | O | x | x | O | x | O | x |

Figure 42:
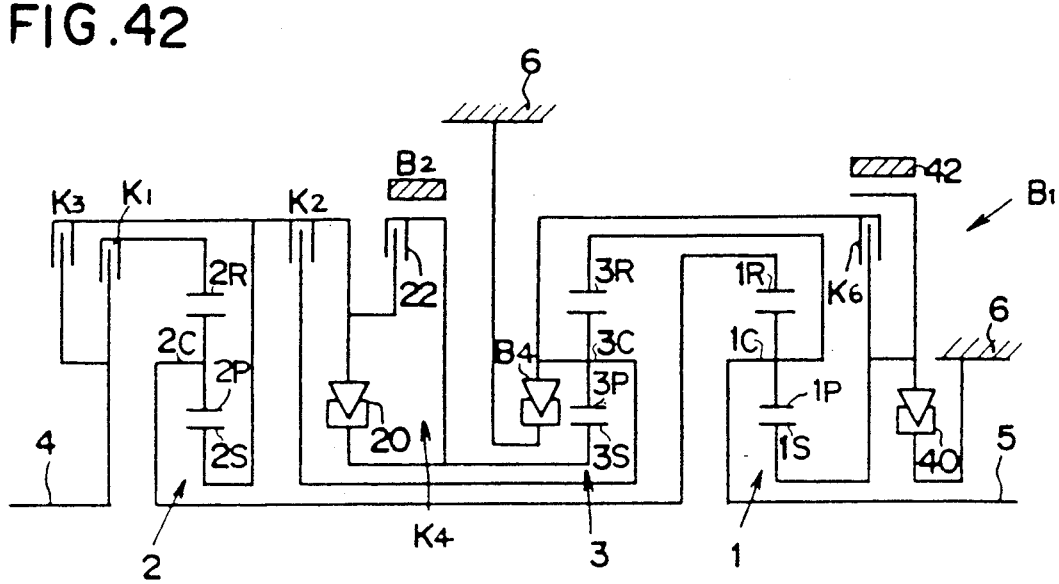

An automatic transmission shown in FIG. 42 is the same in construction as that shown in FIG. 41, except that the first brake unit B1 is a parallel arrangement of a one-way clutch 40 of a comparatively small diameter and a band brake 42. For employing a comparatively small clutch as the sixth clutch unit K6 and for improving durability of the clutch K6, it is preferable to reduce the output of the engine or the input torque of the automatic transmission when the automatic transmission is placed in the reverse gear. The operating conditions of the clutch units and brake units of the automatic transmission of FIG. 42 are shown in Table 29.

TABLE 29

| | | Clutch Unit | | | | | | Brake Unit | | | |
|---|---|---|---|---|---|---|---|---|---|---|---|
| | | K1 | K2 | K3 | K4 22 | 20 | K6 | 42 | B1 40 | B2 | B4 |
| 1st | | O | x | x | ⊙ | O | ⊙ | ⊙ | O | x | O |
| 2nd | | O | x | x | ⊙ | O | x | ⊙ | O | O | x |
| 3rd | a | O | x | O | x | x | x | ⊙ | O | O | x |
| | b | O | x | O | O | x | x | ⊙ | O | x | x |
| 4th | a | O | x | O | O | x | O | x | x | x | x |
| | b | O | O | O | O | x | O | x | x | x | x |
| | c | x | O | O | ⊙ | O | O | x | x | x | x |
| 5th | | x | O | O | x | x | O | x | O | x | x |
| Rev | | x | x | O | O | x | O | O | x | x | x |
| 2.5th | | O | x | x | ⊙ | O | O | x | x | O | x |

TABLE 29-continued

| | Clutch Unit | | | | | | Brake Unit | | | |
|---|---|---|---|---|---|---|---|---|---|---|
| | K1 | K2 | K3 | K4 22 | 20 | K6 | 42 | B1 40 | B2 | B4 |
| 3.5th | O | x | O | x | x | O | x | x | O | x |

Figure 43:
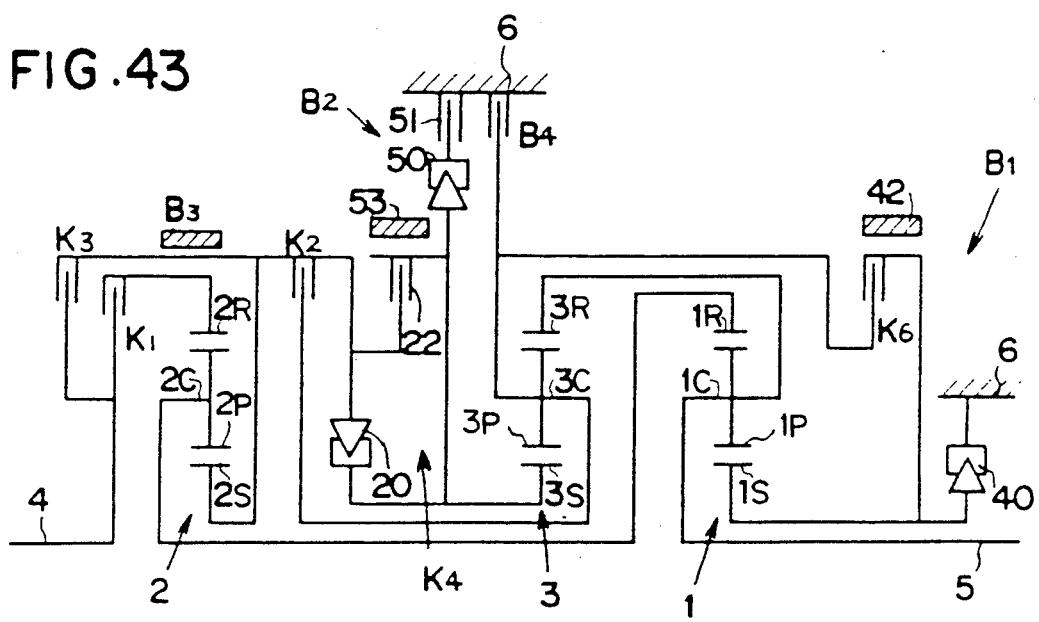

An automatic transmission shown in FIG. 43 is the same in construction as that shown in FIG. 42, except that the second brake unit B2 comprises a series arrangement of a one-way clutch 50, which engages when the sun gear 3S of the third planetary gear set 3 is about to rotate in the reverse direction, and a multi-disc clutch 51, and a band brake 53 connected in parallel relationship to the series arrangement of the one-way clutch 50 and the multi-disc clutch 51, a third brake unit B3 comprising a band brake is provided to selectively hold the sun gear 2S of the second planetary gear set 2, and the fourth brake unit B4 is a multi-disc brake. The operating conditions of the clutch units and brake units of the automatic transmission of FIG. 43 are shown in Table 30.

TABLE 30

| | | Clutch Unit | | | | | | Brake Unit | | | | | |
|---|---|---|---|---|---|---|---|---|---|---|---|---|---|
| | | K1 | K2 | K3 | K4 22 | 20 | K6 | B1 42 | 40 | B2 53 | 51 | 50 | B3 | B4 |
| 1st | | O | x | x | ⊙ | O | x | ⊙ | O | x | x | x | x | O |
| 2nd | a | O | x | x | x | x | x | ⊙ | O | x | x | x | O | O |
| | b | O | x | x | x | O | x | ⊙ | O | x | O | O | O | x |
| | c | O | x | x | ⊙ | O | x | ⊙ | O | ⊙ | O | O | ⊙ | x |
| 3rd | | O | x | O | O | x | x | ⊙ | O | x | O | x | x | x |
| 4th | a | O | x | O | O | x | O | x | x | x | O | x | x | x |
| | b | O | O | O | O | x | O | x | x | x | O | x | x | x |
| | c | x | O | O | ⊙ | O | O | x | x | x | O | x | x | x |
| 5th | | x | O | O | x | x | O | x | x | O | O | x | x | x |
| Rev | | x | x | O | O | x | x | O | x | x | x | x | x | O |
| 2.5th | | O | x | x | ⊙ | x | O | x | x | ⊙ | O | O | O | x |
| 3.5th | | O | x | O | x | x | O | x | x | ⊙ | O | O | x | x |

Figure 44:
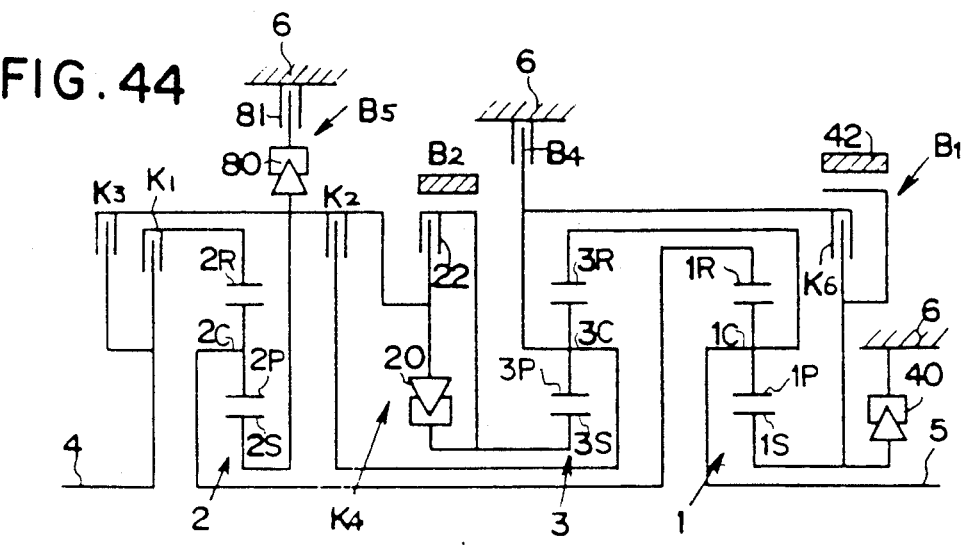

An automatic transmission shown in FIG. 44 is the same in construction as that shown in FIG. 43, except that the second brake unit B2 is a band brake, and the third brake unit B3 is replaced with a fifth brake unit B5 comprising a series arrangement of a one-way clutch 80 and a multi-disc brake 81. The operating conditions of the clutch units and brake units of the automatic transmission of FIG. 43 are shown in Table 31.

TABLE 31

| | | Clutch Unit | | | | | | Brake Unit | | | | | |
|---|---|---|---|---|---|---|---|---|---|---|---|---|---|
| | | K1 | K2 | K3 | K4 22 | 20 | K6 | B1 42 | 40 | B2 | B4 | B5 81 | 80 |
| 1st | | O | x | x | ⊙ | | ⊙ | ⊙ | O | x | O | x | x |
| 2nd | | O | ⊙ | x | x | x | x | ⊙ | O | x | O | O | O |
| 3rd | a | O | x | O | x | x | x | ⊙ | O | x | O | O | x |
| | b | O | x | O | O | x | x | ⊙ | O | x | x | O | x |
| 4th | a | O | x | O | O | x | O | x | x | x | x | O | x |
| | b | O | O | O | O | x | O | x | x | x | x | O | x |
| | c | x | O | O | ⊙ | O | O | x | x | x | x | O | x |
| 5th | | x | O | O | x | x | O | x | x | O | x | O | x |
| Rev | | x | x | O | O | x | x | O | x | x | O | x | x |
| 2.5th | | O | x | x | ⊙ | O | O | x | x | O | x | O | x |
| 3.5th | | O | x | O | x | x | O | x | x | O | x | O | x |

Figure 45:
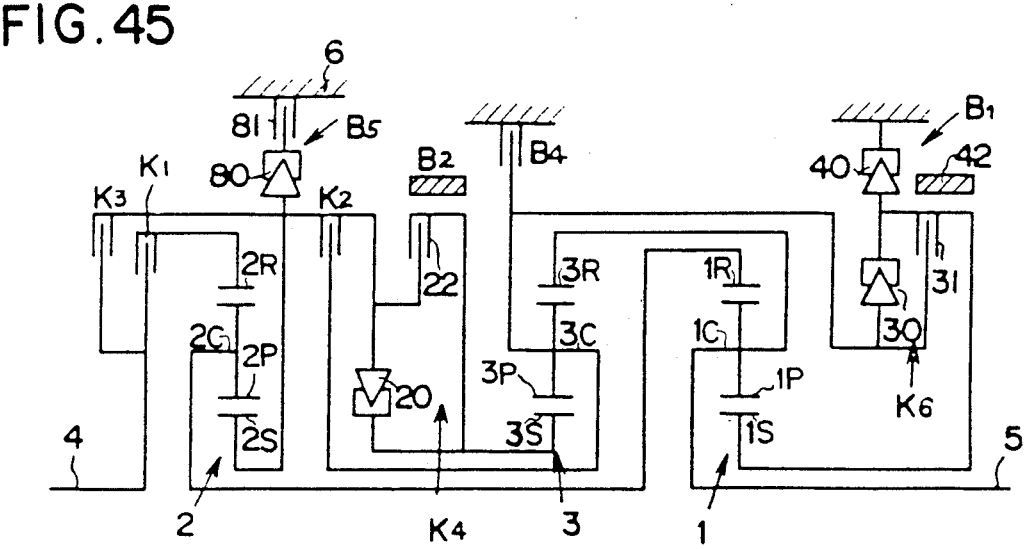

An automatic transmission shown in FIG. 45 is the same in construction as that shown in FIG. 40, except that a fifth brake unit B5 comprising a series arrangement of a one-way clutch 80 and a multi-disc brake 81 is provided between the sun gear 2S of the second planetary gear set 2 and the casing 6. The operating conditions of the clutch units and brake units of the automatic transmission of FIG. 45 are shown in Table 32.

TABLE 32

| | | Clutch Unit | | | | | | Brake Unit | | | | |
|---|---|---|---|---|---|---|---|---|---|---|---|---|
| | | | | | K4 | | K6 | B1 | | | | B5 |
| | | K1 | K2 | K3 | 22 | 20 | 31 | 30 | 41 | 40 | B2 | B4 | 81 | 80 |
| 1st | a | O | x | x | ⊙ | O | ⊙ | O | ⊙ | O | x | O | x | x |
| | b | O | x | x | ⊙ | O | ⊙ | O | ⊙ | O | x | x | x | x |
| 2nd | a | O | x | x | ⊙ | O | x | x | ⊙ | O | O | x | x | x |
| | b | O | x | x | ⊙ | O | x | x | ⊙ | O | O | x | O | O |
| | c | O | x | x | O | x | x | x | ⊙ | O | ⊙ | x | O | O |
| 3rd | | O | x | O | O | x | x | x | ⊙ | O | x | x | x | x |
| 4th | a | O | x | O | O | x | O | x | x | x | x | x | x | x |
| | b | O | O | O | O | x | O | x | x | x | x | x | x | x |
| | c | x | O | O | ⊙ | O | O | x | x | x | x | x | x | x |
| 5th | | x | O | O | x | x | O | x | x | x | O | x | x | x |
| Rev | | x | x | O | O | x | x | x | O | x | x | O | x | x |
| 2.5th | | O | x | x | ⊙ | O | O | x | x | x | O | x | x | x |
| 3.5th | | O | x | O | x | x | O | x | x | x | O | x | x | x |

Figure 46:
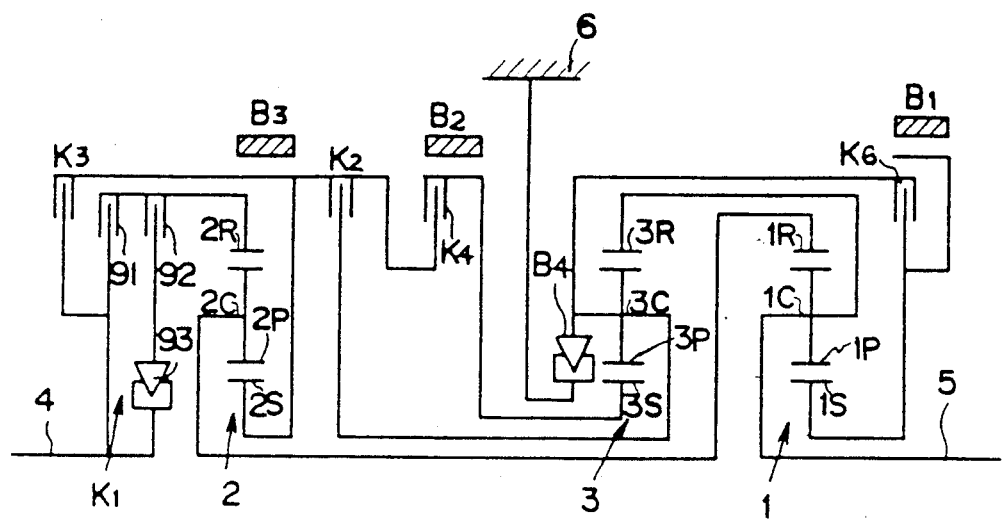

An automatic transmission shown in FIG. 46 is the same in construction as that shown in FIG. 41, except that the first clutch unit K1 and the fourth clutch unit K4 of the automatic transmission of FIG. 46 are different in construction, respectively, from those of the automatic transmission shown in FIG. 41, and the automatic transmission of FIG. 46 is provided additionally with a third brake unit B3. The first clutch unit K1 comprises a multi-disc clutch 91 disposed between the ring gear 2R of the second planetary gear set 2, and a series arrangement of a multi-disc clutch 92 and a one-way clutch 93, connected in parallel relationship to the multi-disc clutch 91. The fourth clutch unit K4 is a multi-disc clutch. The third brake unit B3 is a band brake for selectively holding the sun gear 2S of the second planetary gear set 2. The operating conditions of the clutch units and brake units of the automatic transmission of FIG. 46 are shown in Table 33. With this automatic transmission also, for employing a comparatively small clutch as the sixth clutch unit K6 and for improving durability of the clutch K6, it is preferable to reduce the output of the engine or the input torque of the automatic transmission when the automatic transmission is placed in the reverse gear.

TABLE 33

| | | Clutch Unit | | | | | | | Brake Unit | | | |
|---|---|---|---|---|---|---|---|---|---|---|---|---|
| | | K1 | | | | | | | | | | |
| | | 91 | 92 | 93 | K2 | K3 | K4 | K6 | B1 | B2 | B3 | B4 |
| 1st | | ⊙ | O | O | x | x | O | ⊙ | O | x | x | O |
| 2nd | a | ⊙ | O | O | x | x | O | x | O | O | x | x |
| | b | ⊙ | O | O | x | x | O | x | O | O | O | x |
| | c | ⊙ | O | O | O | x | x | x | O | x | O | O |
| | d | ⊙ | O | O | O | x | x | ⊙ | O | x | x | O |
| 3rd | a | ⊙ | O | O | O | O | x | x | O | x | x | x |
| | b | ⊙ | O | O | x | O | x | O | O | x | x | O |
| | c | ⊙ | O | O | x | O | x | O | ⊙ | x | x | O |
| 4th | a | ⊙ | O | O | x | O | O | O | x | x | x | x |
| | b | ⊙ | O | O | O | O | O | O | x | x | x | x |
| | c | ⊙ | O | O | O | x | O | O | x | x | x | x |
| 5th | | x | O | x | O | O | x | O | x | O | x | x |
| Rev | | x | x | x | x | O | O | O | x | x | x | O |
| 2.5th | | ⊙ | O | O | x | x | x | O | x | O | O | x |
| 3.5th | | ⊙ | O | O | x | O | x | O | x | O | x | x |

Figure 47:
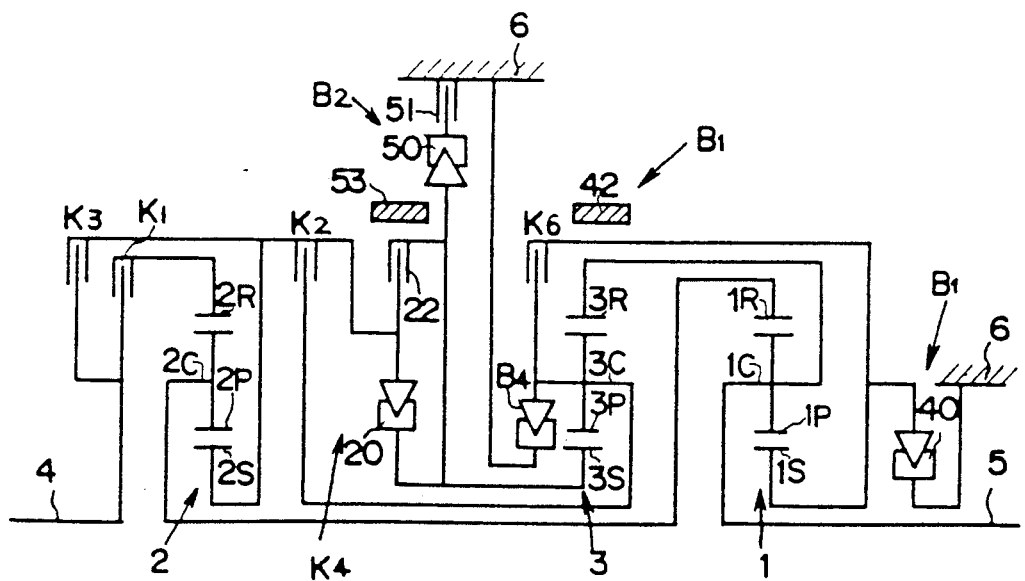

An automatic transmission shown in FIG. 47 is the same in construction as that shown in FIG. 43, except that the third brake unit B3 is omitted, the sixth clutch unit K6 is disposed adjacent to the third planetary gear set 3, and the fourth brake unit B4, i.e., the one-way clutch, is disposed on the side of the inner circumference of the sixth clutch unit K6. With this automatic transmission also, for employing a comparatively small clutch as the sixth clutch unit K6 and for improving durability of the clutch K6, it is preferable to reduce the output of the engine or the input of the automatic transmission when the automatic transmission is placed in the reverse gear. The operating conditions of the clutch units and brake units of the automatic transmission of FIG. 47 are shown in Table 34.

TABLE 34

| | | Clutch Unit | | | | | | Brake Unit | | | | |
|---|---|---|---|---|---|---|---|---|---|---|---|---|
| | | | | | K4 | | | B1 | | B2 | | |
| | | K1 | K2 | K3 | 22 | 20 | K6 | 42 | 40 | 53 | 51 | 50 | B4 |
| 1st | | O | x | x | ⊙ | O | ⊙ | ⊙ | O | x | x | x | O |
| 2nd | | O | x | x | ⊙ | O | x | ⊙ | O | ⊙ | O | O | x |
| 3rd | | O | x | O | O | x | x | ⊙ | O | x | O | x | x |
| 4th | a | O | x | O | O | x | O | x | x | x | O | x | x |
| | b | O | O | O | O | x | O | x | x | x | O | x | x |
| | c | x | O | O | ⊙ | O | O | x | x | x | O | x | x |
| 5th | | x | O | O | x | x | O | x | x | O | O | x | x |
| Rev | | x | x | O | O | x | O | O | x | x | x | x | x |
| 2.5th | | O | x | x | ⊙ | O | O | x | x | ⊙ | O | O | x |
| 3.5th | | O | x | O | x | x | O | x | x | ⊙ | O | O | x |

Figure 48:
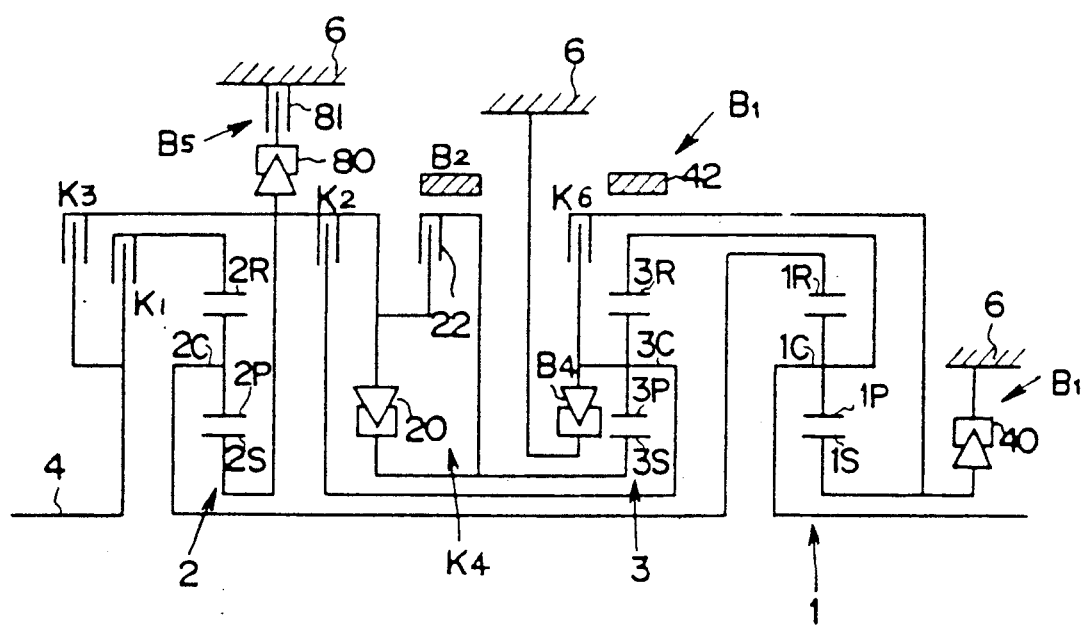

An automatic transmission shown in FIG. 48 is the same in construction as that shown in FIG. 47, except that the second brake unit B2 is a band brake, and the fifth brake unit B5 for selectively holding the sun gear 2S of the second planetary gear set 2, comprising a series arrangement of a one-way clutch 80 and a multi-disc clutch 81 is disposed between the sun gear 2S of the second planetary gear set 2 and the casing 6. With this automatic transmission also, similarly to the automatic transmission of FIG. 47, it is preferable to reduce the output of the engine or the input of the automatic transmission when the automatic transmission is placed in the reverse gear. The operating conditions of the clutch units and brake units of the automatic transmission of FIG. 48 are shown in Table 35.

TABLE 35

| | | Clutch Unit | | | | | | Brake Unit | | | | |
|---|---|---|---|---|---|---|---|---|---|---|---|---|
| | | | | | K4 | | | B1 | | | | B5 |
| | | K1 | K2 | K3 | 22 | 20 | K6 | 41 | 40 | B2 | B4 | 81 | 80 |
| 1st | | O | ⊗ | x | ⊙ | O | ⊙ | ⊙ | O | x | O | x | x |
| 2nd | | O | x | x | ⊙ | O | x | ⊙ | O | ⊙ | x | O | O |
| 3rd | | O | x | O | O | x | x | ⊙ | O | x | x | O | O |
| 4th | a | O | x | O | O | x | O | x | x | x | x | x | x |
| | b | O | O | O | O | x | O | x | x | x | x | x | x |
| | c | x | O | O | ⊙ | O | O | x | x | x | x | x | x |
| 5th | | x | O | O | x | x | O | x | x | O | x | x | x |
| Rev | | x | x | O | O | x | O | O | x | x | x | x | x |
| 2.5th | | O | x | x | ⊙ | O | O | x | x | O | x | x | x |
| 3.5th | | O | x | O | x | x | O | x | x | O | x | x | x |

The automatic transmissions shown in FIGS. 24 to 48 incorporate the one-way clutches for the improvement of the controllability of the automatic transmissions and for the suppression of shocks attributable to gear changing operation. Band brakes may be employed instead of the one-way clutches as unidirectional engaging devices. When the tension of the band of the band brake is increased while the associated rotary member, such as a drum, is rotating in the direction from the anchor holding one end of the band toward the free end of the band, the rotary member tends to wind the belt positively, so that the frictional braking force increases. When the rotary member rotates in the opposite direction, the frictional braking force decreases. Thus, the band brake acts in a unidirectional manner. Accordingly, in the present invention, the series or parallel arrangement of the one-way clutch and the multi-disc brake, the parallel arrangement of the one-way clutch and the band brake, and the parallel arrangement of the series arrangement of the one-way clutch and the multi-disc brake, and the multi-disc brake employed in the foregoing embodiments may be substituted by a single band brake or a pair of band brakes wound, respectively, in opposite directions around a rotary member. The position of the unidirectional engaging device may selectively and optionally be determined as occasion demands; only one unidirectional engaging device may be provided in an automatic transmission instead of providing a plurality of unidirectional engaging devices in an automatic transmission as in the automatic transmissions of FIGS. 24 to 48.

Figure 49A:
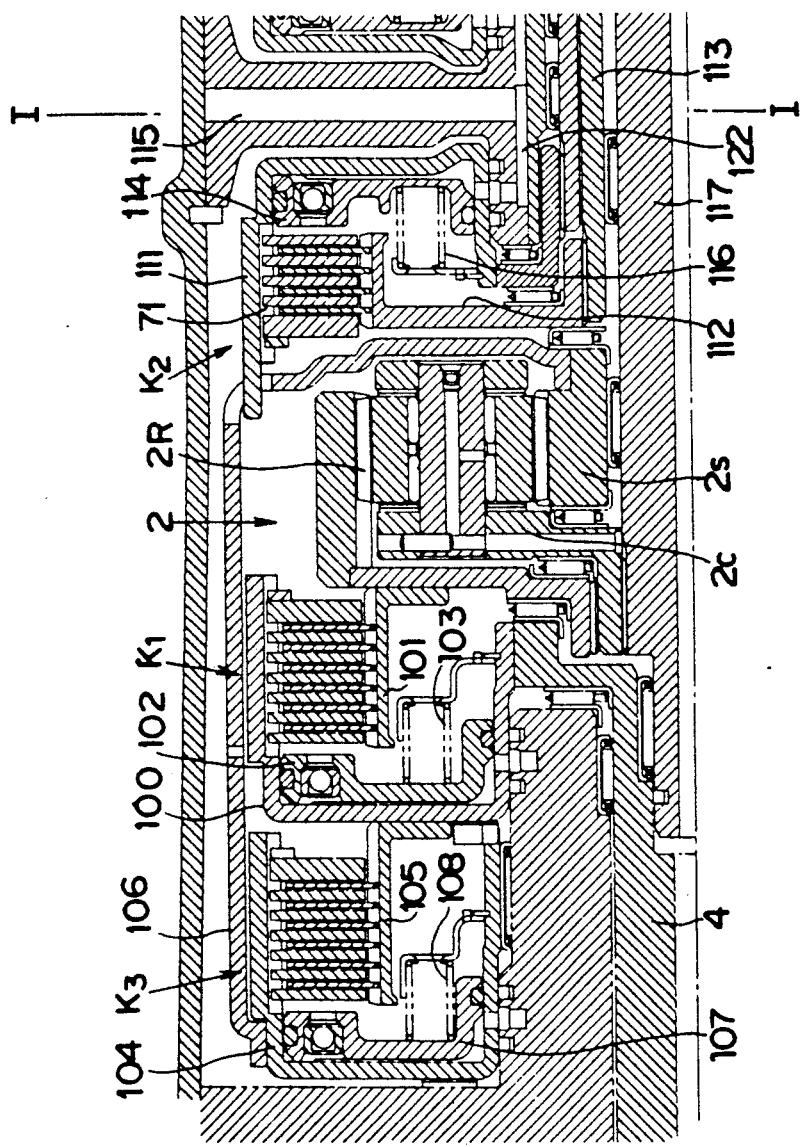
FIGS. 49(A) 49(B) are a sectional view showing further embodiment of the present invention, when jointed along line I—I.
Figure 49B:
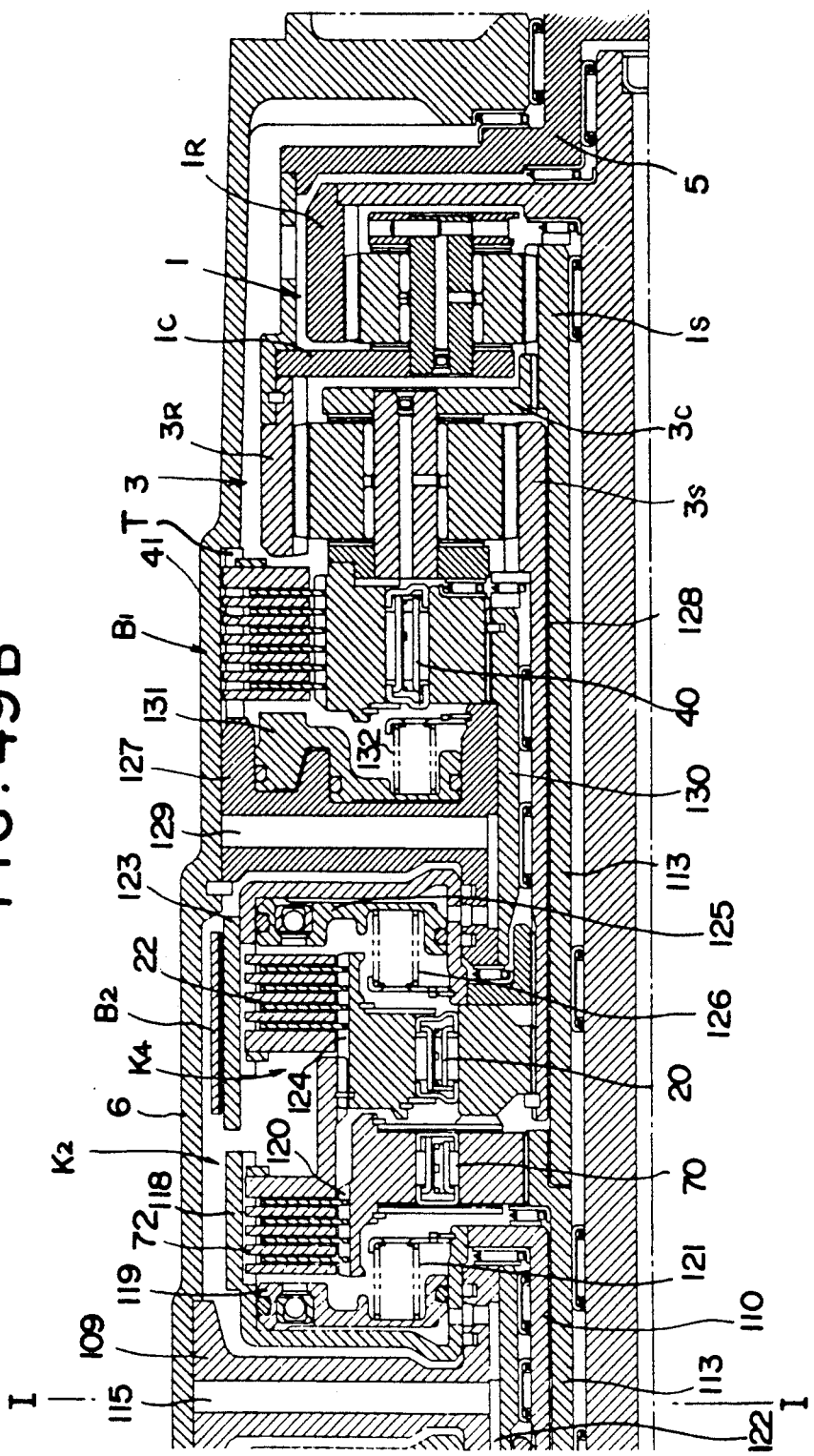

FIGS. 49(A) and 49(B) show a concrete automatic transmission embodying the present invention. Referring to FIGS. 49(A) and 49(B), an input shaft 4 is coupled with the output shaft of an intermediate power transmission, not shown, such as a torque converter. A first clutch unit K1 comprises a clutch drum 100, a clutch hub 101, contact plates splined to the inner surface of the clutch drum 100, and friction disks splined to the clutch hub 101. The clutch drum 100 is connected to the leading end of the input shaft 4. The clutch hub 101 is joined to the ring gear 2R of a second planetary gear set 2. Torque is transmitted from the clutch drum 100 to the clutch hub 101 by friction between the contact plates and the friction disks when the first clutch unit K1 is engaged. A piston 102 is fitted in the clutch drum 100 for axial sliding movement to engage or disengage the first clutch unit K1. Normally, the piston 102 is biased away from the assembly of the contact plates and the friction disks by return springs 103 to keep the first clutch unit K1 disengaged. A third clutch unit K3 for connecting the input shaft 4 to the sun gear 2S of the second planetary gear set 2 comprises a clutch drum 104, a clutch hub 105, contact plates splined to the inner surface of the clutch drum 104, and friction disks splined to the clutch hub 105. Torque is transmitted from the clutch drum 104 to the clutch hub 105 by friction between the contact plates and the friction disks. The clutch hub 105 of the third clutch unit K3 is joined to the clutch drum 100 of the first clutch unit K1. The clutch drum 104 is joined to a connecting drum 106 surrounding the first clutch unit K1 and the second planetary gear set 2, and connected to the sun gear 2S of the second planetary gear set 2. A piston 107 for engaging or disengaging the third clutch unit K3 is fitted in the clutch drum 104 and is biased away from the contact plates and friction disks of the third clutch unit K3 by return springs 108 to keep the third clutch unit K3 disengaged.

A multi-disc clutch 71, i.e., a component of a second clutch unit K2, is disposed opposite to the first clutch unit K1 with respect to the second planetary gear set 2 and is mounted on a quill shaft 110 journaled on a first central support 109. The multi-disc clutch 71 comprises a clutch drum 111, a clutch hub 112, contact plates splined to the inner surface of the clutch drum 111, a friction disks splined to the clutch hub 112. The first central support 109 is fixed to the inner surface of a casing 6. The clutch drum 111 of the multi-disc clutch 71 is fitted for rotation in the boss of the first central support 109 in a liquid-tight manner, and the lead end of the clutch drum 111 is connected to the connecting drum 106 so that the clutch drum 111 is restrained from rotation relative to the connecting drum 106. The clutch drum 111 is splined to the quill shaft 110 journaled on the first central support 109. The clutch hub 112 of the multi-disc clutch 71 is connected to a first sun gear shaft 113 supported for rotation in the quill shaft 110. A piston 114 is fitted in the clutch drum 111 for axial movement to engage or disengage the multi-disc clutch 71. The working fluid is supplied to and discharged from a pressure chamber defined by the piston 114 and the clutch drum 111 through a passage 115 formed through the first central support 109 to operate the piston 114. Normally, the piston 114 is biased away from the assembly of the contact plates and the friction disks by return springs 116 to keep the multi-disc clutch 71 disengaged.

An intermediate shaft 117 is extended through the first sun gear shaft 113 coaxially with the input shaft 4 between the second planetary gear set 2 and the rear end of the automatic transmission. The front end of the intermediate shaft 117 is connected to the carrier 2C of the second planetary gear set 2, and the rear end of the same is connected to the ring gear 1R of a first planetary gear set 1.

A multi-disc clutch 72, i.e., a component of the second clutch unit K2, is disposed opposite to the multi-disc clutch 71 with respect to the first central support 109. The multi-disc clutch 72 comprises a clutch drum 118, a clutch hub 120, contact plates splined to the inner surface of the clutch drum 118, and friction disks splined to the clutch hub 120. The clutch drum 118 of the multi-disc clutch 72 is journaled in a liquid-tight manner on the boss of the first central support 109 and is connected to the quill shaft 110. A piston 119 is fitted in the clutch drum 118 for axial movement and is normally biased away from the assembly of the contact plates and the friction disks by return springs 121 to keep the multi-disc clutch 72 disengaged. The piston 119 compresses the assembly of the contact plates and the friction disks for torque transmission between the clutch drum 118 and the clutch hub 120 by friction. The clutch hub 120 is joined to the outer race of a one-way clutch 70. The inner race of the one-way clutch 70 is connected to the first sun gear shaft 113. Thus, the multi-disc clutch 72 and the one-way clutch 70 are connected in series. Normally, the piston 119 is biased away from the assembly of the contact plates and the friction disks by return springs 121 to keep the multi-disc clutch 72 disengaged. The working fluid is supplied to and discharged from a pressure chamber defined by the piston 119 and the clutch drum 118 through a passage 122 formed through the first central support 109 to operate the piston 119.

A fourth clutch unit K4 is disposed opposite to the multi-disc clutch 72 of the second clutch unit K2. The fourth clutch unit K4 comprises a multi-disc clutch 22 and a one-way clutch 20 connected in parallel relationship to the multi-disc clutch 22. The multi-disc clutch 22 comprises a clutch drum 123, contact plates splined to the inner surface of the clutch drum 123, clutch hub 124, friction disks splined to the clutch hub 124, a piston 125 fitted in the clutch drum 123, and return springs biasing the piston 125 away from the assembly of the contact plates and the friction disks. Torque is transmitted between the clutch drum 123 and the clutch hub 124 by the frictional engagement of the contact plates and the friction disks caused by the piston 125. The clutch drum 123 is mounted for rotation in a liquid-tight manner on the boss of a second central support 127 fixed to the inner surface of the casing 6, and is connected to one end of a second sun gear shaft 128 coaxially put on the first sun gear shaft 113. The clutch hub 124 is joined to the outer race of the overrunning clutch 20. The inner race of the one-way clutch 20 is splined to the second sun gear shaft 128. The working fluid is supplied to and discharged from a pressure chamber defined by the piston 125 and the clutch drum 123 through a passage 129 formed through the second central support 127 to operate the piston 125. The other end of the second sun gear shaft 128 is connected to the sun gear 3S of a third planetary gear set 3.

The clutch drum 123 of the multi-disc clutch 22 of the fourth clutch unit K4 serves also as a brake drum for a second brake unit B2, i.e., a band brake.

A first brake unit B1 is disposed opposite to the fourth clutch unit K4 with respect to the second central support 127. The first brake unit B1 comprises a one-way clutch 40 and a multi-disc brake 41. The friction disks of the multi-disc brake 41 engage splines T formed on the inner circumference of the casing 6 so as to extend axially rearward, and the contact plates of the same are splined to the outer race of the one-way clutch 40. The inner race of the one-way clutch 40 is splined to a sleeve 130 joined to the second central support 127. The carrier 3C of the third planetary gear set 3 is connected to the outer race of the one-way clutch 40. Thus, the one-way clutch 40 and the multi-disc brake 41 are connected in parallel relationship to each other to hold the carrier 3C of the third planetary gear set 3 selectively. A piston for engaging the multi-disc brake 41 of the first brake unit K1 is fitted in a cavity formed in the second central support 127. The working fluid is supplied to and discharged from the cavity of the second central support 127 through a passage, not shown, formed through the second central support 127. Normally, the piston 131 is biased away from the assembly of the contact plates and the friction disks by return springs 132.

The third planetary gear set 3 and the first planetary gear set 1 are arranged in that order after the first brake unit B1. The carrier 3C of the third planetary gear set 3 is splined to the first sun gear shaft 113, and the ring gear 3R of the same is connected to the carrier 1C of the first planetary gear set 1. The ring gear 3R and the carrier 1C are connected to an output shaft 5 extending coaxially with the intermediate shaft 117.

The automatic transmission of FIGS. 49(A) and 49(B) can be placed in any one of five forward gears and one reverse gear or in any one of seven forward gears including the 2.5th and 3.5th forward gears and one reverse gear.

The present invention has the following advantages. The automatic transmission of the present invention comprises a gear train comprising, as principal components, three single-pinion planetary gear drives, and a small number of frictional engaging devices, and is capable of being placed in any one of at least five forward gears and one reverse gear; the sequence of the five forward gears can be approximated by a geometric progression; and the single-pinion planetary gear drive can be formed, respectively, in compact constructions. Thus, the automatic transmission of the present invention has satisfactory power performance and controllability, is able to operate for gear changing operation with reduce shocks, and can be formed in a compact construction.

What is claimed is:

1. A automatic transmission having a gear train for changing the rotation of an output shaft relative to that of an input shaft, comprising:
    a first single-pinion planetary gear set comprising a first sun gear, a first ring gear, a pinion gear meshing with both the first sun gear and the first ring gear, and a first carrier supporting the pinion gear;
    a second single-pinion planetary gear set comprising a second sun gear, a second ring gear, a pinion gear meshing with both the second sun gear and the second ring gear, and a second carrier supporting the pinion gear and capable of being connected integrally or selectively to the first ring gear; and
    a third single-pinion planetary gear set comprising a third sun gear capable of being connected integrally or selectively to the second sun gear, a third ring gear connected integrally or selectively to the first carrier, a pinion gear meshing with both the third sun gear and the third ring gear, and a third carrier supporting the pinion gear can capable of being connected integrally or selectively to the first sun gear.

2. An automatic transmission according to claim 1 further comprising:
    a first clutch unit for selectively connecting the input shaft and the second ring gear;
    a second clutch unit for selectively connecting the third carrier and the second sun gear;
    a third clutch unit for selectively connecting the input shaft and the second sun gear;
    a fourth clutch unit for selectively connecting the second sun gear and the third sun gear;
    a first brake unit for selectively holding the first sun gear; and
    a second brake unit for selectively holding the third sun gear;
    wherein the output shaft is connected to the first carrier or the third ring gear, and the components can be interlocked to establish five forward gears and one reverse gear.

3. An automatic transmission according to claim 2 further comprising: a fifth clutch unit for selectively connecting the input shaft and the third sun gear.

4. An automatic transmission according to claim 3 further comprising a sixth clutch unit for selectively connecting the first sun gear and the third carrier; and
    a fourth brake unit for selectively holding the third carrier.

5. An automatic transmission according to claim 2 further comprising a sixth clutch unit for selectively connecting the first sun gear and the third carrier.

6. An automatic transmission according to claim 5 further comprising a third brake unit for selectively holding the second sun gear.

7. An automatic transmission according to claim 6 further comprising a fourth brake unit for selectively holding the third carrier.

8. An automatic transmission according to claim 5 further comprising a fourth brake unit for selectively holding the third carrier.

9. An automatic transmission according to claim 5, wherein the sixth clutch unit comprises a single multi-disc clutch.

10. An automatic transmission according to claim 8, wherein the gear train is accommodated in a casing, and the first brake unit comprises a parallel arrangement of a one-way clutch and a multi-disc brake, provided between the first sun gear and the casing.

11. An automatic transmission according to claim 8, wherein the fourth brake unit comprises a single multi-disc brake.

12. An automatic transmission according to claim 8, wherein the gear train is accommodated in a casing, and the fourth brake unit comprises a parallel arrangement of a one-way clutch and a multi-disc brake, provided between the third carrier and the casing.

13. An automatic transmission according to claim 8, wherein the gear train is accommodated in a casing, and the fourth brake unit comprises a one-way clutch provided between the third carrier and the casing.

14. An automatic transmission according to claim 8 further comprising another series arrangement of a multi-disc clutch and a one-way clutch, provided between the second sun gear and the second ring gear.

15. An automatic transmission according to claim 5, wherein the sixth clutch unit comprises a parallel arrangement of a one-way clutch and a multi-disc clutch, provided between the first sun gear and the third carrier.

16. An automatic transmission according to claim 5, wherein the first brake unit comprises a single multi-disc brake.

17. An automatic transmission according to claim 2 further comprising a sixth clutch unit for selectively connecting the first sun gear and the third carrier.

18. An automatic transmission according to claim 4 further comprising:
a third brake unit for selectively holding the second sun gear, and
a casing for accommodating the gear train,
wherein the fourth clutch unit comprises a parallel arrangement of a one-way clutch and a multi-disc clutch, provided between the second sun gear and the third sun gear,
the first brake unit comprises a parallel arrangement of a one-way clutch and a multi-disc brake, provided between the first sun gear and the casing, and
the second brake unit comprises a band brake.

19. An automatic transmission according to claim 18, wherein the third brake unit comprises a series arrangement of a one-way clutch and a multi-disc brake, provided between the second sun gear and the casing.

20. An automatic transmission according to claim 18, wherein the third brake unit comprises a band brake.

21. An automatic transmission according to claim 17 further comprising:
a third brake unit for selectively holding the second sun gear, and
a casing for accommodating the gear train,
wherein the fourth clutch unit comprises a parallel arrangement of a one-way clutch and a multi-disc clutch, provided between the second sun gear and the third sun gear,
the first brake unit comprises a band brake, and
the second brake unit comprises a band brake.

22. An automatic transmission according to claim 21, wherein the third brake unit comprises a series arrangement of a one-way clutch and a multi-disc brake, provided between the second sun gear and the casing.

23. An automatic transmission according to claim 21, wherein the third brake unit comprises a band brake.

24. An automatic transmission according to claim 2 further comprising
a seventh clutch unit for selectively connecting the output shaft and the third ring gear.

25. An automatic transmission according to claim 24, wherein the clutch units and the brake units can be operated in a plurality of combinations of operating conditions to set at least one of the forward gears and the reverse gear.

26. An automatic transmission according to claim 24 further comprising a casing for accommodating the gear train,
wherein the fourth clutch unit comprises a parallel arrangement of a one-way clutch and a multi-disc clutch, provided between the second sun gear and the third sun gear,
the first brake unit comprises a parallel arrangement of a one-way clutch and a multi-disc brake, provided between the first sun gear and the casing, and
the second brake unit comprises a band brake.

27. An automatic transmission according to claim 24, wherein the fourth clutch unit comprises a parallel arrangement of a one-way clutch and a multi-disc clutch, provided between the second sun gear and the third sun gear,
the first brake unit comprises a band brake, and
the second brake unit comprises a band brake.

28. An automatic transmission according to claim 2 further comprising an eighth clutch unit for selectively connecting the first ring gear and the second carrier.

29. An automatic transmission according to claim 2 further comprising a third brake unit for selectively holding the second sun gear.

30. An automatic transmission according to claim 29, wherein the third brake unit comprises a single multi-disc brake.

31. An automatic transmission according to claim 29, wherein the third brake unit comprises a band brake.

32. An automatic transmission according to claim 29, wherein the gear train is accommodated in a casing, and the third brake unit comprises a series arrangement of a one-way clutch and a multi-disc brake, provided between the second sun gear and the casing.

33. An automatic transmission according to claim 32, wherein the third brake unit comprises a band brake connected in parallel relationship to the series arrangement of the one-way clutch and the multi-disc brake.

34. An automatic transmission according to claim 2 further comprising a ninth clutch unit for selectively connecting the third sun gear and the third carrier.

35. An automatic according to claim 2, wherein the input shaft and the output shaft are coaxial with each other, and the first single-pinion planetary gear set, the second single-pinion planetary gear set and the third single-pinion planetary gear set are arranged coaxially in that order between the input shaft and the output shaft from the side of the input shaft toward the side of the output shaft.

36. An automatic transmission according to claim 35, wherein the firth clutch unit and the third clutch unit are disposed on the side of the input shaft with respect to the first single-pinion planetary gear set, and the second clutch unit and the fourth clutch units are disposed between the second single-pinion planetary gear set and the third single-pinion planetary gear set.

37. An automatic transmission according to claim 15 further comprising a fifth clutch unit for selectively connecting the input shaft and the third sun gear, disposed on the side of the input shaft with respect to the first single-pinion planetary gear set.

38. An automatic transmission according to claim 2, wherein the second single-pinion planetary gear set, the first single-pinion planetary gear set and the third single-pinion planetary gear set are arranged coaxially in that order along the extension of the axis of the input shaft.

39. An automatic transmission according to claim 38, wherein the first clutch unit and the third clutch unit are disposed on the side of the input shaft with respect to the second single-pinion planetary gear set, the second clutch unit and the fourth clutch unit are disposed opposite to the first single-pinion planetary gear set with respect to the third single-pinion planetary gear set.

40. An automatic transmission according to claim 39 further comprising a sixth clutch unit for selectively connecting the first sun gear and the third carrier, disposed between the first single-pinion planetary gear set and the third single-pinion planetary gear set.

41. An automatic transmission according to claim 40, wherein the first brake unit and the second brake unit are disposed opposite to the first single-pinion planetary gear set with respect the third single-pinion planetary gear set.

42. An automatic transmission according to claim 41 further comprising a fourth brake unit for selectively holding the third carrier, disposed opposite to the first single-pinion planetary gear set with respect to the third single-pinion planetary gear set.

43. An automatic transmission according to claim 40 further comprising a fifth clutch unit for selectively connecting the input shaft and the third sun gear, disposed on the side of the input shaft with respect to the second single-pinion planetary gear shaft.

44. An automatic transmission according to claim 39, wherein the first brake unit and the second brake unit are disposed opposite to the first single-pinion planetary gear set with respect to the third single-pinion planetary gear set.

45. An automatic transmission according to claim 38, wherein the first clutch unit and the third clutch unit are disposed on the side of the input shaft with respect to the second single-pinon planetary gear set, and the second clutch unit and the fourth clutch unit are disposed between the first single-pinon planetary gear set and the third single-pinion planetary gear set.

46. An automatic transmission according to claim 2, wherein the second single-pinion planetary gear set, the third single-pinion planetary gear set and the first single-pinion planetary gear set are arranged coaxially in that order along the extension of the axis of the input shaft.

47. An automatic transmission according to claim 2, wherein the first clutch unit and the third clutch unit are disposed on the side of the input shaft with respect to the second single-pinion planetary gear set, the second clutch unit is disposed opposite to the input shaft with respect to the second single-pinion planetary gear set, the fourth clutch unit is disposed between the second single-pinion planetary gear set and the third single-pinion planetary gear set.

48. An automatic transmission according to claim 2, wherein the input shaft and the output shaft are coaxial with each other, the second single-pinion planetary gear set, the third single-pinon planetary gear set and the first single-pinion planetary gear set are arranged in that order from the side of the input shaft toward the side of the output shaft between the input shaft and the output shaft.

49. An automatic transmission according to claim 48, wherein the first clutch unit and the third clutch unit are disposed on the side of the input shaft with respect to the second single-pinion planetary gear set, and the second clutch unit and the fourth clutch unit are disposed between the second single-pinon planetary gear set and the third single-pinion planetary gear set.

50. An automatic transmission according to claim 49, wherein the second brake unit is disposed between the second single-pinion planetary gear set and the third single-pinion planetary gear set.

51. An automatic transmission according to claim 50 further comprising:
a sixth clutch unit for selectively connecting the third carrier and the first sun gear; and
a fourth brake unit for selectively holding the third carrier;
wherein the first brake unit and the sixth clutch unit are disposed opposite to the third single-pinion planetary gear drive with respect to the first single-pinion planetary gear set.

52. An automatic transmission according to claim 2, wherein the clutch units and the brake units can be operated in a plurality of combinations of operating conditions to set at least one of the forward gears and the reverse gear.

53. An automatic transmission according to claim 2, wherein the first clutch unit comprises a series arrangement of a one-way clutch and a multi-disc clutch, and a further multi-disc clutch connected in parallel relationship to the series arrangement of the one-way clutch and the multi-disc clutch.

54. An automatic transmission according to claim 2, wherein said first clutch unit comprises a single multi-disc clutch.

55. An automatic transmission according to claim 2, wherein the second clutch unit comprises a single multi-disc clutch.

56. An automatic transmission according to claim 2, wherein the second clutch unit comprises a series arrangement of a one-way clutch and a multi-disc clutch, provided between th second sun gear and the third carrier, and a further multi-disc clutch connected in parallel relationship to the series arrangement of the one-way clutch and the multi-disc clutch.

57. An automatic transmission according to claim 2, wherein the third clutch unit comprises a single multi-disc clutch.

58. An automatic transmission according to claim 2, wherein the fourth clutch unit comprises a single multi-disc clutch.

59. An automatic transmission according to claim 2, wherein the fourth clutch unit comprises a series arrangement of a one-way clutch and a multi-disc clutch, provided between the second sun gear and th e third sun gear, and a further multi-disc clutch connected in parallel relationship to the series arrangement of the one-way clutch and the multi-disc clutch.

60. An automatic transmission according to claim 2, wherein the fourth clutch unit comprises a parallel arrangement of a one-way clutch and a multi-disc clutch, provided between the second sun gear and the third sun gear.

61. An automatic transmission according to claim 60 further comprising a casing for accommodating the gear train, wherein the first brake unit comprises a parallel arrangement of a one-way clutch and a multi-disc brake, provided between the first sun gear and the casing, and the second brake unit comprises a band brake.

62. An automatic transmission according to claim 61, wherein the second clutch unit comprises a series arrangement of a one-way clutch and a multi-disc clutch, provided between the second sun gear and the third carrier, and a further multi-disc clutch connected in parallel relationship to the series arrangement of the one-way clutch and the multi-disc clutch.

63. An automatic transmission according to claim 61 further comprising a third brake unit for selectively holding the second sun gear.

64. An automatic transmission according to claim 63 further comprising a casing for accommodating the gear train,
wherein the third brake unit comprises a series arrangement of a one-way clutch and a multi-disc clutch, provided between the second sun gear and the casing.

65. An automatic transmission according to claim 63, wherein the third brake unit comprises a band brake.

66. An automatic transmission according to claim 2, wherein the gear train is accommodated in a casing, and the first brake unit comprises a parallel arrangement of a one-way clutch and a multi-disc brake, provided between the first sun gear and the casing.

67. An automatic transmission according to claim 2, wherein the gear train is accommodated in a casing, and the first brake unit comprises a parallel arrangement of a one-way clutch and a multi-disc brake, provided between the third carrier and the casing.

68. An automatic transmission according to claim 67 further comprising:
a hollow central support fixedly fitting the inner circumference of the casing;
splines axially extending from the outer circumference of the central support; and
a sleeve fixedly fitted in the central support;
wherein the one-way clutch is received coaxially in the multi-disc brake, the contact plates of the multi-disc brake engage the splines axially extending from the outer circumference of the central support, the friction disks of the multi-disc brake disposed alternately between the contact plates are splined to the outer race of the one-way clutch, and the inner race of the one-way clutch is splined to the sleeve.

69. An automatic transmission according to claim 68 further comprising a piston is supported on the central support so as to move axially toward and away from the assembly of the contact plates and friction disks of the multi-disc brake.

70. An automatic transmission according to claim 2, wherein the first brake unit comprises a band brake.

71. An automatic transmission according to claim 2, wherien the gear train is accommodated in a casing, and the first brake unit comprises a one-way clutch provided between the first sun gear and th e casing, and a band brake connected in parallel relationship to the one-way clutch.

72. An automatic transmission according to claim 2, wherein the second brake unit comprises a single multi-disc brake.

73. An automatic transmission according to claim 2, wherein the second brake unit comprises a band brake.

74. An automatic transmission according to claim 2, wherein the gear train is accommodated in a casing, and the second brake unit comprises a series arrangement of a one-way clutch and a multi-disc brake, provided between the third sun gear and the casing, and a further multi-disc brake connected in parallel relationship to the series arrangement of the one-way clutch and the multi-disc brake.

75. An automatic transmission according to claim 2, wherein the gear train is accommodated in a casing, and the second brake unit comprises a one-way clutch provided between the third sun gear and the casing, and a band brake connected in parallel relationship to the one-way clutch.

76. An automatic transmission according to claim 2, wherein the gear train is accommodated in a casing, and the second brake unit comprises a series arrangement of a one-way clutch and a multi-disc brake, provided between the third sun gear and the casing, and a band brake connected in parallel relationship to the series arrangement of the one-way clutch and the multi-disc brake.

77. An automatic transmission according to claim 2, wherein the fourth clutch unit comprises: a multi-disc clutch comprising a clutch drum, a plurality of contact plates splined to the inner surface of the clutch drum, and friction disks alternately disposed between the contact plates; and a one-way clutch disposed coaxially in the multi-disc clutch and having an outer race splined to the friction disks; and the band brake of the second brake unit is associated with the outer circumference of the clutch drum.

* * * * *

UNITED STATES PATENT AND TRADEMARK OFFICE
CERTIFICATE OF CORRECTION

PATENT NO. : 5,030,187
DATED : 07/09/91
INVENTOR(S) : TOSHIYUKI ASADA

It is certified that error appears in the above-identified patent and that said Letters Patent is hereby corrected as shown below:

Bottom of Column 6, in Table 1, 4th line, change " * * * *" to --O* O* O* O*--.

Top of Column 7, in Table 1, 3.5th line change "(1 + $p_3$ + $p_1$ [+] $p_3$)" to --(1 + $p_3$ + $p_1$ $p_3$)-- .

Column 15, Table 6, footnote at bottom of table, change "*[1]At least two of [these] three are engaged." to --*[1]At least two of the three are engaged.--

Column 28, Table 18, 4th line, change "a O X O [ ] X O X" to --a O X O O X O X-- (insert the circle).

Column 34, Table 29, 3.5th line, change "[ ] X [ ] X X [ ] X X [ ] X" to --O X O X X O X X O X-- (insert the circles).

Column 34, Table 31, 1st line, change "O X X ⊚ [O] ⊚ ⊚" to --O X X ⊚ O ⊚ ⊚-- (circle is not in line with the rest of the "X's and O's).

Column 34, Table 31, 5th line, change "X O O X X O X X [ ] X O X" to --X O O X X O X X O X O X--.

Column 36, Table 35, 1st line, change "O [⊘] X ⊚ O ⊚" to --O X X ⊚ O ⊚--.

UNITED STATES PATENT AND TRADEMARK OFFICE
CERTIFICATE OF CORRECTION

PATENT NO. : 5,030,187
DATED : 07/09/91
INVENTOR(S) : TOSHIYUKI ASADA

It is certified that error appears in the above-identified patent and that said Letters Patent is hereby corrected as shown below:

Column 40, Claim 4, line 45, after "comprising" insert --;--.

Column 41, Claim 18, line 28, change "claim 4" to --claim 17--.

Column 42, Claim 35, line 47, after "automatic" insert --transmission--.

Column 42, Claim 37, line 62, change "claim 15" to --claim 36--.

Column 43, Claim 43, line 31, change "shaft" to --set--.

Column 43, Claim 45, line 40 and line 42, change "single-pinon" to --single-pinion--.

UNITED STATES PATENT AND TRADEMARK OFFICE
CERTIFICATE OF CORRECTION

PATENT NO. : 5,030,187

DATED : July 9, 1991

INVENTOR(S) : Toshiyuki Asada

It is certified that error appears in the above-identified patent and that said Letters Patent is hereby corrected as shown below:

Column 44, Claim 49, line 4, change "single-pinon" to --single-pinion--.

Column 44, Claim 56, line 40, change "th" to --the--.

Column 44, Claim 59, line 54, change " th e" to --the--.

Column 46, Claim 71, line 8, change "th e" to --the--.

Signed and Sealed this

Twentieth Day of April, 1993

*Attest:*

MICHAEL K. KIRK

*Attesting Officer*     *Acting Commissioner of Patents and Trademarks*